United States Patent [19]

Krutak et al.

[11] Patent Number: 5,194,463

[45] Date of Patent: Mar. 16, 1993

[54] LIGHT-ABSORBING POLYURETHANE COMPOSITIONS AND THERMOPLASTIC POLYMERS COLORED THEREWITH

[75] Inventors: James J. Krutak; Max A. Weaver; William W. Parham; Wayne P. Pruett, all of Kingsport, Tenn.

[73] Assignee: Eastman Kodak Company, Rochester, N.Y.

[21] Appl. No.: 766,538

[22] Filed: Sep. 27, 1991

[51] Int. Cl.$^5$ ............................................... C08L 2/14
[52] U.S. Cl. ...................................... 524/35; 524/41; 525/123; 525/127; 525/129; 525/130; 528/44; 528/70; 528/71; 528/73; 528/74; 528/75; 528/85
[58] Field of Search ............... 525/123, 127, 129, 130; 524/35, 41; 528/44, 70, 71, 73, 74, 75, 85

[56] References Cited

U.S. PATENT DOCUMENTS

| | | | |
|---|---|---|---|
| 3,213,058 | 10/1965 | Boyle et al. | 260/47 |
| 3,278,486 | 10/1966 | Meek et al. | 260/47 |
| 4,284,729 | 8/1981 | Cross et al. | 521/158 |
| 4,666,819 | 5/1987 | Elmasry | 430/270 |
| 4,831,109 | 5/1989 | Mitra et al. | 528/125 |

FOREIGN PATENT DOCUMENTS 63-307883 12/1988 Japan .

*Primary Examiner*—Maurice J. Welsh
*Attorney, Agent, or Firm*—Bernard J. Graves, Jr.; William P. Heath, Jr.

[57] ABSTRACT

Provided are novel light-absorbing polyurethane compositions and blends of said polyurethane compositions with other thermoplastic polymers. Also provided are shaped or formed articles comprised of the light-absorbing polyurethane compositions and light-absorbing thermoplastic polymer blends.

33 Claims, No Drawings

LIGHT-ABSORBING POLYURETHANE COMPOSITIONS AND THERMOPLASTIC POLYMERS COLORED THEREWITH

FIELD OF THE INVENTION

This invention belongs to the field of polymer chemistry. More particularly, this invention relates to polyurethane compositions containing light-absorbing compounds bearing two hydroxyalkyl groups copolymerized therein.

BACKGROUND OF THE INVENTION

It is well-known that thermoplastic polymers may be colored by adding pigments or solvent dyes (e.g., see Thomas G. Weber, Editor, *Coloring of Plastics*, John Wiley & Sons, New York, 1979). The use of pigments, however, is accompanied by undesirable properties such as opacity, dullness of color, low tinctorial strength, etc. Also, difficulties in uniformly blending the insoluble pigments with the thermoplastic resin are often encountered. Also useful for coloring thermoplastic polymers are the solvent dyes (K. Venkataraman, Editor, *The Chemistry of Synthetic Dyes*, Vol. 8, Academic Press, New York, 1978, pp. 81–131), which provide compositions having improved clarity, brightness in hue and high tinctorial strength, but which may lead to dye migration, extraction, etc. from the colored thermoplastic polymer. These problems are of particular concern when solvent dyes are used to color flexible polymers such as polyvinyl chloride, polyethylene and polypropylene which have low glass transition temperatures.

It is also known that one can prepare solvent soluble nonextractable polymeric aminotriaryl methane dyes having polyester, polycarbonate, polyurethane, or polyethyleneimine backbones and incorporate them into polymers such as polyvinyl choride, polyvinylidene chloride and acrylic polymers such as poly(methyl methacrylate) etc. by solvent blending techniques [U.S. Pat. No. 4,477,635 (1984)]. Difficulties are encountered in preparing these polymeric colored compounds because a non-colored intermediate aromatic amine containing polymer must be prepared and then the aromatic amine moiety in the polymer structure must be converted into an aminotriarylmethane moiety by further reaction with a diaryl ketone in the presence of a condensation catalyst such as phosphorous oxychloride, in an inert organic solvent. Attempts to make colored polyester compositions in one step by copolymerizing aminotriarylmethane colorants containing reactive groups generally fail, presumably because of the thermal instability of the triarylmethane chromophore. These previously disclosed polymeric aminotriarylmethane compositions also have poor fastness to light and do not have the requisite thermal stability for use in coloring thermoplastic polymers via the more favorable method of high temperature melt blending.

It is further known that one may color plastics, in particular polyolefins, with low melting, cross-linked colored polyester compositions containing residues of terephthalic acid, isophthalic acid, or both, a low-molecular weight trimethylol alkane, i.e., 1,1,1-trimethylol propane and a copolymerizable colorant, said colorant being present at a level of 0.1–25% by weight (U.S. Pat. No. 4,116,923). Difficulties are encountered, however, in preparing these highly cross-linked colored polymers as extreme care with regard to the temperature, amount of vacuum, the level of colorant present, and the reaction time, is necessary in order to attempt to reproduce the same quality of cross-linked colored polyester composition. Further, these colored polyester compositions are brittle or low melting and may cause deterioration in physical properties of thermoplastic polymers when added in quantities sufficient to produce a high level of coloration. Critical in the preparation of these previously disclosed polymers is the achievement of a low degree of polymerization to give a low melting polymer which has adequate solubility characteristics in the polymer to be colored; however, to accomplish this the colorant may not be copolymerized, paricularly when added at high levels, thus leading to undesirable extractable colorants.

It is also known to color thermoplastic polymeric materials using color concentrates consisting of physical admixtures of polymers and colorants. However, the use of such physical admixtures to color polymeric materials such as polyesters, e.g., poly(ethylene terephthalate) and blends thereof, present a number of problems:

(1) Colorant migration during drying of the colored polymer pellets.
(2) Colorant migration during extrusion and colorant accumulation on dies which can cause film rupture and shut-downs for clean up, etc. Such colorant migration and accumulation result in time consuming and difficult clean-up when a polymer of another color is subsequently processed in the same equipment.
(3) Colorants may not mix well, for example, when using two or more color concentrates to obtain a particular shade.
(4) Colorants may diffuse or exude during storage of the colored polymeric material.

Furthermore, the presence of oligomeric material in the polymers, such as polyester, admixed with the colorants to produce the known color concentrates can cause problems of equipment contamination during processing.

As noted above, inorganic and low molecular weight organic compounds are widely used as colorants for polymeric materials. By proper combination of colors, nearly any color can be generated. However, there are problems with this coloration system, including chemical incompatibility between the colorant and polymer and the carcinogenic and/or toxic nature of many of the colorants. Of particular concern in the injection molding of polyesters and blends of polyester and polycarbonate is the appearance of a discolored, dark streak at weld lines. Weld lines are typically formed in an injection molded part whenever two advancing melt fronts meet. This problem is particularly severe when dark reds and greens are desired. Because these discolored weld lines are unacceptable in aesthetic applications, these materials often cannot be used in large parts which require multiple gates.

Further, U.S. Pat. Nos. 4,267,306; 4,359,570; 4,403,092; and 4,617,373; describe the preparation of colored polyester compositions by copolymerization of thermally stable colorants during the polyester preparation. However, since the colorants are exposed to very high temperatures for prolonged periods of time necessary for polyester formation, only very stable colorants are suitable, thus severely circumscribing the selection of efficacious colorants. For example, only the non azo type colorants have been shown to have the adequate thermal stability for copolymerization into polyesters; azo type compounds lack the requisite thermal stability for copolymerization into polyesters.

Further, Japanese Kokoku Patent No. Sho 48 [1973] 8562 describes polymeric urethane compositions derived from aliphatic and aromatic diisocyanates and colorants containing two hydroxy groups attached to aromatic rings. However, extreme reaction conditions are required to react the aromatic hydroxy groups completely and the colored polymers prepared from aromatic diols and diisocyanates have limited solubility in the preparative reaction solvents and in thermoplastic resins.

We have discovered novel light-absorbing polyurethane compositions which have light absorbing moieties from various chromophore classes, including the broad range of easily-obtained and relatively inexpensive azo colorants copolymerized therein. These light-absorbing compounds can be copolymerized into polyurethane under sufficiently mild conditions, so as to not destroy the chromophoric moiety; the colored polyurethane compositions thus provided can then be used to impart color, ultraviolet and/or near infrared light absorbing properties to other thermoplastic polymers (e.g., polyesters) to provide colored thermoplastic polymer compositions in a wide ranged of colors either with or without UV or infrared light-absorbing properties.

SUMMARY OF THE INVENTION

The present invention provides light-absorbing polyurethane compositions. The polyurethane compositions of the present invention are useful in applications where color and/or ultraviolet light-absorbing properties are desired. The polyurethane compositions of this invention can be used alone as colorants or near ultraviolet light absorbers or blended with other thermoplastic polymers to impart coloration or near ultraviolet light absorption properties.

DETAILED DESCRIPTION OF THE INVENTION

The present invention provides a light-absorbing polyurethane comprising repeating units of Formula (I)

(I)

wherein

R is a divalent radical selected from optionally substituted $C_2$-$C_{10}$-alkylene, $C_3$-$C_8$-cycloalkylene, arylene, $C_1$-$C_4$-alkylene-arylene-$C_1$-$C_4$-alkylene, $C_1$-$C_4$-alkylene-$C_3$-$C_8$-cycloalkylene-$C_1$-$C_4$-alkylene or $C_1$-$C_4$-alkylene-1,2,3,4,5,6,7-octahydronaphthalene-2,6-diyl-$C_1$-$C_4$-alkylene;

$R^1$ is a divalent organic radical comprised of about 1 to 100 mole percent of the residue of a light-absorbing organic diol, wherein the hydroxyl groups of said diol are bonded via alkylene moieties to the remainder of the light-absorbing organic compound, with any remainder of $R^1$ comprised of the residue of organic diols of the formula HO—$R^2$—OH; wherein $R^2$ is a divalent radical selected from $C_2$-$C_{18}$ alkylene, $C_3$-$C_8$-cycloalkylene, $C_1$-$C_4$ alkylene-1,2,3,4,5,6,7,8-octahydronaphthalen-2,6-diyl-$C_1$-$C_4$ alkylene, $C_1$-$C_4$-alkylene-$C_3$-$C_8$-cycloalkylene-$C_1$-$C_4$-alkylene, $C_1$-$C_4$ alkylene-arylene-$C_1$-$C_4$-alkylene, $C_2$-$C_4$ alkylene-O—$C_2$-$C_4$ alkylene, $C_2$-$C_4$ alkylene-S—$C_2$-$C_4$ alkylene or $C_2$-$C_4$ alkylene-O—$C_2$-$C_4$ alkylene-O—$C_2$-$C_4$ alkylene; and n is equal to or greater than 2.

In a preferred embodiment of the present invention, $R^1$ is comprised of about 5 to 50 mole percent of the residues of a light-absorbing diol. Also as a preferred embodiment of the present invention, n is a range of greater than or equal to 2 and less than 100.

The light-absorbing organic diols used in preparing the polyurethane compositions of the invention are selected from a variety of chromophoric classes including azo, metallized azo, disazo, methine, or arylidene, polymethine, azo-methine, anthraquinone, azamethine, anthrapyridone (3H-dibenz [f,ij] isoquinoline-2,7-dione, anthrapyridine (7H-dibenz [f,ij] isoquinoline-7-one), phthaloylphenothiazine (14H-naphtho [2,3-a] phenothiazine-8,13-dione, benzanthrone (7H(de)anthracene-7-one), anthrapyrimidine (7H-benzo [e] perimidine-7-one), anthrapyrazole, anthraisothiazole, triphenodioxazine, thiaxanthene-9-one, flourindine (5, 12-dihydroquinoxaline [2,3-b] phenazine), quinophthalone, phthalocyanine, naphthalocyanine, nickel dithiolenes, coumarin (2H-1-benzopyran-2-one), coumarin imine (2H-1-benzopyran-2-imine), indophenol, perinone, nitroarylamine, benzodifuran, phthaloylphenoxazine (14H -naphtho[2,3-a]phenoxazine-8,13-dione), phthaloylacridone (13H-naphtho[2,3-c] acridine 5,8,14-trione), anthraquinonethioxanthone (8H-naphtho[2,3-c]thioxanthene-5,8,13-trione), anthrapyridazone, naphtho[1',2',3':4,5]quino[2,1-b] quinazoline-5,10-dione, 1H-anthra(2,1-b)(1, 4) thiazin-7,12-dione, indigo, thioindigo, xanthene, acridine, azine, oxazine, 1,4- and 1,5-naphthoquinones, pyromellitic acid diimide, naphthalene-1,4,5,8-tetracarboxylic acid diimide, 3,4,9,10-perylenetetracarboxylic acid diimide, hydroxybenzophenone, benzotriazole, naphthotriazole, naphthoquinone, diminoisoindoline, naphthopyran (3H-naphtho[2,1-b]pyran-3-ones and 3-imines) and aminonaphthalimide; with the proviso that two hydroxyl groups attached to one or two alkyl moieties be present in the colorant.

Preferred azo compounds correspond to the following Formula (II)

$$R^3-N=N-Y \qquad (II)$$

wherein $R^3$ is the residue of an aromatic amine which has been diazotized and coupled with a coupling component (Y) and is preferably derived from the aromatic amine classes of aniline, 4-aminoazobenzene, 2-aminothiazole, 2-aminobenzothiazole, 3-amino-2,1-benzisothiazole, 2-aminothieno[2,3-d] thiazole, 5-aminoisothiazole, 5-aminopyrazole, 2-amino-1,3,4-thiadiazole, 5-amino-1,2,4-thiadiazole, 5-amino-1,2,3-triazole, 2(5) aminoimidazole, 3-aminopyridine, 2(3)aminothiophene, 3-aminobenzo [b] thiophene, 3-aminothieno [2,3-c] isothiazole, 3-amino-7-azabenz-2,1-isothiazole, 3-aminoisothiazole [3,4-d] pyrimidine, 3(4)-aminophthalimides and such heterocyclic rings substituted with one or more groups selected from $C_1$-$C_4$ alkyl, $C_4$-$C_7$ cycloalkyl, halogen, $C_1$-$C_4$ alkoxy, $C_1$-$C_4$ alkylthio, $C_1$-$C_4$ alkoxycarbonyl, $C_1$-$C_4$ alkanoyl, trifluoroacetyl, cyano, dicyanovinyl, carbamoyl, —CONH—$C_1$-$C_4$ alkyl, —CON($C_1$-$C_4$ alkyl)$_2$, sulfamoyl, —SO$_2$N($C_1$-$C_4$-alkyl)$_2$, —SO$_2$NHC$_1$-$C_4$ alkyl, alkanoyl, aroyl, aryl, arylazo, heteroaryl, heteroarylazo, aryloxy, arylthio, heteroarylthio, arylsulfonyl, $C_1$–$C_4$ alkylsulfonyl, trifluoromethyl, fluorosulfonyl, trifluoromethylsulfonyl, thiocyano, or nitro, and wherein the alkyl portions of the above groups are optionally substituted by one or more groups selected from $C_1$–$C_4$ alkoxy, halogen, aryl, cyano, $C_1$–$C_4$ alkanoyloxy, $C_1$–$C_4$ alkoxycarbonyl, or hydroxy;

Y is selected from the coupler classes of anilines, 1,2-dihydroquinolines, 1,2,3,4-tetrahydroquinolines, benzomorpholines, (3,4-dihydro-2H-1,4-benzoxazines), 5-pyrazolones, 3-cyano-6-hydroxy-2-pyridones, 2,3-dihydroindoles, indoles, 4-hydroxycoumarins, 4-hydroxy-2-quinolones, imidazo [2,1-b] thiazoles, julolidines (2,3,6,7-tetrahydro-1H,5H-benzo[ij]quinolizines), 1-oxajulolidines, 1,2,5,6-tetrahydro-4H-pyrrolo]-3,2,1-ij]quinolines, 2,6-diamino-3-cyanopyridines, 2-aminothiazoles, 2-aminothiophenes, naphthylamines, 5,5-dimethyl-1,3-cyclohexane dione (dimedone), phenols, naphthols, or acetoacetarylides; with the proviso that two aliphatic hydroxy groups are present in the colorant.

Further preferred disazo compounds correspond to Formula (III)

$$R^3-N=N-R^4-N=N-Y \qquad (III)$$

wherein $R^3$ and the coupling component (Y) are as defined above and $R^4$ is a divalent aromatic radical selected from 1,4-phenylene, naphthalene-1,4-diyl, thiazol-2,5-diyl, and thiophene-2,5-diyl:

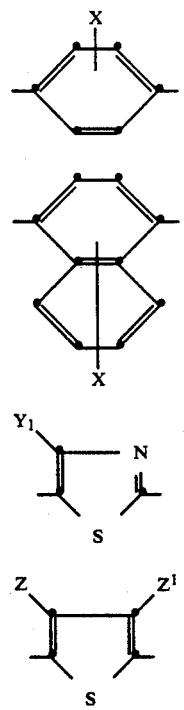

wherein

X is hydrogen or 1-2 groups selected from halogen, $C_1$–$C_4$ alkyl, $C_1$–$C_4$ alkoxy, —NHCOC$_1$–$C_4$ alkyl, —NHCO$_2$C$_1$–$C_4$ alkyl, —NHCO-aryl, —NHCONH-aryl, or —NHCONHC$_1$–$C_4$ alkyl;

$Y_1$ and Z are individually selected from hydrogen, $C_1$–$C_4$ alkyl, halogen, heteroaryl or aryl; and $Z^1$ is selected from hydrogen, $C_1$–$C_4$ alkoxycarbonyl, cyano, carbamoyl, aroyl, arylsulfonyl, —CONH-$C_1$–$C_4$ alkyl, or $C_1$–$C_4$ alkylsulfonyl; wherein the alkyl portion of the groups X, Y, and Z, are optionally substituted by one or more groups selected from $C_1$–$C_4$-alkoxy, halogen, aryl, cyano, $C_1$–$C_4$-alkanoyloxy, $C_1$–$C_4$-alkoxycarbonyl or hydroxy; provided that two aliphatic hydroxy groups are present.

Preferred azamethine and methine or arylidene compounds correspond to Formulae (IV), (V), (VI), (VII), (VIII) and (IX):

(IV)

(V)

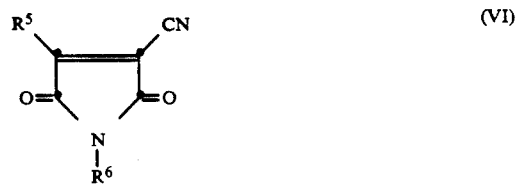
(VI)

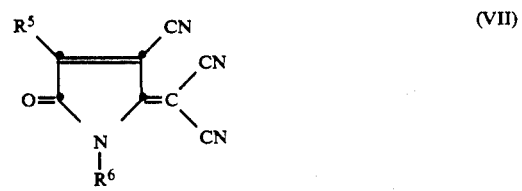
(VII)

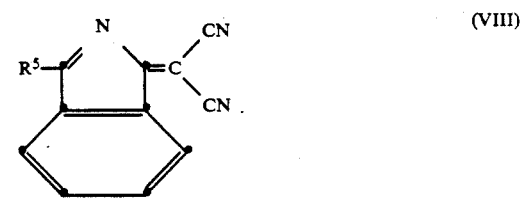
(VIII)

(IX)

wherein $R^5$ is the residue of an aniline, 1-naphthylamine, 1,2-dihydroquinoline, 1,2,3,4-tetrahydroquinoline, 1,3,3-trimethyl-2-methyleneindoline, 1,3-dihydro-2-methylene-1,1,3-trimethyl-2H-benz[e]indole, benzomorpholine (3,4-dihydro-2H-1,4-benzoxazine), 2,3-dihydroindole, 2-aminothiazole, julolidine (2,3,6,7-tetrahydro-1H,5H- benz-ij]quinolizine), 1-oxajulolidine, 4H-pyrrolo- [3,2,1-ij] quinoline, phenol, naphthol, thiophenol, pyrrole, pyrazole, furan, thiophene, carbazole, phenathiozine or phenoxazine;

$R^6$ is selected from hydrogen, $C_1$–$C_4$ alkyl, $C_3$–$C_8$ cycloalkyl, aryl, $C_1$–$C_4$-alkylene-aryl-, or $C_1$–$C_4$ alkylene-$C_3$–$C_8$ cycloalkylene, wherein the $C_1$–$C_4$ alkyl group is optionally substituted by one or more groups selected from hydroxy, halo, $C_1$–$C_4$ alkoxy, $C_1$–$C_4$ alkanoyloxy, or $C_1$–$C_4$ alkoxycarbonyl;

A is the residue of an active methylene compound selected from malonitrile, α-cyanoacetic acid esters, malonic acid esters, alpha cyanoacetic acid amides, α-$C_1$–$C_4$ alkylsulfonylacetonitriles, α-arylsulfonylacetonitriles, α-$C_1$–$C_4$ alkanoylacetonitriles, α-aroylacetonitriles, α-heteroarylacetonitriles, 1,3-indandione, 2(5H)-furanones, 3-cyano-1,6-dihydro-4-methyl-2,6-dioxy (2H)-pyridines, benzo (b) thieno-3- ylidenepropanedinitrile-5,5-dioxides, 1,3-bis(-dicyanomethylene)indanes, barbituric acid, 5-pyrazolones, dimedone, 3-oxo-2,3-dihydro-1-benzothiophene-1,1-dioxides, or aryl-$C(CH_3)C=C(CN)_2$.

Preferred azo-methine compounds correspond to Formula (X):

$$A=HC-R^4-N=N-Y \qquad (X)$$

wherein A, $R^4$, and Y are as defined above.

Preferred anthraquinone and anthrapyridone compounds correspond to colored compounds of Formulae (XI) and (XII), respectively:

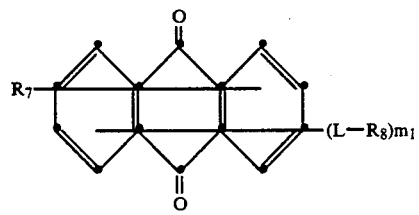
(XI)

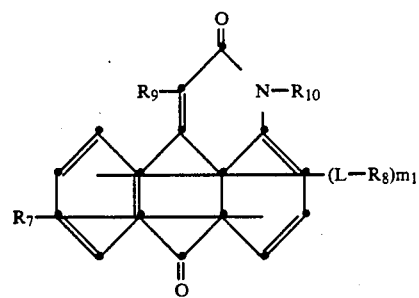
(XII)

wherein

L is a divalent linking moiety selected from —O—, —NH—, —S—, —SO$_2$—, —SO$_2$N(R$^{10}$)—, or —CO$_2$—;

$R^7$ is hydrogen or 1-4 groups selected from amino, —NHC$_1$-C$_4$-alkyl, —NHC$_3$-C$_8$-cycloalkyl, —NH-aryl, halo, C$_1$-C$_4$ alkoxy, aroyl, C$_1$-C$_4$ alkanoyloxy, aryloxy, C$_1$-C$_4$ alkylthio, arylthio, heteroarylthio, cyano, nitro, trifluoromethyl, —CO$_2$C$_1$-C$_4$-alkyl, —SO$_2$NHC$_1$-C$_4$ alkyl, —SO$_2$N(C$_1$-C$_4$ alkyl)$_2$, C$_1$-C$_4$ alkyl, or hydroxy;

$R^8$ is a hydrocarbyl radical selected from C$_2$-C$_4$-alkylene-(OH)$_m$, C$_2$-C$_4$-alkylene-L—C$_2$-C$_4$-alkylene-(OH)$_m$, arylene-(C$_1$-C$_4$-alkylene-OH)$_m$, arylene-(L—C$_1$-C$_4$-alkylene-OH)$_m$, arylene-L—C$_1$-C$_4$-alkylene(OH)$_m$, C$_2$-C$_4$-alkylene-L-arylene-L—C$_2$-C$_4$-alkylene(OH)$_m$, or C$_1$-C$_4$-alkylene-cycloalkylene-C$_1$-C$_4$-alkylene-OH;

$R^9$ is selected from hydrogen, cyano, C$_1$-C$_4$ alkylamino, C$_1$-C$_4$ alkoxy, halogen, —L—R$^8$, —CO$_2$C$_1$-C$_4$-alkyl, C$_1$-C$_4$ alkanoyl, aroyl, or arylsulfonyl;

$R^{10}$ is selected from hydrogen, C$_1$-C$_4$ alkyl, C$_1$-C$_4$ hydroxyalkyl, C$_3$-C$_8$ cycloalkyl, aryl, or R$^8$;

m is one or two;

$m_1$ is zero, one, or two; wherein the alkyl portion of the groups R$_7$, R$_8$, R$_9$ and R$_{10}$ are optionally substituted by one or more groups selected from C$_1$-C$_4$-alkoxy, halogen, aryl, cyano C$_1$-C$_4$-alkanoyloxy, C$_1$-C$_4$-alkoxycarbonyl or hydroxy; provided that two aliphatic hydroxy groups are present in the colorant and that when $m_1$ is zero, $-(L-R^8)m_1$ equals hydrogen.

In the above preferred azo, disazo and azo-methine compounds it is further preferred that Y be selected from the following formulae:

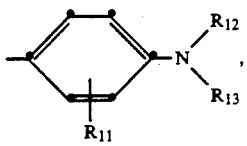

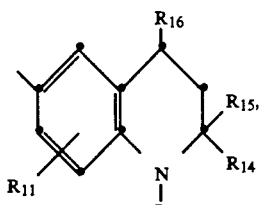

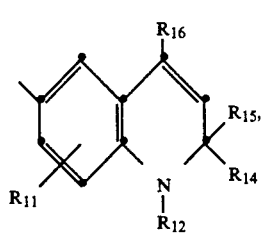

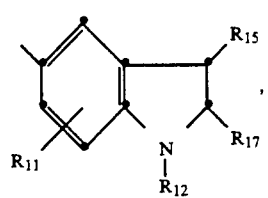

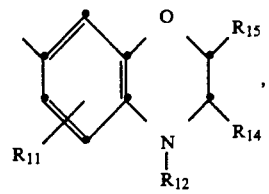

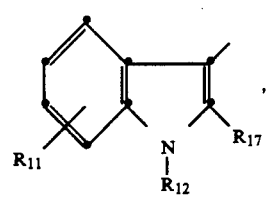

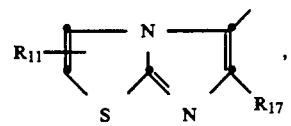

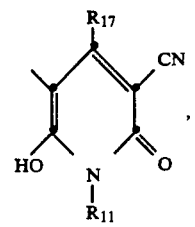

-continued

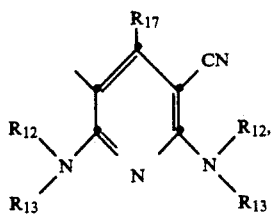

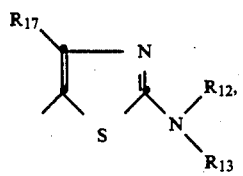

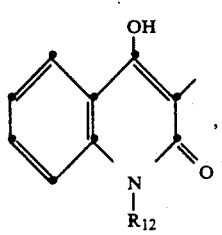

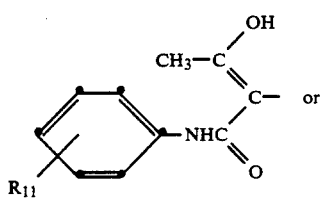

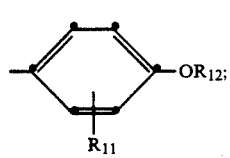

wherein $R_{11}$ is hydrogen or 1-2 groups selected from $C_1$-$C_4$ alkyl, $C_1$-$C_4$ alkoxy, O—$C_1$-$C_4$ alkylene-OH, $C_1$-$C_4$ alkylene-OH, $C_1$-$C_4$ alkylene-$C_1$-$C_4$ alkanoyloxy, halogen, $C_1$-$C_4$ alkanoylamino, $C_3$-$C_8$ cycloalkylcarbonylamino, $C_1$-$C_4$ alkylsulfonylamino, arylsulfonylamino or arylcarbonylamino;

$R_{12}$ and $R_{13}$ are independently selected from unsubstituted or substituted $C_1$-$C_{10}$ alkyl; unsubstituted or substituted $C_3$-$C_8$ cycloalkyl; $C_3$-$C_8$ alkenyl; $C_3$-$C_8$ alkynyl; aryl; or $R_{12}$ and $R_{13}$ may be combined with the nitrogen to which they are attached to form a Y radical having the formula

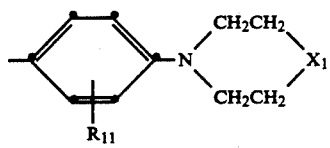

wherein $X_1$ is selected from a covalent bond, —$CH_2$—, —O—, —S—, —$SO_2$—, —C(O)—, —$CO_2$—, —N($C_1$-$C_4$ alkyl), —N(CO$C_1$-$C_4$ alkyl)-, —N($SO_2C_1$-$C_4$ alkyl)-, —N(CO-aryl)- or —N($SO_2$-aryl)-;

$R_{14}$, $R_{15}$, and $R_{16}$ are hydrogen or $C_1$-$C_4$ alkyl; and
$R_{17}$ is selected from hydrogen, unsubstituted or substituted $C_1$-$C_{10}$ alkyl, $C_3$-$C_7$-cycloalkyl, heteroaryl or aryl; with the provision that two aliphatic hydroxy groups are present in the light absorbing compound.

In the above preferred, azamethine, methine or arylidene compounds corresponding to Formula IV, V, VI, VII, VIII and IX it is further preferred that $R_5$ be selected from the following formulae:

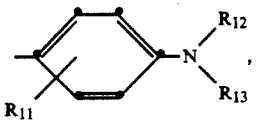

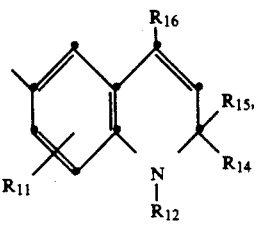

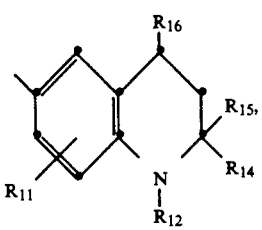

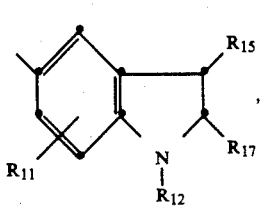

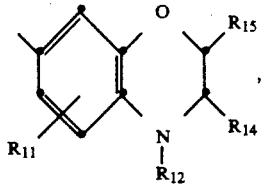

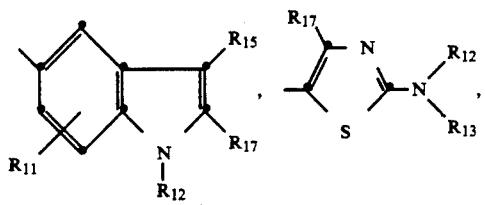

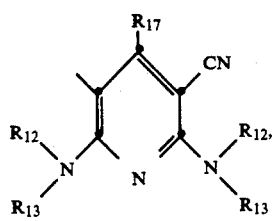

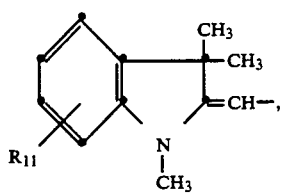

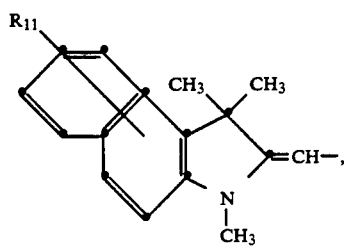

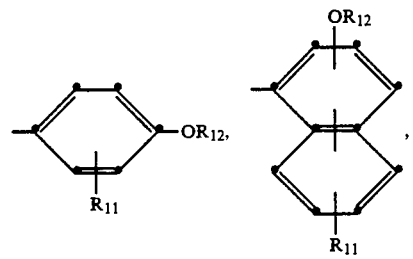

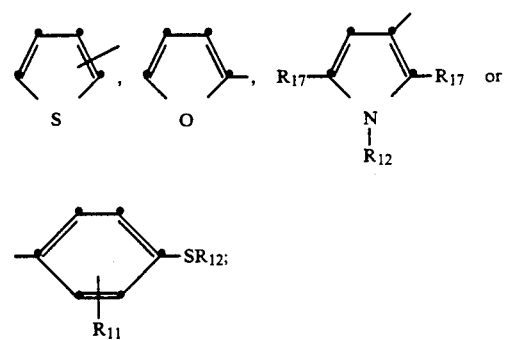

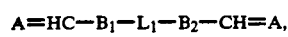

wherein
$R_{11}$, $R_{12}$, $R_{13}$, $R_{14}$, $R_{15}$, $R_{16}$ and $R_{17}$ are as defined above in the definition of Y; with the provision that two aliphatic hydroxyls be present.

The preferred polymethine light absorbing compounds correspond to the following formulae:

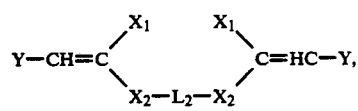

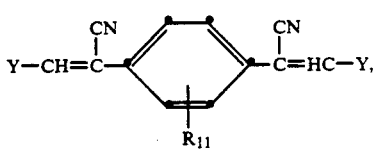

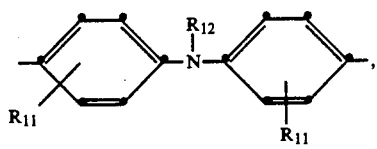

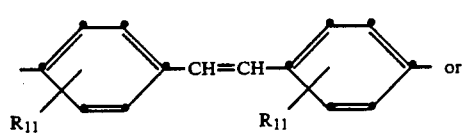

$Y-(CH=CH)_p-CH=A;$ wherein

A, $R_{11}$ and $R_{12}$ are as defined above; Y is as defined above for the preferred azo, diazo and azomethine compounds; $X_1$ is selected from cyano, aryl, heteroaryl, $C_1$-$C_4$-alkoxycarbonyl, arylsulfonyl or $C_1$-$C_4$-alkoxycarbonyl; $X_2$ is selected from $-CO_2-$, $SO_2$, $CON(R_{17})$ or arylene; $L_1$ is selected from a covalent bond; unsubstituted or substituted phenylene; $C_3$-$C_8$ cycloalkylene; $-O-$; $-S-$; $-SO_2-$; $-CO-$; $-CO_2-$; $-OCO_2-$; $-O_2C$-alkylene-$CO_2-$; $-O_2C$-arylene-$CO_2$; $-O_2C$-$C_3$-$C_8$-cycloalkylene-$CO_2-$; $-O_2CNH$-alkylene-$NHCO_2-$; $-O_2CNH$-arylene-$NHCO_2-$; $-SO_2N(R_{17})-$; $-SO_2$-alkylene-$SO_2-$; $-SO_2$-arylene-$SO_2-$; $-SO_2N(R_{17})$-alkylene-$N(R_{17})SO_2$; $-SO_2N(R_{17})$-arylene-$N(R_{17})SO_2$; $-N(-SO_2C_1-C_4$ alkyl)-; $-N$-$(SO_2$ aryl)-; $-O$-alkylene-$O-$ or $-O$-arylene-$O-$; $L_2$ is selected from unsubstituted or substituted alkylene, $C_3$-$C_8$ cycloalkylene, arylene, alkylene-arylene-alkylene, alkylene-($C_3$-$C_8$)cycloalkylene-alkylene, alkylene-$O$-alkylene, alkylene-$S$-alkylene, alkylene-$SO_2$-alkylene, alkylene-$O$-arylene-$O$-alkylene, alkylene-$N(SO_2 C_1-C_4$-alkyl) or alkylene-arylene; $B_1$ and $B_2$ are selected independently from the following formula:

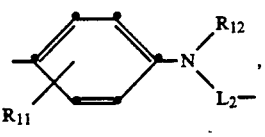

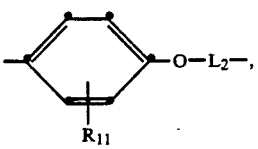

-continued

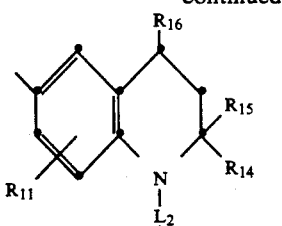

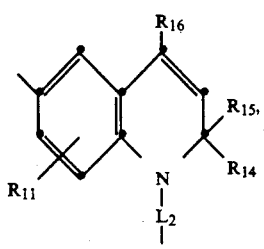

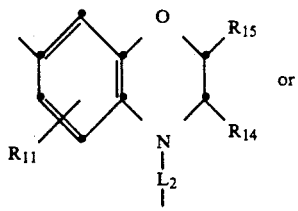

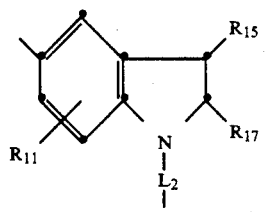

wherein $R_{12}$, $R_{14}$, $R_{15}$, $R_{16}$ and $R_{17}$ are as defined above; p is an integer of 1-3; with the proviso that two aliphatic hydroxy groups be present in the light absorbing compound.

Preferred coumarin compounds correspond to the following formulae:

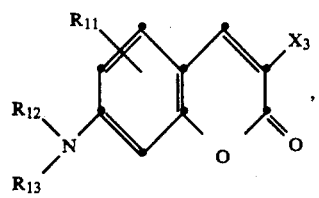

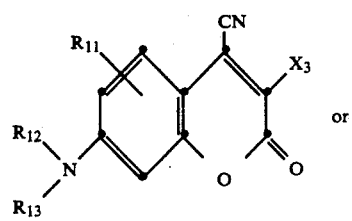

-continued

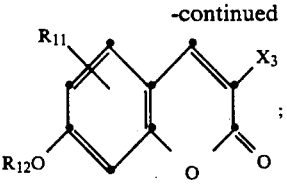

wherein $R_{11}$, $R_{12}$ and $R_{13}$ are as defined above; $X_3$ is selected from cyano, $C_1$–$C_4$-alkoxycarbonyl, $C_1$–$C_4$ alkylsulfonyl, aryl, arylsulfonyl, heteroaryl, formyl, aroyl, $C_1$–$C_4$-alkanoyl or —CH═A, wherein A is the residue of an active methylene compound as defined above; with the proviso that two aliphatic groups be present.

Typical diazotizable amines $R_3$—$NH_2$ useful in the preparation of azo, bisazo and azo-methine compounds are adequately disclosed in the literature, e.g.:

M. Weaver and L. Shuttleworth, Dyes and Pigments, 3 (1982) 81-121;

L. Shuttleworth and M. Weaver, Chem. Appl. Dyes, 1990, 107-63, edited by D. Waring and G. Hallas, Plenum, New York, N.Y.;

U.S. Pat. Nos. 3,438,961; 3,707,532; 3,816,388; 3,980,634; 4,049,643; 4,083,844; 4,105,655; 4,140,683; 4,180,503; 4,189,428; 4,207,233; 4,283,332; 4,400,318; 4,431,585; 4,621,136; 4,734,490; 4,751,288; and 4,760,133, incorporated herein by reference.

Typical coupling components Y useful in the preparation of azo, bisazo and azo-methine compounds are disclosed in the literature, e.g.:

H. R. Schwander, Dyes and Pigments, 3 (1982) 133-160;

L. Shuttleworth and M. Weaver, Chem. Appl. Dyes, 1990, 107-63, edited by D. Waring and G. Hallas, Plenum, New York, N.Y.;

U.S. Pat. Nos. 3,639,384; 3,657,215; 3,673,169; 3,829,410; 3,919,188; 3,980,634; 4,097,475; 4,119,621; 4,283,332; 4,341,700; 4,400,318; 4,431,585; 4,619,992; and 4,764,600, incorporated herein by reference.

Typical active methylenes used in the preparation of the methine, polymethine and azo-methine compounds are disclosed in the literature, e.g.:

U.S. Pat. Nos. 4,338,247; 4,617,373; 4,617,374; 4,707,537; 4,749,774; 4,826,903; 4,845,187; 4,950,732; and 4,981,516, incorporated herein by reference.

The reactive hydroxyalkyl groups are normally attached to the light absorbing chromogens by virtue of a covalent bond or one or more of the following linking groups: —O—, —S—, —SO—, —SO$_2$—, —CO$_2$—, —CON(R$_{17}$)—, —SO$_2$N(R$_{17}$)—, —CON═, —SO$_2$N═, —N(SO$_2$C$_1$–C$_4$-alkyl)—, —N(SO$_2$ aryl)— or —N═.

In the above definitions the unsubstituted and substituted $C_1$–$C_{10}$ alkyl groups mentioned refer to fully saturated hydrocarbon radicals containing one to ten carbons, either straight or branched chain, and such alkyl radicals substituted with one or more of the following:

$C_3$–$C_8$ cycloalkyl or $C_3$–$C_8$ cycloalkyl substituted with one or two of $C_1$–$C_4$ alkyl, $C_1$–$C_4$ alkylene-OH, lower alkoxy or halogen; phenyl and phenyl substituted with one or two of lower alkyl, lower alkoxy, halogen, lower alkanoylamino, cyano, nitro or lower alkylsulfonyl; $C_1$–$C_4$-alkylene-OH; O—$C_1$–$C_4$-alkylene-OH; cyano; halogen; 2-pyrrolidino; phthalimidino; vinylsulfonyl; acrylamido; o-benzoic sulfimido; lower alkoxyalkoxy; cyanoalkoxy; phenoxy; phenoxy substituted with lower alkyl, lower alkoxy, or halogen; groups of the formulae:

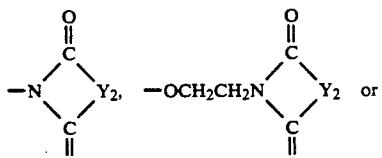

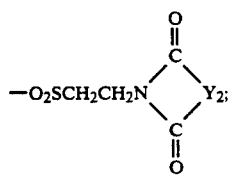

wherein $Y_2$ is selected from o-phenylene; o-phenylene substituted with lower alkyl, lower alkoxy, halogen or nitro; $C_2$–$C_3$ alkylene; vinylene; —O—CH$_2$—; —OCH$_2$CH$_2$—; —CH$_2$OCH$_2$; —S—CH$_2$—; —CH$_2$SCH$_2$—; NHCH$_2$—; —NHCH$_2$CH$_2$—; —N(alkyl)CH$_2$—; —N(alkyl)CH$_2$CH$_2$— or NHC(C$_6$H$_5$)$_2$; groups of the formulae:

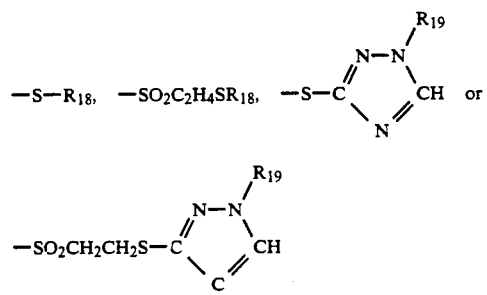

wherein $R_{18}$ is selected from lower alkyl; $C_3$–$C_8$ cycloalkyl; phenyl; phenyl substituted with one or more groups selected from lower alkyl, lower alkoxy or halogen; a heterocyclic radical selected from pyridyl; pyrimidinyl; benzoxazolyl; benzothiazolyl; benzimidazolyl; 1,3,4-thiadiazolyl, 1,3,4-oxadiazolyl; said heterocyclic radicals further substituted with one or more groups selected from lower alkyl, lower alkoxy carbamoyl, carboxy, lower alkoxy or halogen;

$R_{19}$ is selected from hydrogen, $C_1$–$C_4$-alkylene-OH, lower alkyl or benzyl; groups of the formulae:

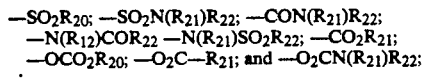

wherein $R_{20}$ is selected from $C_3$–$C_8$ cycloalkyl; $C_3$–$C_8$ cycloalkyl substituted with $C_1$–$C_4$ alkyl; allyl; phenyl; phenyl substituted with one or two groups selected from lower alkyl, lower alkoxy or halogen; lower alkyl; lower alkyl substituted with one or more groups selected from lower alkoxy, halogen, hydroxy, lower carbalkoxy, lower alkanoyloxy, cyano, $C_3$–$C_8$ cycloalkyl, aryl, aryloxy, arylthio, lower alkylthio or lower alkylsulfonyl; and $R_{21}$ and $R_{22}$ are each independently selected from hydrogen or those groups represented by $R_{20}$.

In the terms "lower alkyl", "lower alkoxy", "lower alkoxycarbonyl", "lower alkylthio", "lower alkylsulfonyl", "lower alkanoylamino" and "lower alkanoyloxy", the alkyl portion of the group contains one to four carbons and may contain as substituents one or two groups selected from $C_1$–$C_4$-alkoxy, halogen, hydroxy, cyano or phenyl and may denote a straight or branched chain.

The term "lower alkylene" denotes a straight or branched chain divalent hydrocarbon moiety containing one to four carbon atoms.

The term "alkylene" denotes a straight or branched chain divalent hydrocarbon moiety containing one to ten carbons.

The term "carbamoyl" is used to represent —CONH$_2$, —CONHR$_{12}$ or CON(R$_{12}$), wherein R$_{12}$ is as defined herein above.

The term "cycloalkylene" is used to represent a fully saturated divalent hydrocarbon radical containing three to eight carbons, e.g., 1,4-cyclohexylene.

The unsubstituted and substituted $C_3$–$C_8$ cycloalkyl groups mentioned above refer to cycloaliphatic hydrocarbon groups which contain 3 to 8 carbons in the ring, preferably 5 or 6 carbons, and these cycloalkyl groups substituted with one or two of $C_1$–$C_4$ alkyl, $C_1$–$C_4$ alkoxy, hydroxy or $C_1$–$C_4$ alkanoyloxy.

The term "aryl" is used to include carbocyclic aryl groups containing up to fourteen carbons, e.g., phenyl and naphthyl, and those substituted with one or two groups selected from $C_1$–$C_4$-alkyl, $C_1$–$C_4$ alkoxy, $C_1$–$C_4$-alkoxycarbonyl, $C_1$–$C_4$-alkanoyloxy, $C_1$–$C_4$-alkanoylamino, halogen, cyano, nitro, $C_1$–$C_4$-alkylsulfonyl, $C_1$–$C_4$-alkylene-(OH)$_n$, O—$C_1$–$C_4$-alkylene-(OH)$_n$, —S—$C_1$–$C_4$-alkylene-(OH)$_n$, —SO$_2$—$C_1$–$C_4$-alkylene-(OH)$_n$, —CO$_2$—$C_1$–$C_4$-alkylene-(OH)$_n$, SO$_2$N(R$_{17}$)C$_1$–C$_4$-alkylene-(OH)$_n$, —SO$_2$N(C$_1$–C$_4$-alkylene-OH)$_2$, —CON(R$_{17}$)C$_1$–C$_4$-alkylene-(OH)$_n$, —CON(C$_1$–C$_4$-alkylene-OH)$_2$, —N(SO$_2$C$_1$–C$_4$-alkyl)-alkylene-(OH)$_n$ or —N(SO$_2$ phenyl)-C$_1$–C$_4$-alkylene-(OH)$_n$; wherein n is one or two.

The term "heteroaryl" is used to describe a 5 or 6-membered heterocyclic aromatic ring containing one oxygen atom, and/or one sulfur atom, and/or up to three nitrogen atoms, said heterocyclic aryl ring optionally fused to one or two phenyl rings or another 5 or 6-membered heteroaryl ring. Examples of such ring systems include thienyl, furyl, pyrrolyl, imidazolyl, pyrazolyl, thiazolyl, isothiazolyl, oxazolyl, isoxazolyl, triazolyl, thiadiazolyl, oxadiazolyl, tetrazolyl, thiatriazolyl, oxatriazolyl, pyridyl, pyrimidyl, pyrazinyl, pyridazinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo [1,5-b]-pyridazinyl and purinyl, benzoxazolyl, benzothiazolyl, benzimidazolyl, indolyl, and the like and those rings substituted with one or more substituents listed above in the definition of the term "aryl".

The term "arylene" is used to represent a divalent carbocylic aryl hydrocarbon moiety containing up to fourteen carbons, e.g., o-, m- and p-phenylene, and those substituted with one or two groups selected from $C_1$–$C_4$-alkyl, $C_1$–$C_4$-alkoxy or halogen.

The $C_3$–$C_8$ alkenyl and $C_3$–$C_8$ alkynyl groups represent straight or branched chain hydrocarbon radicals containing 3 to 8 carbons in the chain and which contain a carbon-carbon double bond or a carbon-carbon triple bond, respectively.

The term "light absorbing compound" is used to describe an organic compound which absorbs light in the regions of the electromagnetic spectrum usually referred to as the near infrared, near ultraviolet and visible, more particularly between the wavelengths of 300-1200 nm.

The light absorbing polyurethane compositions of the invention may be prepared by reacting one or more of the light absorbing compounds described above, which contains reactive aliphatic hydroxyl groups, with a diisocyanate and additional diol component if desired, such as a $C_2$-$C_{12}$ glycol, under solution polymerization procedures known to be useful for preparing polyurethanes in general (see, for example, D. J. Lyman, Journal of Polymer Science, Vol. XLV, pp. 49-59 (1960)). Typical useful diisocyanates include 2,4-tolylene diisocyanate, 2,6-tolylene diisocyanate, mixtures of 2,4 and 2,6-tolylene diisocyanate, 4,4'-biphenylene diisocyanate, p-xylylene diisocyanate, methylenedi-p-phenyl diisocyanate, m-phenylene diisocyanate, p-phenylene diisocanate, hexamethylene diisocyanate, isophorone diisocyanate, 4,4'-diisocyanatodiphenyl ether, bis(4-isocyanatophenyl)sulfone, isopropylidene bis(4-phenyl isocyanate), naphthalene-1,5-diisocyanate, 1-chloro-2,4-phenylene diisocyanate, 3,3'-bitolylene-4,4'-diisocyanate, 3,3'-dimethoxy-4,4'-biphenylene diisocyanate, 3,3'-dichloro-4,4'-biphenylene diisocyanate, 2,2',5,5'-tetramethyl-4,4'-biphenylene diisocyanate, diphenylethane-4,4'-diisocyanate, dicyclohexylmethane-4,4'-diisocyanate, and the like.

The diol components are preferably selected from ethylene glycol, 1,2-propanediol, 1,3-propanediol, 2-methyl-1,3-propanediol, 1,4-butanediol, 2,2-dimethyl-1,3-propanediol, 1,6-hexanediol, 1,10-decanediol, 1,12-dodecanediol, 1,2-cyclohexanediol, 1,3-cyclobutanediol, 2,2,4,4-tetramethylcyclobutane-1,3-diol, 1,4-cyclohexanediol, 1,2-cyclohexanedimethanol, 1,3-cyclohexanedimethanol, 1,4-cyclohexanedimethanol, x,8-bis(hydroxymethyl)-tricyclo-[5.2.1.0]-decane, wherein x represents 3, 4, or 5; and diols containing one or more oxygen or sulfur atoms in the chain, e.g., diethylene glycol, 2,2'-thiodiethanol, triethylene glycol, dipropylene glycol, tripropylene glycol, 1,3- and 1,4-bis(2-hydroxyethyl)benzene and the like. In general, these diols contain 2 to 18, preferably 2 to 12 carbon atoms. Cycloaliphatic diols can be employed in their cis or trans configuration or as mixtures of both forms. A particularly preferred diol is 1,4-butanediol.

Although it is within the scope of the invention that all of the diol component consists of a light absorbing compound, normally no more than 75 mole percent of the diol component consists of the light absorbing compound, with the range of 5-50 mole percent being more typical.

In the preparation of the colored polyurethanes, it may be desirable to react the terminal isocyanate groups with water to give carbamic acid groups which lose carbon dioxide with the formation of amine groups or to react the terminal isocyanate groups with amines to produce ureas or with alcohols to give urethane groups. (J. M. Buist and H. Gudgeon, editors, *Advances in Polyurethane Technology*, Elsevier Publishing Co., London, 1970, p. 5).

As a further aspect of the present invention, there is provided a light-absorbing thermoplastic polymer composition, which comprises one or more thermoplastic polymers having blended therein one or more light-absorbing polyurethane(s) of Formula (I) above.

A wide range of thermoplastic polymers useful for blending with the light-absorbing polyurethanes in the practice of the present invention are known in the art and includes the homopolymers and copolymers of polyesters, e.g., poly(ethylene terephthalate); polyolefins, e.g., polypropylene, polyethylene, linear low density polyethylene, polybutylene, and copolymers made from ethylene, propylene and/or butylene; copolymers from acrylonitrile, butadiene, and styrene; copolymers from styrene and acrylonitrile; polyamides, e.g., Nylon 6 and Nylon 66; polyvinyl chloride; (other) polyurethanes; polyvinylidene chloride; polycarbonates; cellulose esters, e.g., cellulose acetate, propionate, butyrate, or mixed esters; polyacrylates, e.g., poly(methyl methacrylate); polyimides; polyester-amides; polystyrene; etc.

According to the present invention the light-absorbing polyurethanes are incorporated into the thermoplastic polymers using conventional techniques, e.g., solution or melt-blending, such as those employed to incorporate other additives in such polymers (see R. Gachter and H. Muller, Editors, *Plastics Additives Handbook*, Hansu Publishers, New York, 1985, pp. 507-533; 729-741). For example, the colored polyurethanes may be dry blended in the form of pellets or ground powders with or without an adhesion promoter or a dispersing agent. This premix can be subsequently processed on extruders or injection molding machines. Other conventional additives such as plasticizers, antioxidants, stabilizers, nucleating agents, flame retardants, lubricants, etc. may also be present in the polymer compositions of the present invention.

As a general proposition, it is known that attempts to blend thermoplastic polymers often results in a blend with inferior physical properties. (See for example, *Encyclopedia of Polymer Science and Engineering*, Vol. 12, p. 399, Ed. by H. F. Mack et al., John Wiley and Sons, Inc., New York (1988).)

However, the present invention provides light-absorbing polymeric thermoplastic blends wherein the blends do not appreciably differ in physical properties from the discrete polymers.

It should also be appreciated that a multiplicity of colors of colored polyurethanes may be obtained by combining individual colors, e.g., subtractive colors such as yellow, magenta and cyan according to known color technology (see N. Ohta, *Photographic Science and Engineering*, Volume 15, No. 5, Sept.-Oct. 1971, pp. 395-415).

The particular chromophore groups present will, of course, determine the color (hue+value+chroma) of the polyurethane composition and finally the color (hue+value+chroma) of the thermoplastic polymer blends of the present invention. A large gamut of colors may be obtained, as noted above.

The actual amount of the colored polyurethane used to color the thermoplastic polymer will depend on the inherent tinctorial strength of the copolymerized colorant, the weight percent of the colorant in the colored polyurethane composition and the desired depth of shade. Typically, the amount of colored polyurethane added to the thermoplastic polymer is such that the total amount of colorant residue present by weight in the final thermoplastic blend is from about 0.001% to about 10%, preferably from about 0.01% to about 5%. The colored thermoplastic polymer blends thus provided by the present invention are useful as thick and thin plastic films, plastic sheeting, molded plastic articles, containers, and fibers.

The present invention thus provides a solution to the problems associated with the toxicity of organic pigments and solvent dyes routinely used to impart color and/or UV-absorbing properties to thermoplastic materials; because the light-absorbing moiety (Formula (I)) of the present invention is copolymerized, the danger of human skin exposure to potentially toxic colorants is alleviated, since the colorants will not be leachable, sublimable, extractable, migratable, or be exuded from the thermoplastic blend. Another consequence of the present invention is the obtainment of nonhazardous light-absorbing thermoplastic compositions having good brilliance, clarity and fastness to sunlight, high heat stability, excellent homogeneity of light-absorber, and which normally maintain the desirable physical properties of the uncolored thermoplastic materials.

The polymers of this invention are easily ground to very fine powder forms by conventional dry grinding processes or liquid milling processes using grinding agents. Using air attrition grinding technology, average particle sizes of 1–4 microns are easily obtained. At average particle sizes <4 microns, these polymers have excellent light absorption properties and are useful as colorants or near ultraviolet absorbers when dispersed in ink or coating compositions. For example, in various aqueous formulations these polymeric pigments can be substituted for conventional pigments with the following new performance advantages: permanence (non-extractable, non-diffusing, non-bleeding, non-chalking), safety (non-toxic, non-staining and non-penetrating on human skin, less problems with waste disposal), stability (no aggregation, agglomeration, flocculation, settling on storage), and economics (greater strength than inorganic pigments and many organic pigments, easier, clean-up, less variability in mixtures due to pigment interactions, speed and reproducibility of production batches of a given pigment mixture.)

Our novel color concentrates and their preparation are further illustrated by the following examples. The inherent viscosities specified herein are determined at 25° C. using 0.5 g of polymer (polyester light-absorbing concentrate) per 100 mL of a solvent consisting of 60 weight percent phenol and 40 weight percent tetrachloroethane. The weight average molecular weight (Mw) and number average molecular weight (Mn) values referred to herein are determined by gel permeation chromatography. The melting temperatures are determined by differential scanning calorimetry on the first and/or second heating cycle at a scanning rate of 20° C. per minute and are reported as the peaks of the transitions.

EXPERIMENTAL SECTION

Example 1

To a solution of 1,5-bis[(2,2-dimethyl-3-hydroxypropyl) amino] 9,10-anthraquinone (5.13 g, 0.0125 mole) and 1,4-butanediol (3.38 g, 0.0375 mole) dissolved in N,N-dimethylformamide (100 mL) was added dropwise tolylene 2,4-diisocyanate (8.70 g, 0.05 mole) with good stirring. The exothermic reaction which followed raised the temperature from about 23° C. to about 35° C. The reaction temperature was increased to about 80° C. and stirring continued at this temperature for 0.5 h and the temperature then allowed to come to room temperature. With stirring, the reaction mixture was added dropwise to 400 mL of water. The red polymeric solid thus produced was collected by filtration, washed with water and dried in air (yield = 17.2 g, 99.9% of theoretical yield). Thin-layer chromatography (1:1 tetrahydrofuran:cyclohexane) showed only a very slight amount of unreacted starting material (colorant) left. The polyurethane colorant composition had an inherent viscosity of 0.127, a weight average molecular weight of 10,969, a number average molecular weight of 5,224 and a polydispersity value of 2.1 and contained about 29.8 weight percent of the anthraquinone colorant residue.

Example 2

To a solution of 1,4-bis[(2-hydroxyethyl)amino]-9,10-anthraquinone (4.08 g, 0.0125 moles) and 1,4-butanediol (3.38 g, 0.0375 moles) dissolved in N,N-dimethylformamide (100 mL) was added with good stirring tolylene 1,4-diisocyanate (3.38 g, 0.0525 moles). The temperature then rose to about 35° C. without any external heat source. The temperature was then increased to about 80° C. and maintained at 80°-85° C. for 0.5 h with stirring. After being cooled, the reaction mixture was added dropwise to water (600 mL) and stirring was continued for 0.5 h. The resulting dark blue polymeric solid was collected by filtration, reslurried in water, refiltered, washed with water, and dried in air (yield = 16.0 g, 99.1% of the theoretical yield) and had an inherent viscosity of 0.159, a weight average molecular weight of 13,214, a number average molecular weight of 6,249, and a polydispersity value of 2.1, and contained approximately 25.2 weight percent of anthraquinone colorant residue.

Example 3

To a solution of [[4-[bis[2-hydroxyethyl]amino]2-methylphenyl]methylene propanedinitrile (3.39 g, 0.0125 mole) and 1,4-butanediol (3.38 g, 0.0375 mole) in N,N-dimethylformamide (100 mL) was added dropwise tolylene 2,4-diisocyanate (9.14 g, 0.0525 mole) with stirring. The temperature then rose to about 35° C. External heat was then applied and the temperature of the reaction mixture was kept at 80°-85° C. for 0.5 h. After cooling, the reaction mixture was added dropwise to water (600 mL) and stirring was continued for 0.5 h. The methine yellow polymeric colorant composition thus obtained was collected by filtration and washed with water. The filter cake was reslurried once in water containing a few drops of conc. HCl, refiltered, washed with water and dried at 50° C. in a vacuum oven under nitrogen. The yield of the yellow colorant composition thus obtained was 15.36 g, 99.3% of the theoretical yield. When tested, the polymer composition had an inherent viscosity of 0.168, a melting temperature of 114° C., a weight average molecular weight of 22,795, a number average molecular weight of 8,977 and a polydispersity of 2.54 and contained about 21.9 weight percent of the methine colorant residue.

Example 4

To a solution of 1,4-bis[(2-hydroxyethyl)amino]-5,8-di-hydroxy-9,10-anthraquinone (4.48 g, 0.0125 mole) and 1,4-butanediol (3.38 g, 0.0375 mole) dissolved in N,N-dimethylformamide (100 mL) was added dropwise tolylene 2,4-diisocyanate (9.14 g, 0.0525 mole) and the temperature rose to about 36° C. Stirring was continued for about 15 minutes and the reaction mixture heated at 80°-85° C. for about 0.5 h. Heating was discontinued and the reaction mixture stirred for two hours longer and then added dropwise to water (600 mL) with stirring. After being stirred for 30 minutes longer, the reaction mixture was filtered and the anthraquinone polymeric colorant composition washed with water, reslurried in water, refiltered and washed with water and dried at 50° C. in a vacuum oven under nitrogen. The yield of greenish-blue polymeric colorant composition was essentially quantitative. When tested, the polymer compoistion had an inherent viscosity of 0.112, a weight average molecular weight of 10,616, a number average molecular weight of 6,233, and a polydispersity value of 1.70. A melting temperature of 93,4° C. was observed by Differential Scanning Calorimetry. The colored polyurethane composition contained approximately 27.1 weight percent of the anthraquinone colorant residue.

Example 5

A solution of N,N-bis(2-hydroxyethyl)-4-[(6-methylsulfonylbenzothiazol-2-yl)azo] aniline (5.25 g, 0.0125 mole) and 1,4-butanediol (3.38 g, 0.0375 mole) was dissolved in N,N-dimethylformamide (100 mL) and treated dropwise with tolylene 2,4-diisocyanate (9.14 g, 0.0525 mole). The temperature rose to about 35° C. External heat was applied and the temperature kept at 80°-85° C. for 30 minutes with stirring continued. Heating was discontinued and the reaction mixture allowed to cool to room temperature and drowned gradually into water (600 mL) with stirring. The polymeric product was collected by filtration, washed with water, reslurried in water, refiltered, washed further with water and dried in air. The red azo polymeric colorant composition was obtained in 91% of the theoretical yield (15.8 g) and had a melting temperature of 93° C., an inherent viscosity of 0.112, a weight average molecular weight of 10,616, a number average molecular weight of 6,233 and a polydispersity value of 1.70 and contained about 30 weight percent of azo colorant residue.

Example 6

To a solution of 1,5-bis[(2,2-dimethyl-3-hydroxypropyl)amino]-9,10-anthraquinone (5.13 g, 0.0125 mole) and 1,4-butanediol (3.38 g, 0.0375 mole) dissolved in N,N-dimethylformamide (100 mL) was added methylenedi-p-phenyl diisocyanate (13.13 g, 0.0525 mole) portionwise with stirring. The temperature rose to about 32° C. Reaction temperature was then increased and held at 80°-85° C. for 0.5 h and then heat was removed and stirring continued overnight at room temperature. The reaction mixture was added dropwise with stirring to water (600 mL) and the product collected by filtration, washed with water, reslurried in 600 mL of water, refiltered, washed with additional water, reslurried in acetone (600 mL), refiltered, washed with acetone, and dried in air. When tested, the red polymeric colorant composition had an inherent viscosity of 0.189, a melting temperature of 147° C., a weight average molecular weight of 18,792, a number average molecular weight of 10,454, a polydispersity value of 1.80 and contained about 24.4 mole percent of the anthraquinone colorant residue.

Example 7

Poly(ethylene terephthalate) (400 g) having an inherent viscosity of about 0.71, which had been ground using a Wiley mill to a particle size of about 2 mm, was dry blended with 0.4 g of polymeric red colorant composition of Example 1 and ethylene glycol (0.5 g). This blend was dried in a vacuum oven at 110° C. for 16 h. A 15 mil film was prepared using a C. W. Brabender ⅜ in. extruder at 280° C. A transparent red film was produced thereby—indicating the solubility of the polymeric red colorant. No sublimation of the colorant was observed and good color development was the result.

Example 8

Example 7 is repeated using 0.20 g of the yellow methine polymeric colorant composition of Example 3 to produce a bright yellow transparent film having good color development.

Example 9

Example 7 is repeated using 0.12 g of the blue anthraquinone polymeric colorant composition of Example 2 to produce a transparent blue film having good color development.

Example 10

TENITE ® 423-S polypropylene (Eastman Kodak Company) (300 g), which had been granulated on a Wiley mill using a 2 mm screen was dry blended with 0.30 g of polymeric red colorant of Example 1 and the blend extruded on a C. W. Brabender ⅜ in. extruder at 240° C. to produce a red 15 mil film having good color development. No loss of colorant by volatilization or sublimation was observed.

Example 11

Example 10 is repeated using 0.30 g of the yellow methine colorant composition of Example 3.

Example 12

Example 10 is repeated using 0.30 g of the blue anthraquinone colorant composition of Example 2 to provide a blue film.

Example 13

To a solution of 3-acetamido-N,N-bis(2-hydroxyethyl)-4[(4-cyano-3-methylisothiazol-5-yl)azo]aniline (31.8 g, 0.0819 mol) and 1,4-butanediol (19.6 g, 0.218 mol) dissolved in N,N-dimethylformamide (400 mL) was added with good stirring tolylene 2,4-diisocyanate (52. g, 0.30 mol), allowing the temperature to rise. The reaction mixture was then heated and stirred at 85°-90° C. for about 0.5 h and allowed to cool to room temperature. Additional N,N-dimethylformamide (300 mL) and methanol (150 mL) were added with stirring. Upon drowning the solution in water (2.5 L), a dark red solid resulted which was collected by filtration, washed with water (2.0 L) and dried in air. The yield was 100.0 g (96.5% of theoretical yield) of a red polymeric colorant which has an inherent viscosity of 0.174, a weight average molecular weight of 12,126, a number average molecular weight average of 7,631, a polydispersity of 1.59 and contains approximately 30.7 weight percent of azo colorant residue. An absorption mamimum (lambda max) at 552 nm is observed in the visible spectrum in N,N-dimethylformamide.

Example 14

To a solution of 1,5-bis[(2-hydroxyethyl)thio]-9,10-anthraquinone (15.0 g, 0.0416 mol) and 1,4-butanediol (9.30 g, 0.1034 mol) dissolved in N,N-dimethylformamide (300 mL) was added with good stirring tolylene 2,4-diisocyanate (25.23 g, 0.145 mol), while allowing the temperature to rise. The temperature was increased to about 80° C. and maintained at 80°–85° C. for 0.5 h. After cooling, the reaction mixture was added dropwise to an ice/water mixture (2.0 L) and stirring continued for 0.5 h. The polymeric colorant thus produced was collected by filtration, reslurried in water (1.0 L), refiltered, washed with water and dried in air in essentially quantitative yield. The reddish-yellow polymeric colorant has an inherent viscosity of 0.202, a melting temperature of about 115° C., a weight average molecular weight of 12,675, a number average molecular weight of 6,787, a polydispersity value of 1.87 and contained approximately 30.3 weight percent of the anthraquinone colorant residue. An absorption maximum (lambda max) at 448 nm is observed in the visible spectrum in N,N-dimethylformamide.

Example 15

A greenish-blue polyurethane colorant was prepared by reacting 1,4-bis[4-(2-hydroxyethoxy)anilino]-9,10-anthraquinone (5.3 g, 0.0104 mol), 1,4-butanediol (3.56 g, 0.0396 mol) and tolylene 2,4-diisocyanate (8.70 g) in N,N-dimethylformamide (100 mL) as described in Example 14 and the product isolated in a similar manner. The colorant was obtained in 92.8% of the theoretical yield and has an inherent viscosity of 0.198, a melting temperature of about 100° C., a weight average molecular weight of 11,021, a number average molecular weight of 6,551, a polydispersity of 1.68 and contained approximately 30.2 weight percent of the anthraquinone colorant residue. Absorption maxima are observed at 420 nm and 642 nm in the visible spectrum in N,N-dimethylformamide.

Example 16

A polyurethane colorant containing about 30.7 weight percent of an anthrapyridone red colorant residue was prepared by reacting 18.0 g (0.0338 mol) of the compound having the structure

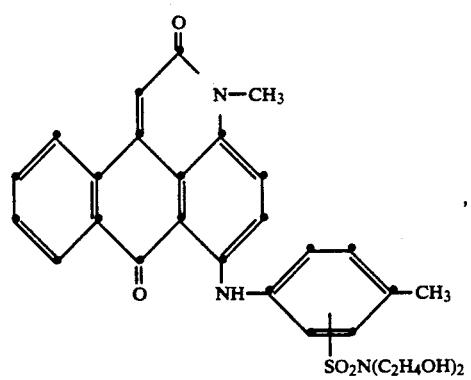

1,4-butanediol (11.8 g, 0.131 mol), tolylene 2,4-diisocyanate (28.71 g, 0.165 mol) dissolved in N,N-dimethylformamide (300 mL) and the resulting product isolated in a manner analogous to Example 14. The bright red polymeric colorant (56.0 g, 95.7% of the theoretical yield) has an inherent viscosity of 0.161, a melting temperature of 112° C., a weight average molecular weight of 5,712, a number average molecular weight of 3,864 and a polydispersity value of 1.48. An absorption maximum is observed at 535 nm in the visible spectrum in N,N-dimethylformamide.

Example 17

A polyurethane colorant containing about 1.1 weight percent of a triphenodioxazime colorant residue was prepared by reacting 0.15 g (0.00032 mol) of a compound having the formula

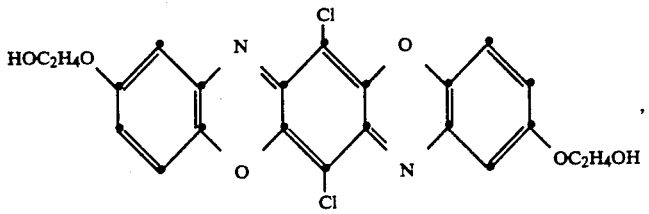

1,4-butanediol (4.47 g, 0.0497 mol), tolylene 2,4-diisocyanate (8.7 g, 0.05 mol) dissolved in N,N-dimethylformamide (100 mL) and the product isolated in a manner analogous to that of Example 14. The pink polymeric colorant (11.5 g, 86.3 % of the theoretical yield) has an inherent viscosity of 0.128, a melting temperature of 88.5° C., a weight average molecular weight of 8,314, a number average molecular weight of 5,952, and a polydispersity value of 1.40. Absorption maxima are observed at 505 nm and 539 nm in the visible spectrum in N,N-dimethylformamide.

Example 18

A polyurethane colorant containing about 30.3 weight percent of a copper phthalocyanine colorant residue was prepared by reacting 5.5 g of a copper phthalocyanine colorant represented largely by the formula $CuPc[SO_2NHCH_2C(CH_3)_2CH_2OH]_{2.5}$, wherein CuPc represents the copper phthalocyanine portion of the structure, 1,4-butanediol (3.95 g, 0.0439 mol), tolylene 2,4-diisocyanate (8.7 g, 0.05 mol) dissolved in N,N-dimethylformamide (100 mL) and the product isolated in a manner analogous to that of Example 14. The bright cyan polymeric colorant (16.9 g, 87.6% of the theoretical yield) has an inherent viscosity of 0.129, a melting temperature of about 99° C., a weight average molecular weight of 9,162, a number average molecular weight of 5,848, and a polydispersity value of 1.57. In the visible absorption spectrum in N,N-dimethylformamide, an absorption mamimum is observed at 676 nm.

Example 19

A polyurethane colorant containing about 1.1 weight percent of a blue azo colorant was prepared by reacting 3-acetamido-N,N-bis(2-hydroxyethyl)-4-[(5-nitrothiazol-2-yl)azo] aniline (0.15 mol, 0.000381 g), 1,4-butanediol (4.47 g, 0.0496 mol), tolylene 2,4-diisocyanate (8.70 g, 0.05 mol) dissolved in N,N-dimethylformamide (100 mL) and the product isolated in a manner analogous to that of Example 14. The blue polymeric colorant (12.7 g, 95.3% of the theoretical yield) has an inherent viscosity of 0.245, a melting temperature of 89°

C., a weight average molecular weight of 16,558, a number average molecular weight of 9,376, and a polydispersity value of 1.76. An absorption maximum is observed at 599 nm in the visible spectrum in N,N-dimethylformamide.

Example 20

A polyurethane colorant containing about 1.1 weight percent of a blue azo colorant was prepared by reacting 3-acetamido-4-[(2,6-dicyano-4-nitrophenyl)azo]-N-(2,3-dihydroxypropyl)-N-ethylaniline (0.15 g, 0.00033 mol), 1,4-butanediol (4.47 g, 0.0497 m), tolylene 2,4-diisocyanate (8.7 g, 0.05 mol) dissolved in N,N-dimethylformamide (100 mL) in a manner analogous to that of Example 14. The resulting blue polymeric colorant (9.60 g, 72% of the theoretical yield) has an inherent viscosity of 0.206, a melting temperature of 88° C., a weight average molecular weight of 13,780, a number average molecular weight of 9,596, and a polydispersity value of 1.44. An absorption maximum is observed at 618 nm in the visible spectrum in N,N-dimethylformamide.

Example 21

A stirred solution of 4-(2,6-dichloro-4-nitrophenylazo)-N,N-di-(2-hydroxyethyl)aniline (4.0 g, 0.0100 m), 5-acetamido-4-(2-bromo-4,6-dinitrophenylazo)-N,N-di-(2-hydroxyethyl)-2-methoxyaniline (6.0 g, 0.0111 m), 1,4-butanediol (12.4 g, 0.138 m) and N,N-dimethylformamide (200 ml) was treated with tolylene 2,4-diisocyanate (27.7 g, 0.159 m) at room temperature and then heated at 85°-90° C. for 0.5 hour. Methanol (15 ml) was added to the solution after cooling to room temperature. The black polyurethane powder was obtained by drowning the reaction mixture into water with stirring. A small amount of saturated sodium chloride solution was added to facilitate filtration and the product was then collected by filtration, washed with water (2.0 L) and dried in air (yield—50.6 g). The resulting black polymeric powder has an inherent viscosity of 0.128, a melting temperature of 112° C., a weight average molecular weight of 8,955, a number average molecular weight of 5,693 and a polydispersity value of 1.57.

Example 22

A polymethine ultra-violet light-absorbing compound (0.15 g, 0.0003 m) having the structure

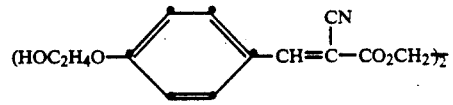

was dissolved in N,N-dimethylformamide (100 mL) containing 1,4-butanediol (4.47 g, 0.0497 m) with stirring. The solution was treated with tolylene 2,4-diisocyanate (8.7 g, 0.050 m) at room temperature and then heated at 80°-85° C. for 0.5 hour. Methanol (5.0 ml) was added and the solution drowned into water (800 mL). Saturated salt solution (5.0 ml) was added with stirring and essentially white polymeric powder was collected by filtration, washed with water and dried in air (yield—12.1 g). The polymer has an inherent viscosity of 0.146, or melting temperature of 93° C., a weight average molecular weight of 10,154, a number average molecular weight of 7,336, a polydispersity value of 1.38 and an absorption maximum at 354 nm in the UV absorption spectrum in N,N-dimethylformamide.

Example 23

A polymethine ultra-violet light absorbing compound (0.15 g (0.00029 m)) having the structure

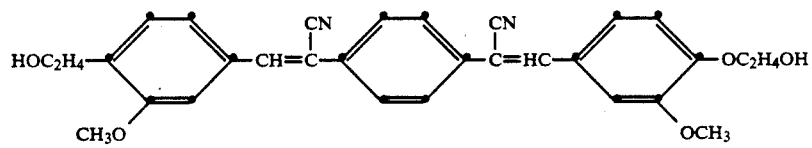

and 1,4-butanediol (4.47 g, 0.0497 m) were reacted with tolylene diisocyanate (8.7 g, 0.05 m) in N,N-dimethylformamide (100 ml) and the product isolated in a manner analogous to that of Example 22. The ultra-violet light absorbing polyurethane powder (12.4 g) has an inherent viscosity of 0.133, a melting temperature of 95° C., a weight average molecular weight of 7,276, a number average molecular weight of 5,351, a polydispersity of 1.36, an absorption maximum at 377 nm in the UV absorption spectrum in N,N-dimethylformamide and contains about 1.0 percent by weight of the residue of the starting UV absorbing compound.

Additional colorants containing aliphatic hydroxy groups and which are useful in the practice of the present invention are disclosed in the following tables. The compounds below are either known in the art or are synthesized by known methodology.

TABLE 1

| Ex. No. | $R^3$—N≡N—Y (PHENYL AZO COMPOUNDS) | |
|---|---|---|
| | $R^3$ | Y (Coupling Component) |
| 24 | (2-Cl, 4-O₂N-phenyl) | (phenyl)—N(C₂H₄OH)₂ |

TABLE 1-continued
R³—N=N—Y (PHENYL AZO COMPOUNDS)
| Ex. No. | R³ | Y (Coupling Component) |
|---|---|---|
| 25 |  | 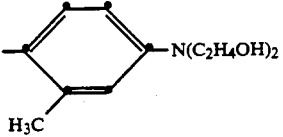 |
| 26 | 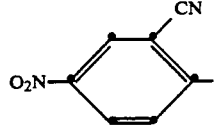 | 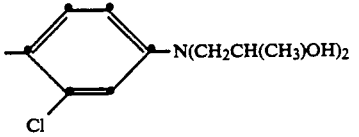 |
| 27 | 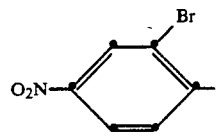 | 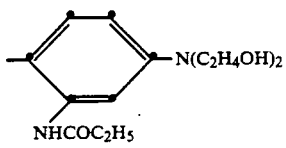 |
| 28 | 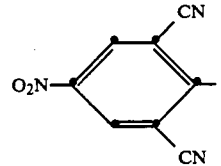 | 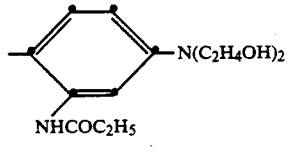 |
| 29 | 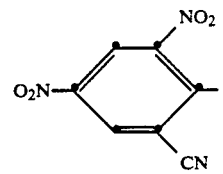 | 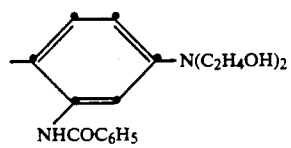 |
| 30 | 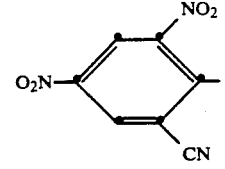 | 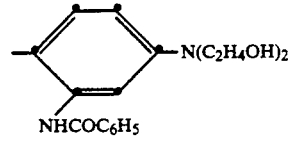 |
| 31 | 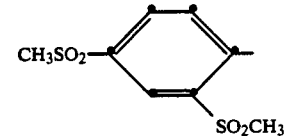 | 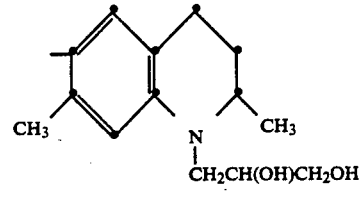 |
| 32 | 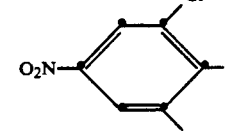 | 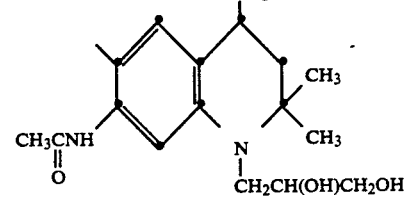 |

TABLE 1-continued

R³—N=N—Y (PHENYL AZO COMPOUNDS)

| Ex. No. | R³ | Y (Coupling Component) |
|---|---|---|
| 33 | 2-OCH₃, 4-O₂N, 5-CN phenyl | 2,6-dimethyl-3-[N-(isopropyl)(N-CH₂CH(OH)CH₂OH)amino]phenyl (with O bridge) |
| 34 | 2-SC₂H₄OH, 4-O₂N, 5-CN phenyl | 2-methyl-5-(C₂H₅CONH)-4-[N-(CH₂CH₂CH₂CH₂OH)]phenyl (with O bridge) |
| 35 | 3-Cl, 4-SO₂N(C₂H₄OH)₂ phenyl | 1-methyl-2-phenylindole-3-yl |
| 36 | 3-Cl, 4-SO₂N(CH₂CH₂OH)₂ phenyl | 1,5-dimethylindoline-7-yl |
| 37 | 3-Cl, 4-SO₂NH-C₆H₄-C₂H₄OH | 1-C₂H₄OH-3-methyl-5-oxo-pyrazol-4-yl |
| 38 | 2-HOC₂H₄O, 5-NO₂ phenyl | 4,6-dimethyl-3-CN-5-HO-1-C₂H₄OH-2-oxo-pyridin-... |
| 39 | 4-CO₂C₂H₄OH phenyl | 4,6-dimethyl-3-CN-5-HO-2-oxo-1-[CH₂–(S-thiane)-CH₂OH]-pyridin-... |

TABLE 1-continued
R³—N=N—Y (PHENYL AZO COMPOUNDS)
| Ex. No. | R³ | Y (Coupling Component) |
|---|---|---|
| 40 | 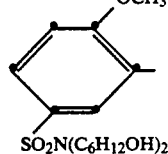 | 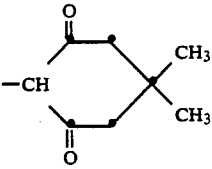 |
| 41 | 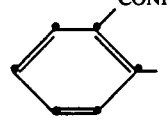 | 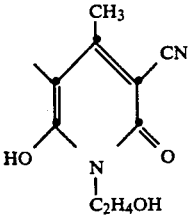 |
| 42 | 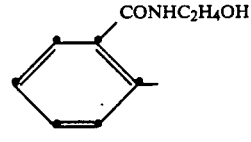 | 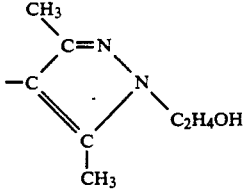 |
| 43 | 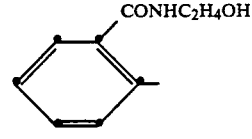 | 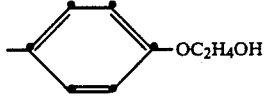 |
| 44 | 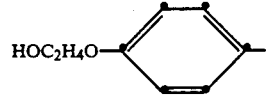 | 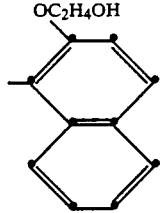 |
| 45 | 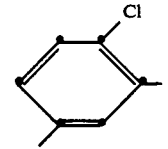 | 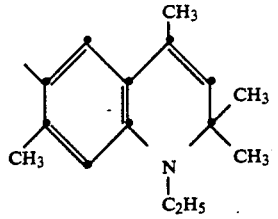 |
| 46 |  | 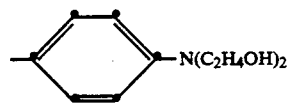 |
| 47 | 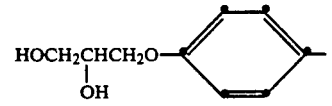 | 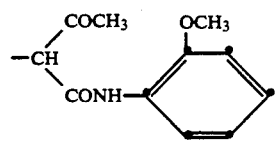 |

TABLE 1-continued

R³—N=N—Y (PHENYL AZO COMPOUNDS)

| Ex. No. | R³ | Y (Coupling Component) |
|---|---|---|
| 48 | (HOCH$_2$CH$_2$OCH$_2$CH$_2$)$_2$NSO$_2$—[phenyl]— | [thiazole ring with N, S, substituted with CH$_3$ and C$_6$H$_5$] |

TABLE 2

R³—N=N—Y (HETEROARYL AZO COMPOUNDS)

| Ex. No. | R³ | Y (Coupling Component) |
|---|---|---|
| 49 | [benzothiazole with CF$_3$ substituent] | [phenyl]—N(C$_2$H$_5$)(CH$_2$CHCH$_2$OH with OH); NHCOCH$_3$ substituent |
| 50 | [benzothiazole with CH$_3$S substituent] | [phenyl]—N(C$_2$H$_4$OH)$_2$ |
| 51 | [benzothiazole with NCS substituent] | [phenyl]—N(C$_2$H$_4$OH)$_2$ |
| 52 | [benzothiazole with CH$_3$ substituent] | [complex structure with CH$_3$ groups, N—CH$_2$—phenyl—SO$_2$N(C$_2$H$_4$OH)$_2$] |
| 53 | [benzothiazole with two Cl substituents] | [phenyl]—N(C$_2$H$_5$)(C$_2$H$_4$CON(C$_2$H$_4$OH)$_2$) |
| 54 | [benzothiazole with O$_2$N substituent] | [phenyl]—N(C$_2$H$_5$)(C$_2$H$_4$SO$_2$N(C$_2$H$_4$OH)$_2$) |

TABLE 2-continued
R³—N=N—Y (HETEROARYL AZO COMPOUNDS)

| Ex. No. | R³ | Y (Coupling Component) |
|---|---|---|
| 55 | 4-(HOC₂H₄O₂C)-benzothiazol-2-yl | 2,5-dimethyl-4-[N-isopropyl-N-(C₂H₄OH)amino]phenyl with ortho O-substitution |
| 56 | 4-((HOC₂H₄)₂NO₂S)-benzothiazol-2-yl | 2-OCH₃-5-CH₃-4-N(C₂H₅)₂-phenyl |
| 57 | 4-(O₂N)-thiazol-2-yl | 3-CH₃-4-[N(C₂H₅)(CH₂CHOHCH₂OH)]phenyl |
| 58 | 4-(O₂N)-thiazol-2-yl | 2-OC₂H₅-5-NHCOCH₃-4-N(C₂H₄OH)₂-phenyl |
| 59 | 4-(NC)-thiazol-2-yl | 4-[N(C₂H₅)(C₂H₄O-C₆H₄-SO₂N(C₂H₄OH)₂)]phenyl |
| 60 | 4-CH₃-5-(HOC₂H₄OC(O))-thiazol-2-yl | 2,4-dimethyl-6-[CH(CH₃)CH₂C(CH₃)₂-N(C₂H₄OC₂H₄OH)]phenyl |
| 61 | 3-CH₃-4-Br-5-methyl-isothiazol-yl | 4-N(C₂H₄OH)₂-phenyl |
| 62 | 3-CH₃-4-CN-5-methyl-isothiazol-yl | 3-CH₃-4-N(C₂H₄OH)₂-phenyl |
| 63 | 3-CH₃-4-CN-5-methyl-isothiazol-yl | 3-NHCOCH₃-4-N(C₂H₄OH)₂-phenyl |

TABLE 2-continued

R³—N=N—Y (HETEROARYL AZO COMPOUNDS)

| Ex. No. | R³ | Y (Coupling Component) |
|---|---|---|
| 64 | 3-methyl-4-(phenylsulfonyl)-isothiazol-5-yl (CH₃ on C3, SO₂C₆H₅ on C4) | 4-(C₂H₅CONH)-2-methyl-5-[N-CH₂CH(OH)CH₂OH, N-(1-methylpropyl via CH₃)]aniline derivative |
| 65 | 3-methyl-4-(SCH₂CH(OH)CH₂OH)-isothiazol-5-yl | 2-phenyl-5-methyl-4-[N(CH₃)₂]-thiazole type coupler (C₆H₅, N(CH₃)₂, S) |
| 66 | 3-methyl-4-(CONHC₂H₄OH)-isothiazol-5-yl | 4-[N(CH₂C₆H₅)(CH₂CH₂OH)]-2-(NHCO₂C₂H₅)aniline |
| 67 | 3-methyl-4-(CO₂C₂H₄OH)-isothiazol-5-yl | 3-phenyl-4-(CO₂C₂H₄OH)-5-(NHC₂H₅)-thiophene (C₆H₅, CO₂C₂H₄OH, NHC₂H₅, S) |
| 68 | 4-CN-1-methyl-pyrazol-5-yl | 4-[N(C₂H₄OH)₂]-2-(NHCOCH₃)aniline |
| 69 | 4-(CO₂C₂H₅)-1-cyclohexyl-pyrazol-5-yl | 2-Cl-5-OCH₃-4-[N(C₂H₄OH)₂]aniline |
| 70 | 3-(CH₃)₃C-4-Br-1-ethyl-pyrazol-5-yl | 2,5-di-OCH₃-4-[N(C₂H₄OH)₂]aniline |
| 71 | 4-NO₂-1-benzyl-pyrazol-5-yl | N-(2,3-dihydroxypropyl)naphthylamine (NHCH₂CH(OH)CH₂OH on naphthalene) |

TABLE 2-continued $R^3-N=N-Y$ (HETEROARYL AZO COMPOUNDS)

| Ex. No. | $R^3$ | Y (Coupling Component) |
|---|---|---|
| 72 | pyrazole with NO$_2$ and N-CH$_2$CH$_2$OH | naphthalene-NHC$_2$H$_4$OH |
| 73 | pyridine | CH$_3$, CN, HO, =O, N-CH$_2$CH(OH)CH$_2$OH (pyridone coupler) |
| 74 | 2-chloropyridine | $-CH(COCH_3)CONH$-phenyl with SO$_2$N(C$_2$H$_4$OH)$_2$ and CH$_3$O |
| 75 | 2-cyanopyridine | phenyl-N(C$_6$H$_{11}$)(CH$_2$CH(CH$_3$)OH) with NHCOCH$_2$OH |
| 76 | 2,5-dicyanopyridine (CN, CN) | phenyl-N(C$_2$H$_4$OH)$_2$ with NHCONH-phenyl |
| 77 | thiadiazole with C$_2$H$_5$S | phenyl-N(C$_2$H$_4$OH)$_2$ with CH$_3$ |
| 78 | thiadiazole with C$_2$H$_5$SO$_2$ | phenyl-N(C$_2$H$_4$OH)$_2$ |
| 79 | thiadiazole with HOC$_2$H$_4$S | phenyl-N(C$_2$H$_5$)(C$_2$H$_4$OH) with NHCOCH$_3$ |

TABLE 2-continued
R³—N=N—Y (HETEROARYL AZO COMPOUNDS)
| Ex. No. | R³ | Y (Coupling Component) |
|---|---|---|
| 80 | 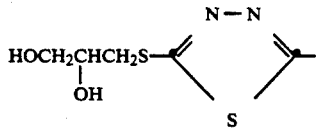 | 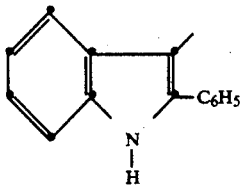 |
| 81 | 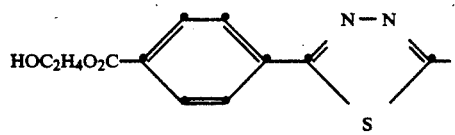 | 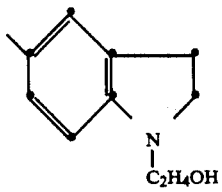 |
| 82 | 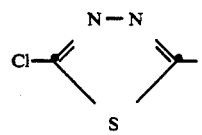 | 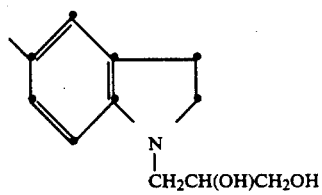 |
| 83 | 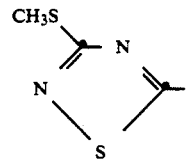 | 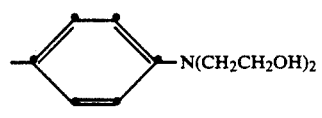 |
| 84 | 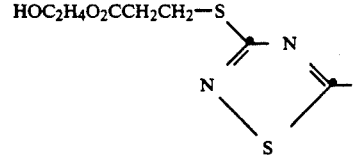 | 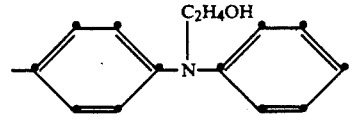 |
| 85 | 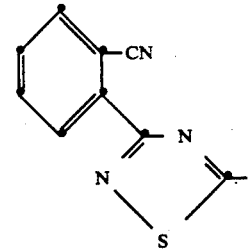 | 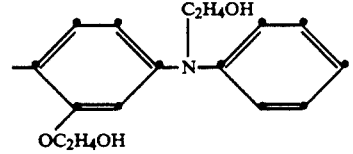 |
| 86 | 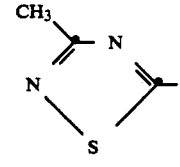 | 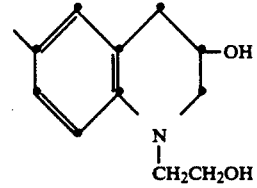 |
| 87 | 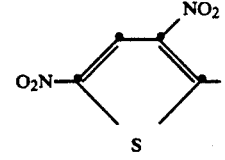 | 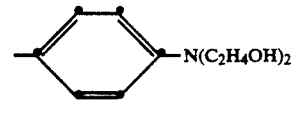 |

TABLE 2-continued

R³—N≡N—Y (HETEROARYL AZO COMPOUNDS)

| Ex. No. | R³ | Y (Coupling Component) |
|---|---|---|
| 88 | 3-acetyl-4-nitro-thiophen-2-yl (CH₃CO, NO₂ on thiophene) | 4-[N(C₂H₄OH)₂]-3-methylphenyl |
| 89 | 3-cyano-5-nitro-thiophen-2-yl (O₂N, CN on thiophene) | 4-[N(C₂H₄OH)₂]-2-(NHCOC₆H₁₁)phenyl |
| 90 | 3-methyl-4-cyano-5-cyano-thiophen-2-yl (CH₃, CN, NC on thiophene) | 2,5-dimethyl-4-(CH₃CONH)-phenyl-N(CH₂CH(OH)CH₂OH) (tetrahydroquinoline-type) |
| 91 | 3-methyl-4-CO₂C₂H₅-5-cyano-thiophen-2-yl (CH₃, CO₂C₂H₅, NC on thiophene) | phenyl-N(C₂H₄OH)(C₂H₄N(CO—CH—OH)(CO—CH₂)) |
| 92 | 3-methyl-4-CN-5-CO₂CH₃-thiophen-2-yl (CH₃, CN, CH₃O₂C on thiophene) | phenyl-N(CH₂-C₆H₄-CO₂C₂H₄OH)₂ |
| 93 | 3-methyl-4-CO₂C₂H₄OH-5-CO₂C₂H₄OH-thiophen-2-yl | 4-N(CH₃)₂-phenyl |
| 94 | 3-(CH₃)₂CHCO-4-CO₂C₂H₄OH-thiophen-2-yl | 2,4,6-trimethyl-3-[C(CH₃)₂-C(CH₃)₂-N(C₂H₄OH)]-phenyl |
| 95 | 3-benzoyl-4-CONHCH₂CH(OH)CH₂OH-thiophen-2-yl | 4-N(C₂H₅)₂-3-methyl-phenyl |

TABLE 2-continued

R³—N=N—Y (HETEROARYL AZO COMPOUNDS)

| Ex. No. | R³ | Y (Coupling Component) |
|---|---|---|
| 96 | benzisothiazolyl | —C₆H₄—N(C₂H₄OH)₂ |
| 97 | 5-chloro-benzisothiazolyl | —C₆H₃(NHCOCH₃)—N(C₂H₄OH)₂ |
| 98 | 5-nitro-benzisothiazolyl | —C₆H₃(NHCOCH₃)—N(C₂H₅)(CH₂CH(OH)CH₂OH) |
| 99 | 5-chloro-7-[SO₂N(C₂H₄OH)₂]-benzisothiazolyl | 2,3,6-trimethyl-4-[CH(CH₃)C(CH₃)₂—N(C₂H₅)]-pyridyl |
| 100 | 3-(C₂H₅O₂C)-thieno[2,3-d]thiazolyl | —C₆H₄—N(C₂H₄OC₂H₄OH)₂ |
| 101 | isothiazolo-thiophene | 2,5-dichloro-C₆H₃—N(C₂H₄OH)₂ |
| 102 | pyrido-isothiazolyl | —C₆H₄—N(CH₃)(CH₂CH(OH)CH₂OH) |
| 103 | pyrazino-isothiazolyl | 3-C₂H₅-C₆H₃—N(C₂H₄OH)₂ |

TABLE 2-continued $R^3-N=N-Y$ (HETEROARYL AZO COMPOUNDS)

| Ex. No. | R³ | Y (Coupling Component) |
|---|---|---|
| 104 | benzothiophene with CH₃ and CO₂C₂H₅ substituents | phenyl-N(C₂H₄OH)₂ |
| 105 | thiophene with NC, CH₃S, CH₃, NO₂ substituents | phenyl with N(C₂H₅)(C₂H₄OH) and OC₂H₄OH |
| 106 | thiophene with CONHC₂H₄OH, CH₃C(=O), CH₃ substituents | tetrahydroquinoline derivative with CH₃ groups and CH₂CH(OH) |
| 107 | bi-thiophene with C=O linkage and CONHC₂H₄OH | tetrahydroquinoline with CH₂CH(OH) |
| 108 | thiophene with CH₃, CONHC₂H₄OH, HOC₂H₄NHOC substituents | N-methyl indole with phenyl substituents |
| 109 | thiophene with CONHC₂H₄OH, phenyl-C(=O), CH₃ | tetrahydroquinoline with CH₃ groups and N-C₂H₄OH |
| 110 | benzothiazole-thiophene with CONHC₂H₄OH and CH₃ | tetrahydroquinoline with CH₃ groups and N-C₂H₄OH |

TABLE 2-continued

R³—N=N—Y (HETEROARYL AZO COMPOUNDS)

| Ex. No. | R³ | Y (Coupling Component) |
|---|---|---|
| 111 | 3-chloro-4-cyano-5-formyl-thiophen-2-yl | 4-[N,N-bis(2-hydroxyethyl)amino]-2-methylphenyl |
| 112 | 5-chloro-4-formyl-2-methyl-thiazol-yl | 4-[N,N-bis(2-hydroxyethyl)amino]-2-methoxy-5-methylphenyl |

TABLE 3

R³—N=N—Y PHTHALIMIDYL AZO COMPOUNDS

| Ex. No. | R³ | Y (Coupling Component) |
|---|---|---|
| 113 | 5-methyl-phthalimidyl (N—H) | 4-[N,N-bis(2-hydroxyethyl)amino]-2-methylphenyl |
| 114 | 5-methyl-N-ethyl-phthalimidyl | 4-[N,N-bis(2-hydroxyethyl)amino]-3-(methoxyacetamido)phenyl |
| 115 | 4-bromo-5-methyl-N-(2-hydroxyethyl)-phthalimidyl | 4-[N-(2-hydroxyethyl)-N-methyl-amino]-2,3,5-trimethylphenyl |
| 116 | 4,6-dicyano-5-methyl-N-(n-butyl)-phthalimidyl | 4-[N,N-bis(2-hydroxyethyl)amino]-3-(propionamido)phenyl |

TABLE 3-continued
R³—N=N—Y PHTHALIMIDYL AZO COMPOUNDS
| Ex. No. | R³ | Y (Coupling Component) |
|---|---|---|
| 117 | 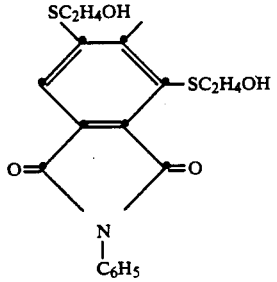 | 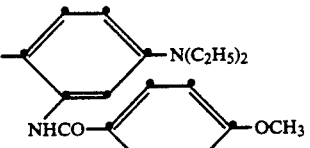 |
| 118 | 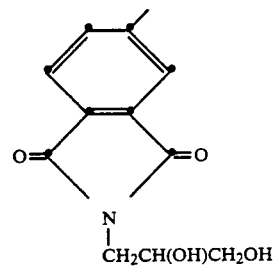 | 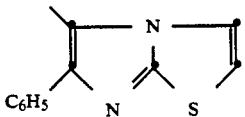 |
| 119 | 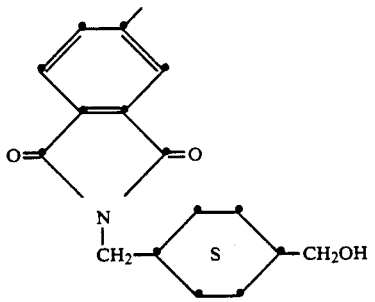 | 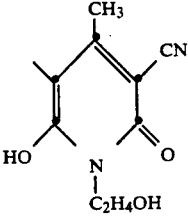 |
| 120 | 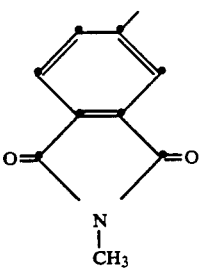 | 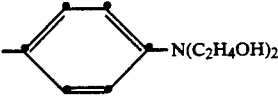 |
| 121 | 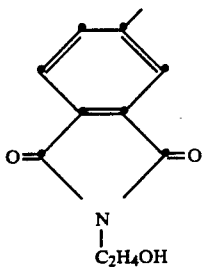 | 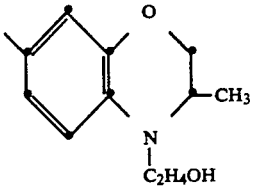 |

TABLE 3-continued

R³—N=N—Y PHTHALIMIDYL AZO COMPOUNDS

| Ex. No. | R³ | Y (Coupling Component) |
|---|---|---|
| 122 | 4-CN, 5-NO₂, phthalimide with N-C₂H₅ | 4-N(C₂H₄OH)₂, 3-NHCOCH₂-phenyl |
| 123 | 4-CN, 5-CN, phthalimide with N-C₂H₄OH | 3-CH₃CONH, 4-morpholino (N-C₂H₅) |
| 124 | 4-Cl, phthalimide with N-C₂H₄OH | 2,3-dimethylphenyl, N(CH₂CH(OH)CH₂-, CH(CH₃)-) |

TABLE 4

R₃—N=N—R₄—N=N—Y DISAZO COMPOUNDS

| Ex. No. | R₃ | R₄ | Y (Coupling Component) |
|---|---|---|---|
| 125 | phenyl | phenylene | 4-N(C₂H₄OH)₂-phenyl |
| 126 | 2-CH₃-phenyl | 2-CH₃-phenylene | 3-CH₃, 4-N(C₂H₄OH)₂-phenyl |
| 127 | phenyl | 2-CH₃, 5-NHCOCH₃-phenylene | 3-NHCOCH₃, 4-N(C₂H₄OH)₂-phenyl |

TABLE 4-continued
$R_3-N=N-R_4-N=N-Y$ DISAZO COMPOUNDS
| Ex. No. | $R_3$ | $R_4$ | Y (Coupling Component) |
|---|---|---|---|
| 128 |  |  |  |
| 129 |  | 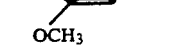 |  |
| 130 |  |  |  |
| 131 |  |  |  |
| 132 |  |  |  |
| 133 |  | 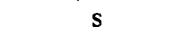 |  |
| 134 |  |  |  |
| 135 |  |  |  |

TABLE 4-continued $R_3-N=N-R_4-N=N-Y$ DISAZO COMPOUNDS

| Ex. No. | R₃ | R₄ | Y (Coupling Component) |
|---|---|---|---|
| 136 | 4-CH₃O-phenyl | 2-methyl-3-cyano-thiophene-5-yl | 4-[N(C₂H₄OH)₂]-3-methylphenyl |
| 137 | 4-HOC₂H₄-phenyl | 2-phenyl-3-carbamoyl-thiophene-5-yl | naphthyl with N(C₂H₄SO₂NHC₃H₆OH) |
| 138 | 1-ethyl-4,5-dicyano-imidazol-2-yl | 2-CO₂CH₃-thiophene-5-yl | 4-[N(CH₂CH(OH)CH₂OH)]phenyl (morpholino-type) |
| 139 | N-ethyl-phthalimidyl | 2-SO₂C₆H₅-thiophene-5-yl | 4-[N(C₂H₄SC₂H₄OH)₂]phenyl |
| 140 | pyridyl | 2-CO₂C₆H₅-thiophene-5-yl | 4-[N(C₂H₄SO₂NHC₂H₄OH)₂]phenyl |
| 141 | 3-ethylthio-1,2,4-thiadiazol-5-yl | 2-methyl-3-CONHC₂H₅-thiophene-5-yl | 1-(CH₂CH(OH)CH₂OH)-3-cyano-4-methyl-6-hydroxy-pyridon-2-yl |
| 142 | 3-methyl-4-cyano-isothiazol-5-yl | 3-cyano-thiophene-5-yl | 4-[N(C₂H₄OH)₂]-3-methylphenyl |
| 143 | 4-chlorophenyl | 4-chloro-thiazol-2-yl | 4-[N(C₂H₄OH)₂]-2-NHCONHC₂H₅-phenyl |

TABLE 4-continued

R₃—N=N—R₄—N=N—Y DISAZO COMPOUNDS

| Ex. No. | R₃ | R₄ | Y (Coupling Component) |
|---|---|---|---|
| 144 | phenyl | phenyl-C(=N−)−C(S)=C(CH₃)− (thiazole) | 2,5-dimethylphenyl−N(CH₂CH(OH)CH₂OH)−CH(CH₃)−O− |
| 145 | 4-O₂N−phenyl | CN-substituted dimethylthiazole | phenyl−N(C₂H₄OH)₂ |
| 146 | phenyl | phenyl | pyridine with CH₃, CN, HOC₂H₄NH, NHC₂H₄OH substituents |
| 147 | 2-Cl-4-O₂N−phenyl | 2,5-(OCH₃)₂−phenyl | phenyl−C(=N−)−C(S)=C−N(C₂H₄OH)₂ (thiazole) |

TABLE 5

AZAMETHINE; METHINE OR ARYLIDENE COMPOUNDS

| Ex. No. | Structure of Compound |
|---|---|
| 148 | (HOC₂H₄)₂N−phenyl−C(CN)=C(CN)(CN) |
| 149 | (HOC₂H₄)₂N−phenyl−[succinimide with CN substituent, NH] |
| 150 | [N(CH₃)(C₂H₄OH)-substituted phenyl]−[succinimide with CN substituent, N−C₂H₄OH] |

TABLE 5-continued
AZAMETHINE; METHINE OR ARYLIDENE COMPOUNDS
Ex. No. Structure of Compound
151 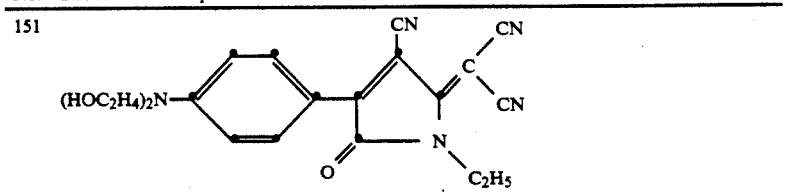
152 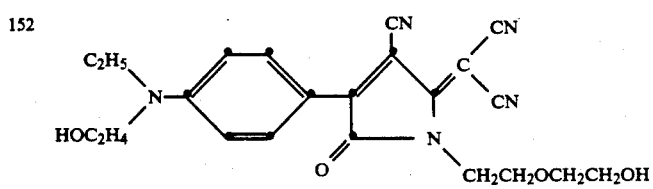
153 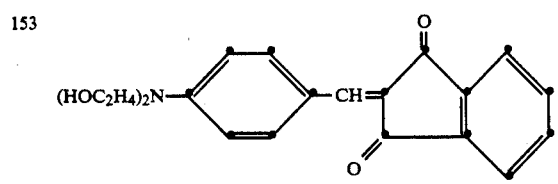
154 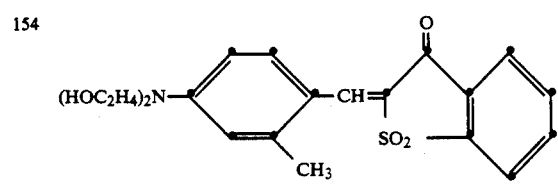
155 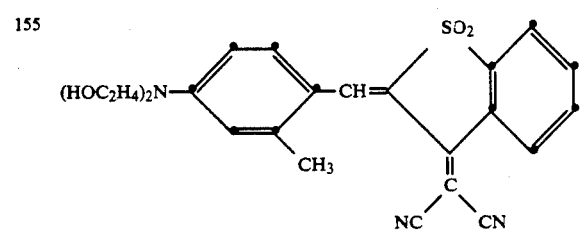
156 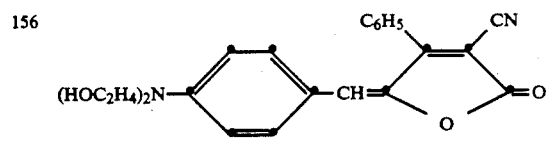
157 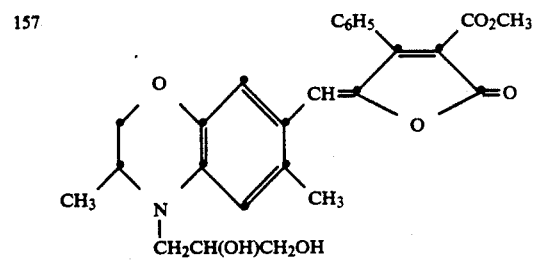
158 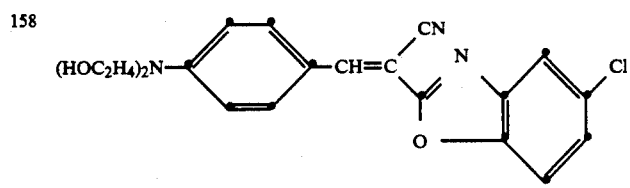

TABLE 5-continued
AZAMETHINE; METHINE OR ARYLIDENE COMPOUNDS
Ex. No. Structure of Compound
159 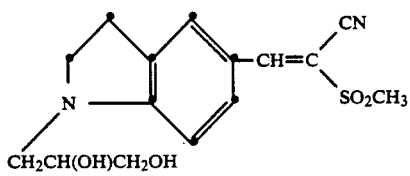
160 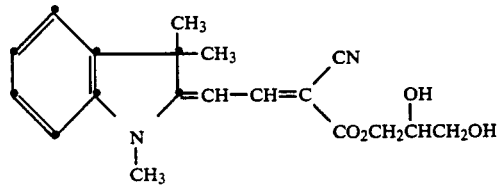
161 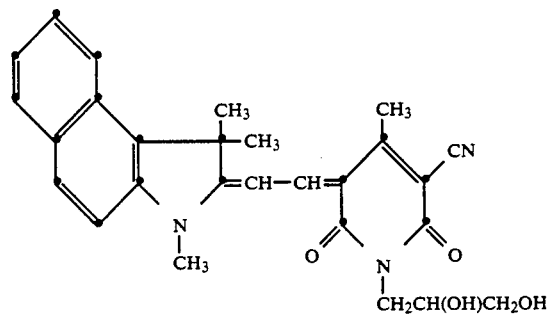
162 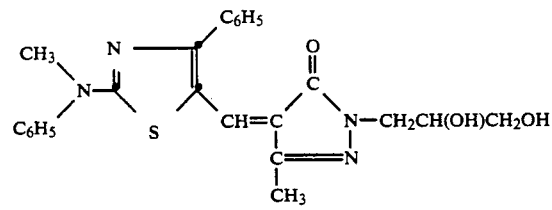
163 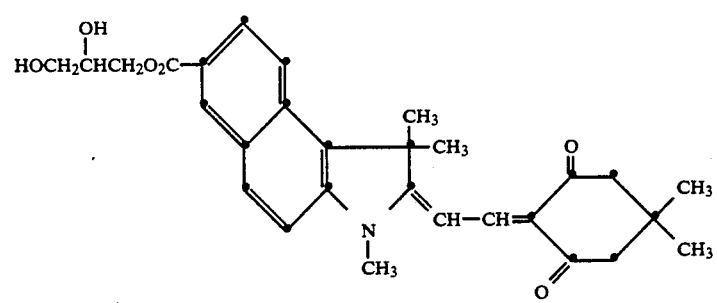
164 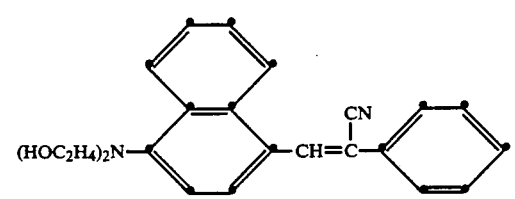

TABLE 5-continued
AZAMETHINE; METHINE OR ARYLIDENE COMPOUNDS
Ex. No. Structure of Compound
165 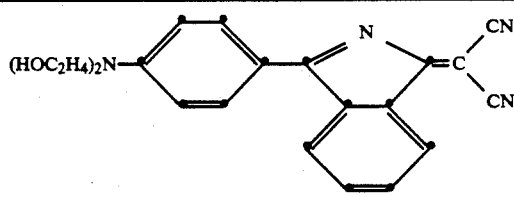
166 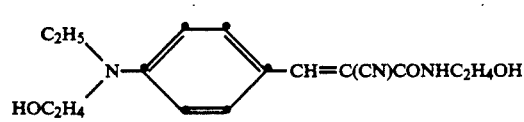
167 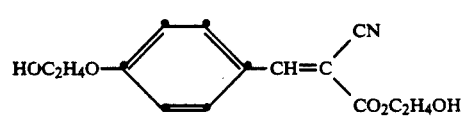
168 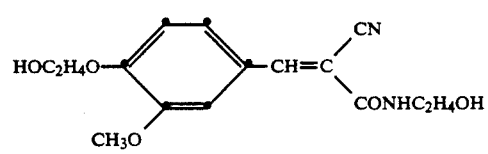
169 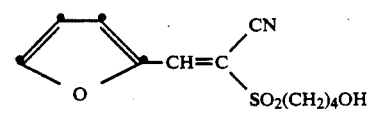
170 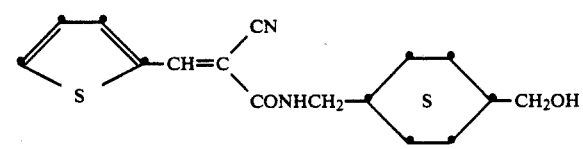
171 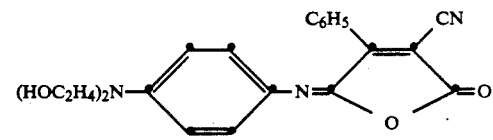
172 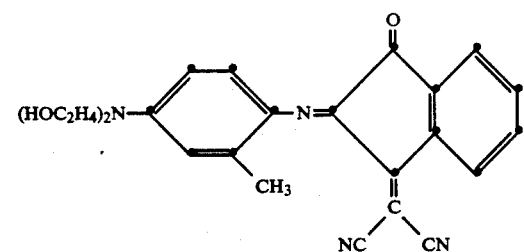
173 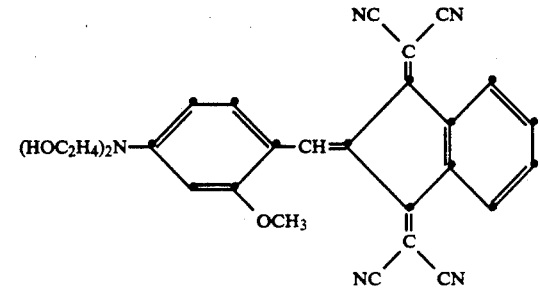

TABLE 5-continued
AZAMETHINE; METHINE OR ARYLIDENE COMPOUNDS
Ex.
No. Structure of Compound
174
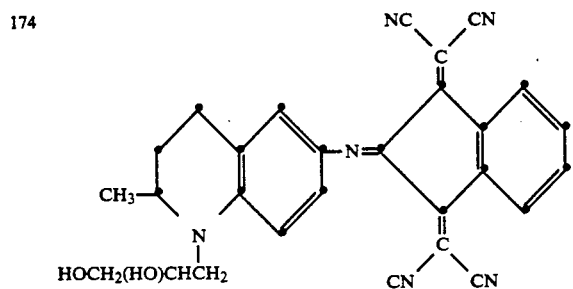
175
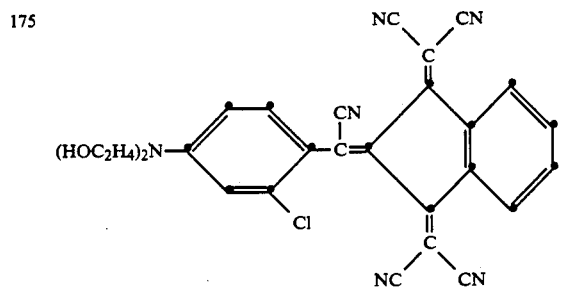
176
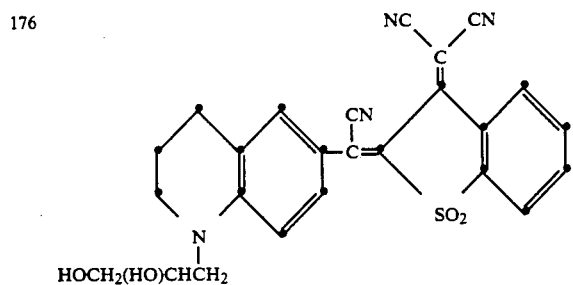
177
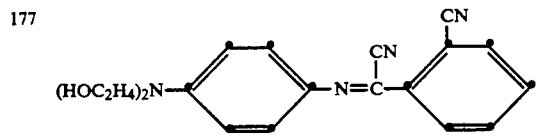
178
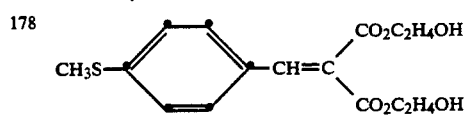
179
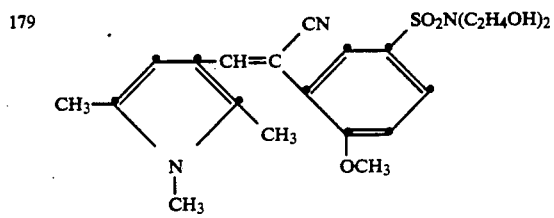

TABLE 5-continued
AZAMETHINE; METHINE OR ARYLIDENE COMPOUNDS

Ex. No. Structure of Compound

180–184 (chemical structures)

TABLE 6
AZO-METHINE COMPOUNDS
A=HC—R₄—N=N—Y

| Ex. No. | A= | R₄ | Y (Coupling Component) |
|---|---|---|---|
| 185 | (NC)₂C= | phenyl with 2 CN groups | phenyl with N(C₂H₄OH)₂ and NHCOCH₃ |

TABLE 6-continued

AZO-METHINE COMPOUNDS
A=HC—R₄—N=N—Y

TABLE 6-continued

AZO-METHINE COMPOUNDS
$A=HC-R_4-N=N-Y$

| Ex. No. | A= | $R_4$ | Y (Coupling Component) |
|---|---|---|---|
| 192 | (2-cyano-2-(methoxycarbonyl-benzoxazolyl)methylene) | 4-methyl-thiazol-5-yl | $-C_6H_4-N(C_2H_4OH)_2$ |
| 193 | (cyano-phenylsulfonyl)methylene, $NC/C_6H_5SO_2$ | 4-(4-chlorophenyl)thiazol-5-yl | tetrahydroquinoline with $N-CH_2CH_2SO_2N(C_2H_4OH)_2$ |
| 194 | (dicyanomethylene on dimethylphenyl-SO_2) | 4-phenyl-thiazol-5-yl | $-C_6H_4-N(C_2H_4OH)_2$ |
| 195 | (cyano-methyl barbituric-N-C_2H_4OH) | 4-phenyl-thiazol-5-yl | 2,5-dimethyl-4-($N(CH(CH_3)OCH_3)(C_2H_4OH)$)phenyl |
| 196 | $NC\!/\!NC$ C= (dicyano methylene) | 4-chloro-5-cyano-thiazol-2-yl | $-C_6H_4-N(C_2H_4OH)_2$ |
| 197 | (cyano-ethoxycarbonyl)methylene, $NC/C_2H_5O_2C$ | 4-ethoxy-5-cyano-thiazol-2-yl | $-C_6H_4-N(C_2H_4OH)_2$ |
| 198 | (methyl-phenylpyrazolone methylene) | 4-chloro-5-cyano-thiazol-2-yl | 3-methyl-4-$N(C_2H_4OH)_2$-phenyl |

TABLE 6-continued

AZO-METHINE COMPOUNDS
A=HC—R₄—N=N—Y

| Ex. No. | A= | R₄ | Y (Coupling Component) |
|---|---|---|---|
| 199 | (4,6-dimethoxyphenyl)-NHC(O)-C(CN)= | 5-(chlorothienyl)-thiazole | 4-N(C₂H₄OH)₂, 3-NHCOCH₃ phenyl |
| 200 | 3-phenyl-5-methyl-pyrazolyl with CN= | phenyl | 4-N(C₂H₄OH)₂, 3-CH₃ phenyl |
| 201 | HOC₂H₄NHC(O)-C(CN)= | 2-phenyl-thiazole | complex alkyl-substituted N(C₂H₄OH) aniline |
| 202 | 2-methyl-benzothiazolyl with CN-C= | 5-chloro-4-cyano-thiazole | 4-N(C₂H₄OH)₂ phenyl |
| 203 | CH₃-C=C(O)- with N-N-CH₂CH(OH)CH₂OH (pyrazolone) | 2-phenyl-thiazole | 4-N(C₂H₄OH)₂, 3-CH₃ phenyl |
| 204 | 2-(dicyanomethylene)-indan-1,3-dione | 5-chloro-thiazole | 2-OCH₃, 4-N(C₂H₄OH)₂, 5-NHCOCH₃ phenyl |
| 205 | benzo-isothiazole-SO₂ with C(CN)₂ | 5-chloro-thiazole | 4-N(C₂H₄OH)₂, 3-NHCOCH₃ phenyl |

TABLE 6-continued

AZO-METHINE COMPOUNDS
A=HC—R$_4$—N=N—Y

| Ex. No. | A= | R$_4$ | Y (Coupling Component) |
|---|---|---|---|
| 206 | (dicyanomethylene-indanedione with two =C(CN)$_2$ groups) | Cl-thiazole | dihydroquinoline with CH$_3$ groups, CH$_3$CONH, N-CH$_2$CH(OH)CH$_2$OH |
| 207 | C$_2$H$_5$OC$_2$H$_4$OC(O)-C(CN)= | Cl, CO$_2$C$_2$H$_5$ thiophene | phenyl with OC$_2$H$_5$, NHCOCH$_3$, N(C$_2$H$_4$OH)$_2$ |
| 208 | phthaloyl (1,3-indandione) | Cl, CN thiophene | phenyl with NHCOCH$_3$, N(C$_2$H$_4$OH)$_2$ |
| 209 | benzisothiazole-SO$_2$ derivative | Cl, CN thiophene | phenyl with OCH$_3$, NHCOCH$_3$, N(C$_2$H$_4$OH)$_2$ |

TABLE 7

ANTHRAQUINONE COMPOUNDS

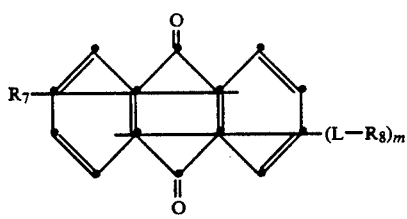

| Ex. No. | R$_7$ | —(L—R$_8$)$_m$ |
|---|---|---|
| 210 | H | 1,5-di-NHCH$_2$CH$_2$OH |
| 211 | H | 1,8-di-NHCH$_2$C(CH$_3$)$_2$CH$_2$OH |
| 212 | H | 1,4-di-NHCH$_2$CH$_2$OH |
| 213 | H | 1,4-di-NHCH$_2$C(CH$_3$)$_2$CH$_2$OH |
| 214 | H | 1,5-di-NHCH$_2$—(thiophene)—CH$_2$OH |

TABLE 7-continued
ANTHRAQUINONE COMPOUNDS
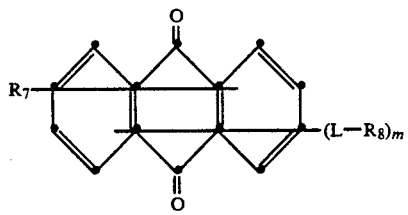
| Ex. No. | R_7 | —(L—R_8)_m |
|---|---|---|
| 215 | H | 1,4-di-NHCH_2—⟨S⟩—CH_2OH (2,5-thiophene) |
| 216 | H | 1,5-di-NHCH_2CH_2OCH_2CH_2OH |
| 217 | H | 1,8-di-NHCH_2CH_2CH_2OH |
| 218 | H | 1,4-di-NH(CH_2)_6OH |
| 219 | H | 1,5-di-NHC(CH_3)_2CH_2OH |
| 220 | H | 1-NHCH_2CH(OH)CH_2OH |
| 221 | 2-CH_3 | 1-NHCH_2CH(OH)CH_2OH |
| 222 | H | 1,4-di-NHCH_2CH(CH_3)OH |
| 223 | H | 1,5-di-NHCH_2CH(C_6H_5)OH |
| 224 | H | 1,4-di-NH—⟨C_6H_4⟩—CH_2CH_2OH |
| 225 | H | 1,4-di-NH—⟨C_6H_4⟩—OCH_2CH_2OH |
| 226 | H | 1,4-di-NH—⟨C_6H_4⟩—SCH_2CH_2OH |
| 227 | H | 1,4-di-NH—⟨C_6H_4⟩—SO_2(CH_2)_4OH |
| 228 | H | 1,5-di-NH—⟨C_6H_3(OCH_3)⟩—SO_2NHC_2H_4OH |
| 229 | H | 1,4-di-NH—⟨C_6H_2(C_2H_5)_2⟩—SO_2NHC_2H_4OH |
| 230 | H | 1,4-di-NH—⟨C_6H_4⟩—CH_2OH |
| 231 | 1-NH_2, 4-OH | 2-OCH_2CH(OH)CH_2OH |

TABLE 7-continued
ANTHRAQUINONE COMPOUNDS

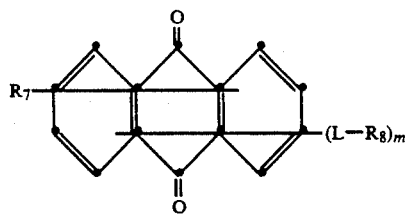

| Ex. No. | R$_7$ | -(L-R$_8$)$_m$ |
|---|---|---|
| 232 | 1-NH$_2$, 2-OCH$_3$ | 4-NHCH$_2$CH(OH)CH$_2$OH |
| 233 | 1,4-di-NH$_2$ | 2,3-di-SC$_2$H$_4$OH |
| 234 | 1,4-di-NH$_2$ | 2,3-di-O—C$_6$H$_4$—SO$_2$NHC$_2$H$_4$OH |
| 235 | 1,8-di-OH | 4,5-di-NHCH$_2$CH$_2$OH |
| 236 | 1,5-di-OH | 4,8-di-NH—C$_6$H$_4$—CH$_2$CH$_2$OH |
| 237 | 1-NH$_2$-4-NHC$_6$H$_5$ | 2-SO$_2$N(C$_2$H$_4$OH)$_2$ |
| 238 | 1-NH$_2$-4-NHC$_6$H$_{11}$ | 2-SCH$_2$CH(OH)CH$_2$OH |
| 239 | 1-NH$_2$-2-CN | 4-NHCH$_2$CH(OH)CH$_2$OH |
| 240 | 1-NH$_2$-2-CF$_3$ | 4-NHCH$_2$CH(OH)CH$_2$OH |
| 241 | 1-NH$_2$-2-CO$_2$C$_2$H$_5$ | 4-NHCH$_2$CH(OH)CH$_2$OH |
| 242 | 1,8-di-OH, 5-NO$_2$ | 4-NH—C$_6$H$_4$—OCH$_2$CH(OH)CH$_2$OH |
| 243 | 1-NH$_2$, 4-SC$_6$H$_5$ | 2-SO$_2$N(C$_2$H$_4$OH)$_2$ |
| 244 | 1-NH$_2$, 4-NHC$_2$H$_4$OH | 2-SO$_2$NHC$_2$H$_4$OH |
| 245 | 1-NH$_2$, 2-OC$_6$H$_5$ | 4-NHCH$_2$CH(OH)CH$_2$OH |
| 246 | 1-NH$_2$-2-Br | 4-NHCH$_2$CH(OH)CH$_2$OH |
| 247 | 1-NH$_2$-4-NHC$_6$H$_5$ | 2-SO$_2$CH$_2$CH(OH)CH$_2$OH |
| 248 | 1,5,8-Tri-OH | 4-NH—C$_6$H$_4$—CON(C$_2$H$_4$OH)$_2$ |
| 249 | H | 1,4-di-NHCH$_2$CH$_2$SO$_2$NHC$_2$H$_4$OH |
| 250 | H | 1,4-di-NHCH$_2$CH$_2$CO$_2$C$_2$H$_4$OH |
| 251 | 1,5-di-OH, 4,8-di-NH$_2$ | 3-SCH$_2$CH(OH)CH$_2$OH |
| 252 | H | 1,4-di-NHC$_2$H$_4$N(CH$_3$)CH$_2$CH$_2$OH |
| 253 | 1,8-di-NHC$_6$H$_5$ | 4,5-di-NHC$_6$H$_4$-p-OC$_2$H$_4$OH |
| 254 | 1-NH$_2$ | 2,4-di-SC$_2$H$_4$OH |
| 255 | 1-NH$_2$ | 2-S—C(=N—N—C$_2$H$_4$OH)—N=CH (triazole ring), 4-NHC$_6$H$_4$-p-C$_2$H$_4$OH |
| 256 | H | 1,5-di-S—C(=N—N—C$_2$H$_4$OH)—N=CH (triazole ring) |
| 257 | H | 1,5-di-S—C$_2$H$_4$OH |

TABLE 7-continued

ANTHRAQUINONE COMPOUNDS

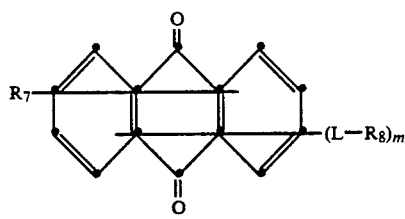

| Ex. No. | $R_7$ | $(L-R_8)_m$ |
|---|---|---|
| 258 | H | 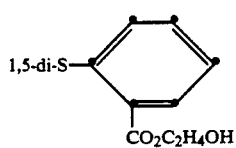 |

TABLE 8

ANTHRAPYRIDONE COMPOUNDS

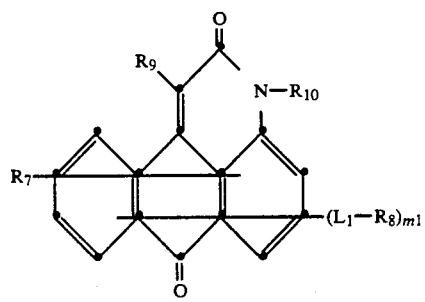

| Ex. No. | $R_7$ | $(L_1-R_8)_{m1}$ | $R_9$ | $R_{10}$ |
|---|---|---|---|---|
| 259 | H | 6-NHC$_2$H$_4$OH | H | C$_2$H$_4$OH |
| 260 | H | 6-NHCH$_2$C(CH$_3$)$_2$CH$_2$OH | H | CH$_2$C(CH$_3$)$_2$CH$_2$OH |
| 261 | H | 6,8-di-NHC$_2$H$_4$OH | COCH$_3$ | H |
| 262 | 4-CH$_3$ | 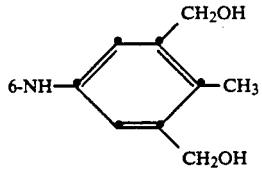 | CN | CH$_3$ |
| 263 | 4-Br | 6-NHCH$_2$CH(OH)CH$_2$OH | CN | C$_4$H$_9$-n |
| 264 | 6,8-di-NHC$_6$H$_5$ | H | CN | CH$_2$CH(OH)CH$_2$OH |
| 265 | H | H | NHCH$_2$CH$_2$OH | CH$_2$CH$_2$OH |
| 266 | H | H | SCH$_2$CH$_2$OH | CH$_2$CH$_2$OH |
| 267 | H | H |  | (CH$_2$)$_6$OH |
| 268 | 5-Br, 6-NH$_2$ | H | CN | CH$_2$CH(OH)CH$_2$OH |
| 269 | 6-NH$_2$ | 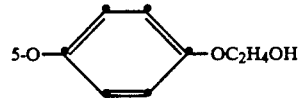 | CN | CH$_2$CH$_2$OH |

TABLE 8-continued

ANTHRAPYRIDONE COMPOUNDS

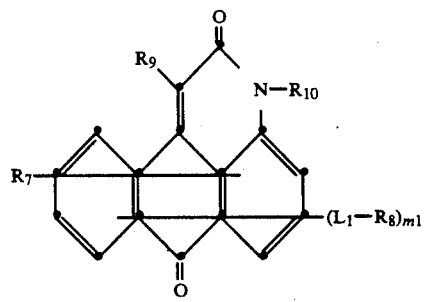

| Ex. No. | $R_7$ | $-(L_1-R_8)_{m1}$ | $R_9$ | $R_{10}$ |
|---|---|---|---|---|
| 270 | H | 6-NH—⟨C₆H₄⟩—OC₂H₄OH | CN | CH₂CH₂OH |
| 271 | H | 6-NH—⟨C₆H₄⟩—C₂H₄OH | CO₂C₂H₅ | CH₂CH(CH₃)OH |
| 272 | H | 6-SCH₂CH(OH)CH₂OH | CO₂C₂H₅ | CH₃ |
| 273 | H | 6-NH—⟨C₆H₃(OCH₃)⟩—SO₂N(C₂H₄OH)₂ | H | CH₃ |
| 274 | H | 6-NHCH₂—⟨thiophene⟩—CH₂OH | COC₆H₅ | CH₂—⟨thiophene⟩—CH₂OH |
| 275 | 6-NHC₂H₅ | H | O—⟨C₆H₄⟩—OC₂H₄OH | CH₂CH₂OH |
| 276 | 6-NHC₂H₅ (NHC₆H₁₁) | H | SCH₂CH(OH)CH₂OH | C₆H₅ |
| 277 | 6-SC₆H₅ | H | COCH₃ | CH₂C(CH₃)₂CH₂OH |
| 278 | 6-NH₂ | 5-SO₂(CH₂)₄OH | CO₂C₂H₄OH | C₆H₁₁ |
| 279 | H | 6-NH—⟨C₆H₄⟩—OCH₂CH(OH)CH₂OH | SO₂C₆H₅ | C₂H₅ |
| 280 | H | 6-NH—⟨C₆H₄⟩—SCH₂CH₂OH | Cl | C₂H₄OC₂H₄OH |
| 281 | H | 6-NH—⟨C₆H₄⟩—CH₂CH₂OH | COCH₃ | —⟨C₆H₄⟩—C₂H₄OH |

TABLE 8-continued
ANTHRAPYRIDONE COMPOUNDS

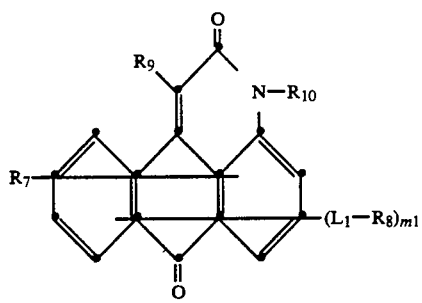

| Ex. No. | $R_7$ | $(L_1-R_8)_{m1}$ | $R_9$ | $R_{10}$ |
|---|---|---|---|---|
| 282 | H | 6-NHC$_2$H$_4$O—⟨phenyl⟩—OC$_2$H$_4$OH | COCH$_3$ | CH$_2$CH$_2$OCH$_2$CH$_2$OH |
| 283 | 6,8-di-SC$_4$H$_9$-n | H | H | CH$_2$CH(OH)CH$_2$OH |
| 284 | H | 6-NHC$_2$H$_4$SO$_2$N(C$_2$H$_4$OH)$_2$ | H | CH$_3$ |
| 285 | H | 6,8-di-NH—⟨phenyl⟩—C$_2$H$_4$OH | H | CH$_3$ |
| 286 | H | 6-NHCH$_2$—⟨thiophene-S⟩—CH$_2$OH | CO$_2$C$_2$H$_4$OH | C$_5$H$_9$ |

TABLE 9
COUMARIN AND IMINOCOUMARIN COMPOUNDS

| Ex. No. | Structure of Colorant |
|---|---|
| 287 | (HOC$_2$H$_4$)$_2$N-coumarin-CO$_2$CH$_2$CH$_3$ |
| 288 | (HOC$_2$H$_4$)$_2$N-coumarin-CN |
| 289 | (HOC$_2$H$_4$)$_2$N-coumarin-SO$_2$C$_6$H$_5$ |
| 290 | (HOC$_3$H$_6$)$_2$N-coumarin-SO$_2$CH$_3$ |

TABLE 9-continued
COUMARIN AND IMINOCOUMARIN COMPOUNDS
Ex. No. | Structure of Colorant
291 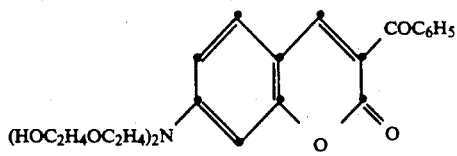
292 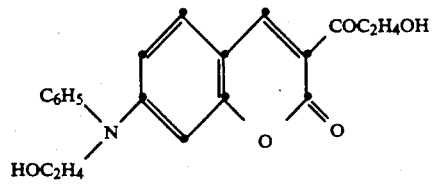
293 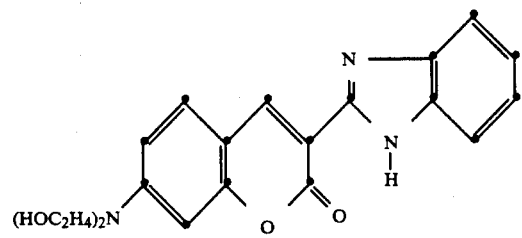
294 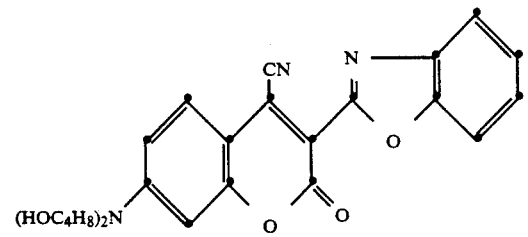
295 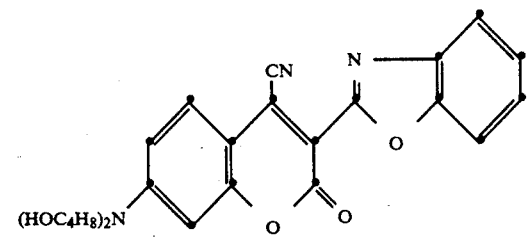
296 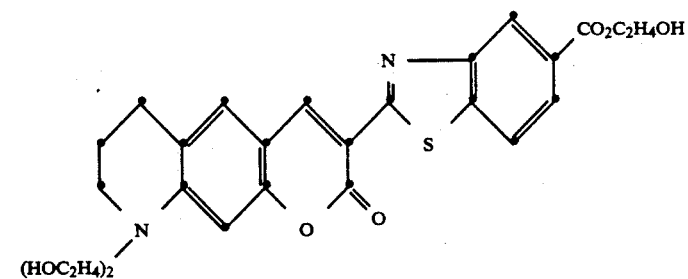
297 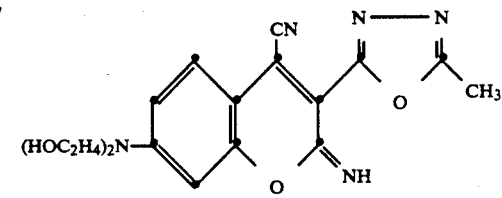

TABLE 9-continued
COUMARIN AND IMINOCOUMARIN COMPOUNDS
Ex. No. Structure of Colorant
298
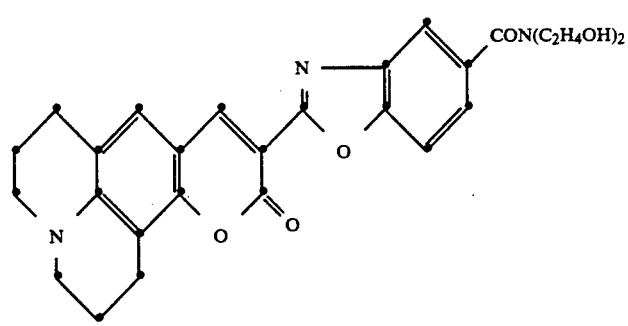
299
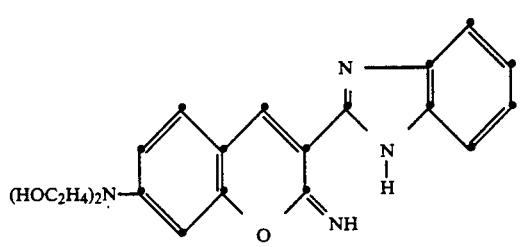
300
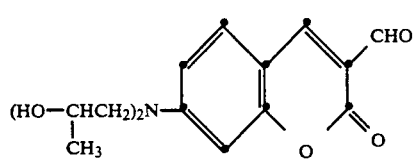
301
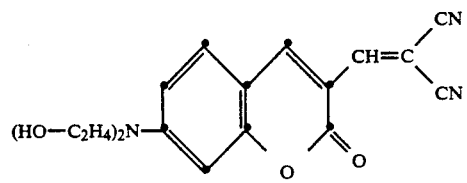
302
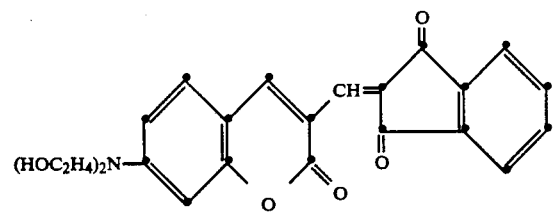
303
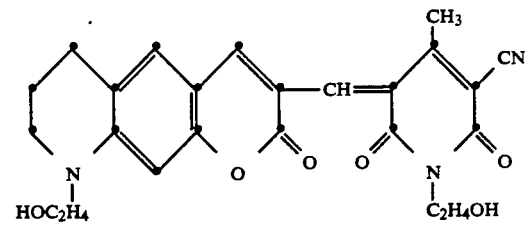
304
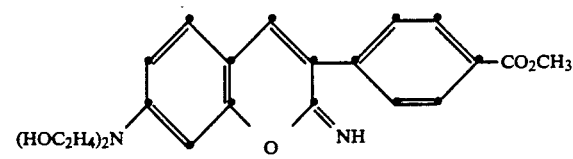

TABLE 9-continued
COUMARIN AND IMINOCOUMARIN COMPOUNDS
Ex. No. | Structure of Colorant
---|---
305 | 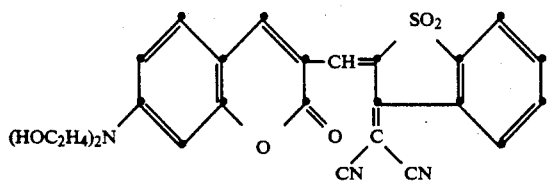
306 | 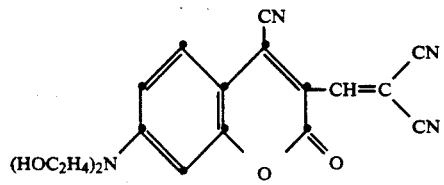
TABLE 10
MISCELLANEOUS LIGHT ABSORBER TYPES
Ex. No. | Structure of Light Absorber
---|---
307 | 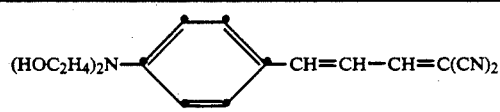
308 | 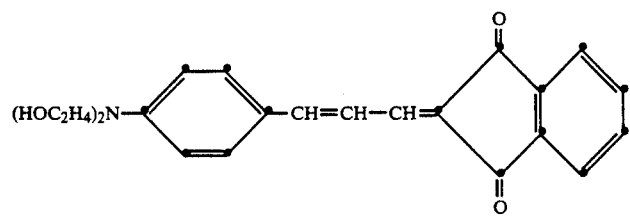
309 | 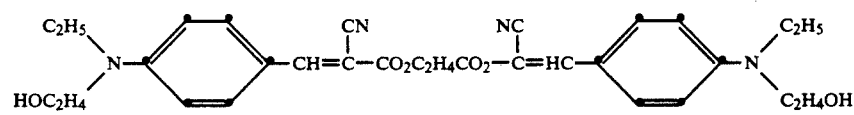
310 | 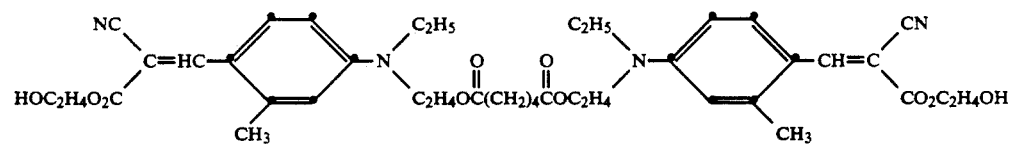
311 | 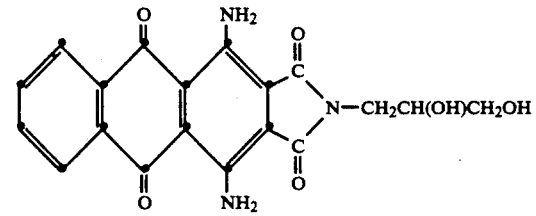
312 | 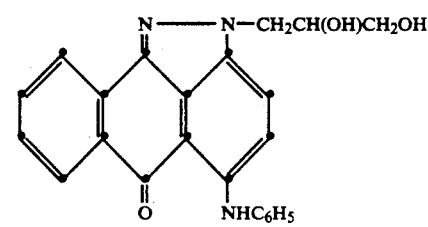

TABLE 10-continued
MISCELLANEOUS LIGHT ABSORBER TYPES
| Ex. No. | Structure of Light Absorber |
|---|---|
| 313 | 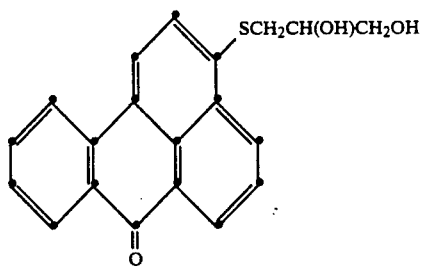 |
| 314 | 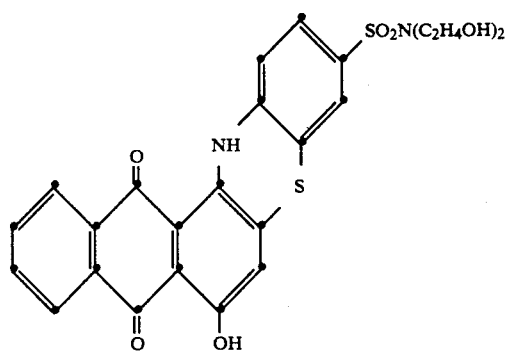 |
| 315 | 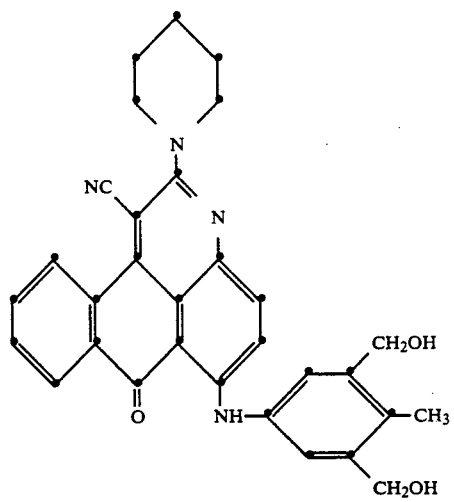 |
| 316 | 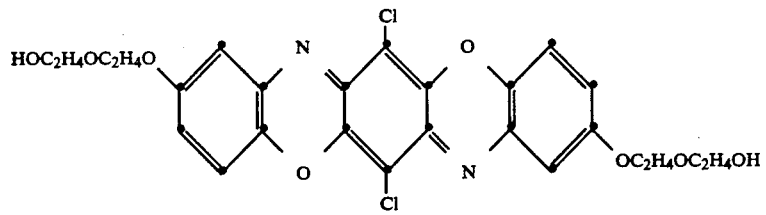 |
| 317 | 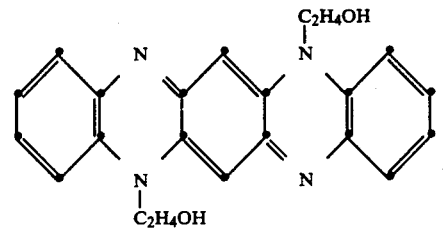 |

TABLE 10-continued
MISCELLANEOUS LIGHT ABSORBER TYPES
Ex.
No.   Structure of Light Absorber
318
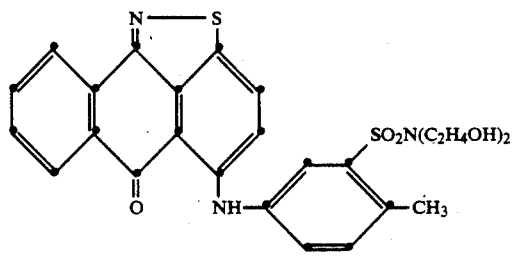
319
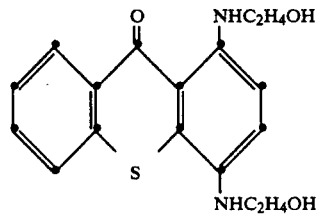
320
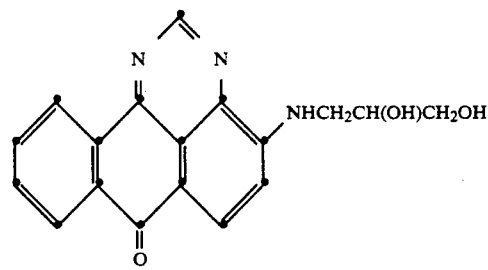
321
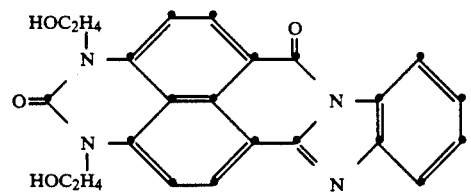
322
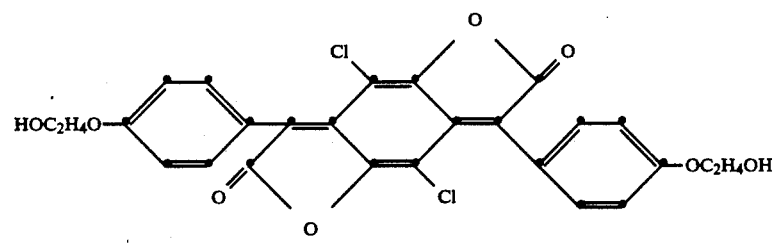
323
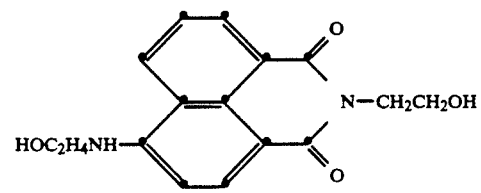

TABLE 10-continued
MISCELLANEOUS LIGHT ABSORBER TYPES
| Ex. No. | Structure of Light Absorber |
|---|---|
| 324 | 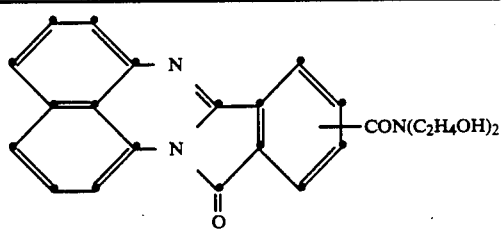 |
| 325 | 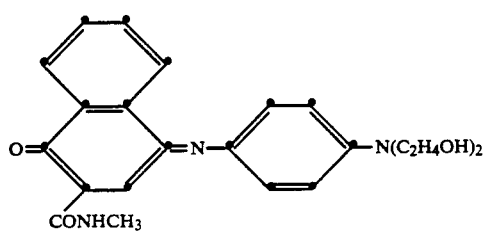 |
| 326 | 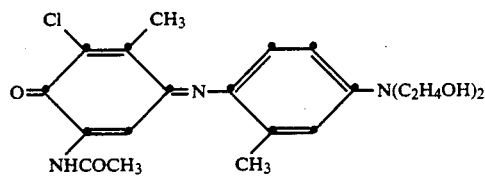 |
| 327 | 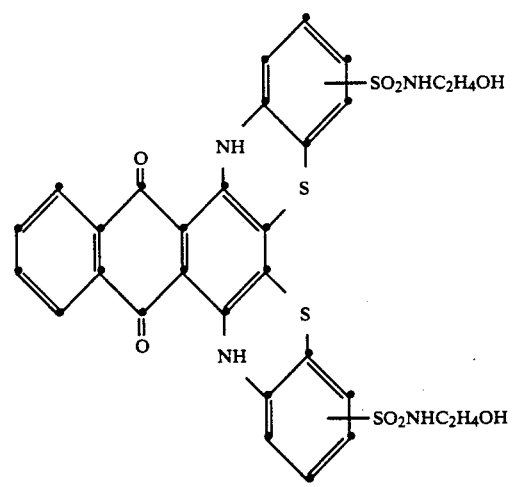 |
| 328 | [Copper Phthalocyanine]—$(SO_2NHC_2H_4OH)_2$ |
| 329 | [Copper Phthalocyanine]—$(SO_2NHCH_2CH_2OCH_2CH_2OH)_2$ |
| 330 | 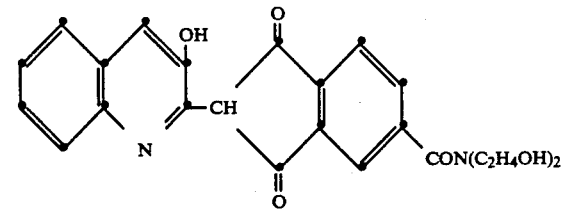 |
| 331 | 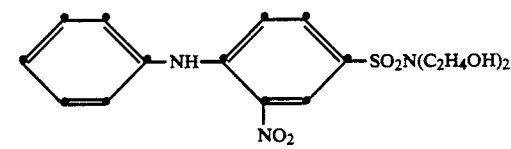 |

TABLE 10-continued

MISCELLANEOUS LIGHT ABSORBER TYPES

| Ex. No. | Structure of Light Absorber |
|---|---|
| 332 | $HOC_2H_4O-C_6H_3(NO_2)-NH-C_6H_4-SO_2NHC_2H_4OH$ (with $NO_2$ on middle ring) |
| 333 | $HOC_2H_4-C_6H_3(NO_2)-NH-C_6H_4-CONHC_2H_4OH$ (with $NO_2$ on middle ring) |
| 334 | Benzene ring with four acetyl (C=O–CH... ) groups and two substituents: $HOC_2H_4-N$ and $N-C_2H_4OH$ (tetraketo-diamine structure) |
| 335 | Benzene ring with four acetyl groups, substituents $NHC_2H_4OH$ (top and bottom) and $CH_3-N$ / $N-CH_3$ (left and right) |
| 336 | Benzotriazole-phenol-NHSO$_2$-C$_6$H$_3$(CO$_2$C$_2$H$_4$OH)$_2$ |
| 337 | $C_6H_5-CO-C_6H_3(OH)-OCH_2CH(OH)CH_2OH$ with $OH$ ortho to carbonyl |
| 338 | Tetraketo benzene core with $HOC_2H_4OC_2H_4-N$ and $N-CH_2CH_2OCH_2CH_2OH$ |
| 339 | $HOC_2H_4O_2C(NC)C=HC-C_6H_4-O(CH_2)_4O-C_6H_4-CH=C(CN)CO_2C_2H_4OH$ |

TABLE 10-continued
MISCELLANEOUS LIGHT ABSORBER TYPES
Ex. No. Structure of Light Absorber
340 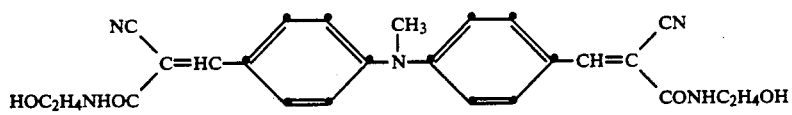
341 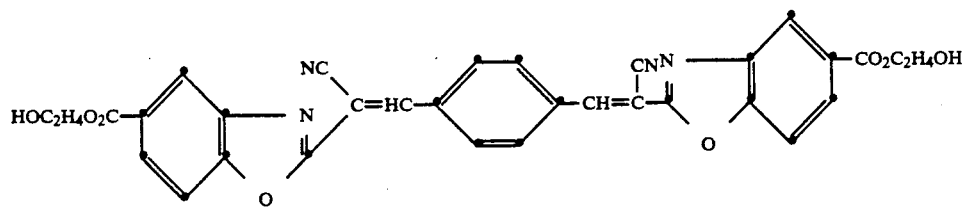
342 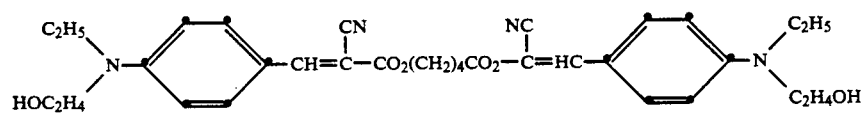
343 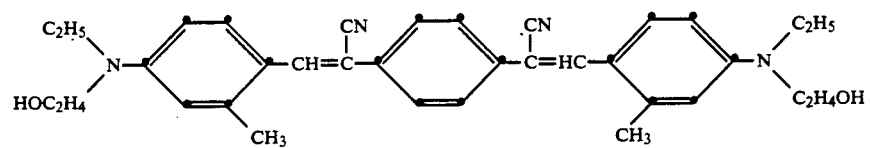
344 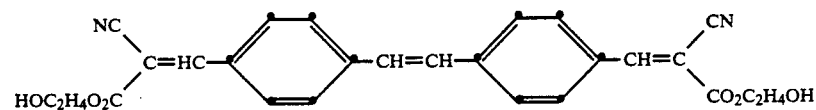
345 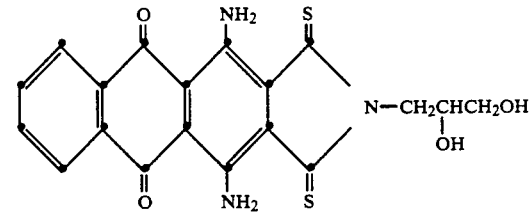
346 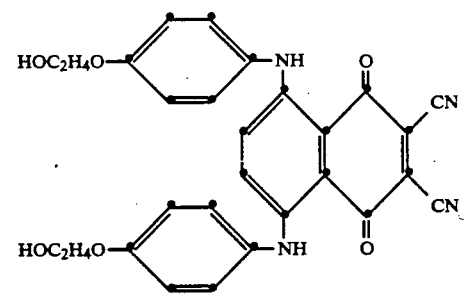
347 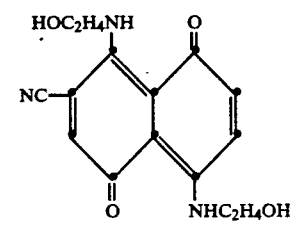

TABLE 10-continued
MISCELLANEOUS LIGHT ABSORBER TYPES
Ex. No. | Structure of Light Absorber
348
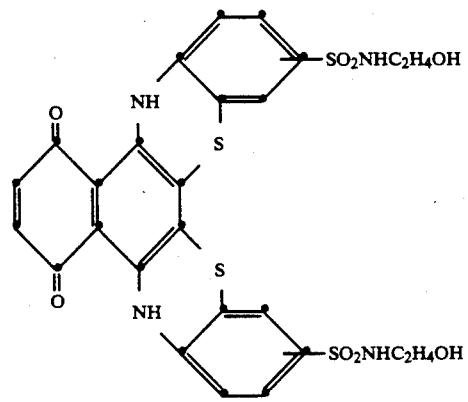
349
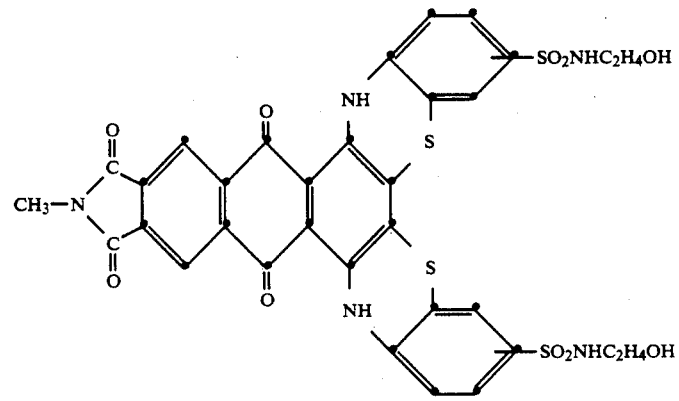
350
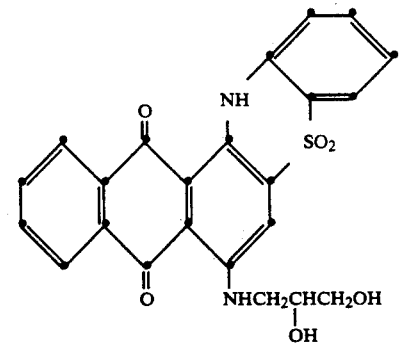
351
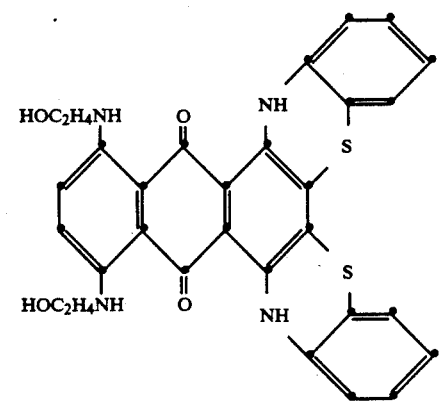

TABLE 10-continued
MISCELLANEOUS LIGHT ABSORBER TYPES

| Ex. No. | Structure of Light Absorber |
|---|---|
| 352 | 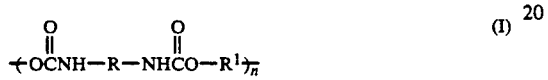 |

We claim:

1. A light-absorbing polyurethane composition comprising repeating units of Formula (I)

$$\text{---}(\text{OCNH}\text{---}\text{R}\text{---}\text{NHCO}\text{---}\text{R}^1)_n\text{---} \quad (I)$$

wherein

R is a divalent radical selected from $C_2$-$C_{10}$-alkylene, $C_3$-$C_8$-cycloalkylene, arylene, $C_1$-$C_4$-alkylene-arylene-$C_1$-$C_4$-alkylene, $C_1$-$C_4$-alkylene-$C_3$-$C_8$-cycloalkylene-$C_1$-$C_4$-alkylene or $C_1$-$C_4$-alkylene-1,2,3,4,5,6,7-octahydronaphthalene-2,6-diyl-$C_1$-$C_4$-alkylene, and such radicals substitued by one or more groups selected from $C_1$-$C_4$ alkoxy, halogen, aryl, cyano, $C_1$-$C_4$ alkanoyloxy, $C_1$-$C_4$ alkoxycarbonyl, or hydroxy;

$R^1$ is a divalent organic radical comprised of about 1 to about 75 mole percent of the residue of one or more light-absorbing organic diols, wherein the light-absorbing diol is selected from the following chromophoric types: azo, metallized azo, disazo, methine, or arylidene, polymethine, azomethine, anthraquinone, azamethine, anthrapyridone (3H-dibenz [f,ij] isoquinoline-2,7-dione, anthrapyridine (7H-dibenz [f,ij] isoquinoline-7-one), phthaloylphenothiazine (14H-naphtho [2,3-a] phenothiazine-8,13-dione, benzanthrone (7H(de)anthracene-7-one), anthrapyrimidine (7H-benzo [e] perimidine-7-one), anthrapyrazole, anthraisothiazole, triphenodioxazine, thiaxanthene-9-one, flourindine (5, 12-dihydroquinoxaline [2,3-b] phenazine), quinophthalone, phthalocyanine, naphthalocyanine, nickel dithiolenes, coumarin (2H-1-benzopyran-2-one), coumarin imine (2H-1-benzopyran-2-imine), indophenol, perinone, nitroarylamine, benzodifuran, phthaloylphenoxazine (14H-naphtho[2,3-a]phenoxazine-8,13-dione), phthaloylacridone (13H-naphtho[2,3-c] acridine 5,8,14-trione), anthraquinonethioxanthone (8H-naphtho[2,3-c]thioxanthene-5,8,13-trione), anthrapyridazone, naphtho[1',2',3':4,5]quino[2,1-b]quinazoline-5,10-dione, 1H-anthra(2,1-b)(1, 4) thiazin-7,12-dione, indigo, thioindigo, xanthene, acridine, azine, oxazine, 1,4- and 1,5-naphthoquinones, pyromellitic acid diimide, naphthalene-1,4,5,8-tetracarboxylic acid diimide, 3,4,9,10-perylenetetracarboxylic acid diimide, naphthoquinone, diminoisoindoline, naphthopyran (3H-naphtho[2,1-b]pyran-3-ones and 3-imines) and aminonaphthalimide;

wherein the hydroxy groups of said diols are bonded via alkylene moieties to the remainder of the light-absorbing organic compound, with any remainder of $R^1$ comprised of the residue of organic diols of the formula HO—$R^2$—OH;

wherein $R^2$ is a divalent radical selected from $C_2$-$C_{18}$ alkylene, $C_3$-$C_8$-cycloalkylene, $C_1$-$C_4$ alkylene-1,2,3,4,5,6,7,8-octahydronaphthalen-2,6-diyl-$C_1$-$C_4$ alkylene, $C_1$-$C_4$-alkylene-$C_3$-$C_8$-cycloalkylene-$C_1$-$C_4$-alkylene, $C_1$-$C_4$ alkylene-arylene-$C_1$-$C_4$-alkylene, $C_2$-$C_4$ alkylene-O—$C_2$-$C_4$ alkylene, $C_2$-$C_4$ alkylene-S—$C_2$-$C_4$ alkylene or $C_2$-$C_4$ alkylene-O—$C_2$-$C_4$ alkylene-O—$C_2$-$C_4$ alkylene; and n is equal to or greater than 2.

2. A light-absorbing polyurethane composition comprising repeating units for Formula (I)

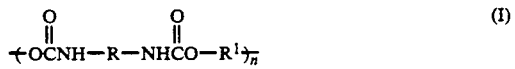

wherein

R is a divalent radical selected from $C_2$-$C_{10}$-alkylene, $C_3$-$C_8$-cycloalkylene, arylene, $C_1$-$C_4$-alkylene-arylene-$C_1$-$C_4$-alkylene, $C_1$-$C_4$-alkylene-$C_3$-$C_8$-cycloalkylene-$C_1$-$C_4$-alkylene or $C_1$-$C_4$-alkylene-1,2,3,4,5,6,7-octahydronaphthalene-2,6-diyl-$C_1$-$C_4$-alkylene, and such radicals substitued by one or more groups selected from $C_1$-$C_4$ alkoxy, halogen aryl, cyano, $C_1$-$C_4$ alkanoyloxy, $C_1$-$C_4$ alkoxycarbonyl, or hydroxy;

$R^1$ is a divalent organic radical comprised of about 5 to about 50 mole percent of the residue of one or more light-absorbing organic diols, wherein the light-absorbing diol is selected from the following chromophoric types: azo, metallized azo, disazo, methine, or arylidene, polymethine, azomethine, anthraquinone, azamethine, anthrapyridone (3H-dibenz [f,ij] isoquinoline-2,7-dione, anthrapyridine (7H-dibenz [f,ij] isoquinoline-7-one), phthaloylphenothiazine (14H-naphtho [2,3-a] phenothiazine-8,13-dione, benzanthrone (7H(de)anthracene-7-one), anthrapyrimidine (7H-benzo [e] perimidine-7-one), anthrapyrazole, anthraisothiazole, triphenodioxazine, thiaxanthene-9-one, flourindine (5, 12-dihydroquinoxaline [2,3-b] phenazine), quinophthalone, phthalocyanine, naphthalocyanine, nickel dithiolenes, coumarin (2H-1-benzopyran-2-one), coumarin imine (2H-1-benzopyran-2-imine), indophenol, perinone, nitroarylamine, benzodifuran, phthaloylphenoxazine (14H -naphtho[2,3-a]phenoxazine-8,13-dione), phthaloylacridone (13H-naphtho[2,3-c] acridine 5,8,14-trione), anthraquinonethioxanthone (8H-naphtho[2,3-c]thioxanthene-5,8,13-trione), anthrapyridazone, naphtho[1',2',3':4,5]quino[2,1-b] quinazoline-5,10-dione, 1H-anthra(2,1-b)(1, 4) thiazin-7,12-dione, indigo, thioindigo, xanthene, acridine, azine, oxazine, 1,4- and 1,5-naphthoquinones, pyromellitic acid diimide, naphthalene-1,4,5,8-tetracarboxylic acid diimide, 3,4,9,10-perylenetetracarboxylic acid diimide, naphthoquinone, diminoisoindoline, naphthopyran (3H-naphtho[2,1-b]pyran-3-ones and 3-imines) and aminonaphthalimide;

wherein the hydroxy groups of said diols are bonded via alkylene moieties to the remainder of the light-absorbing organic compound, with any remainder of $R^1$ comprised of the residue of organic diols of the formula HO—$R^2$—OH;

wherein $R^2$ is a divalent radical selected from $C_2$-$C_{18}$ alkylene, $C_3$-$C_8$-cycloalkylene, $C_1$-$C_4$ alkylene-1,2,3,4,5,6,7,8-octahydronaphthalen-2,6-diyl-$C_1$-$C_4$ alkylene, $C_1$-$C_4$-alkylene-$C_3$-$C_8$-cycloalkylene-$C_1$-$C_4$-alkylene, $C_1$-$C_4$ alkylene-arylene-$C_1$-$C_4$-alkylene, $C_2$-$C_4$ alkylene-O—$C_2$-$C_4$ alkylene, $C_2$-$C_4$ alkylene-S—$C_2$-$C_4$ alkylene or $C_2$-$C_4$ alkylene-O—$C_2$-$C_4$ alkylene-O—$C_2$-$C_4$ alkylene; and n is equal to or greater than 2.

wherein the hydroxy groups of said diols are bonded via alkylene moieties to the remainder of the light-absorbing organic compound, with any remainder of $R^1$ comprised of the residue of organic diols of the formula HO—$R^2$—OH; wherein $R^2$ is a divalent radical selected from $C_2$-$C_{18}$ alkylene, $C_3$-$C_8$-cycloalkylene, $C_1$-$C_4$ alkylene-1,2,3,4,5,6,7,8-octahydronaphthalen-2,6-diyl-$C_1$-$C_4$ alkylene, $C_1$-$C_4$-alkylene-$C_3$-$C_8$-cycloalkylene-$C_1$-$C_4$-alkylene, $C_1$-$C_4$ alkylene-arylene-$C_1$-$C_4$-alkylene, $C_2$-$C_4$ alkylene-O—$C_2$-$C_4$ alkylene, $C_2$-$C_4$ alkylene-S—$C_2$-$C_4$ alkylene or $C_2$-$C_4$ alkylene-O—$C_2$-$C_4$ alkylene-O—$C_2$-$C_4$ alkylene; and n is equal to or greater than 2.

3. The light-absorbing polyurethane composition of claim 1, wherein the light absorbing diol is one or more azo compound corresponding to Formula (II)

$$R^3-N=N-Y \qquad (II)$$

wherein $R^3$ is the residue of an aromatic amine which has been diazotized and coupled with a coupling component (Y) and is derived from the aromatic amine classes of aniline, 4-aminoazobenzene, 2-aminothiazole, 2-aminobenzothiazole, 3-amino-2,1-benzisothiazole, 2-aminothieno[2,3-d] thiazole, 5-aminoisothiazole, 5-aminopyrazole, 2-amino-1,3,4-thiadiazole, 5-amino-1,2,4-thiadiazole, 5-amino-1,2,3-triazole, 2(5) aminoimidazole, 3-aminopyridine, 2(3)aminothiophene, 3-aminobenzo [b] thiophene, 3-aminothieno [2,3-c] isothiazole, 3-amino-7-azabenz-2,1-isothiazole, 3-aminoisothiazole [3,4-d] pyrimidine, 3(4)-aminophthalimides and such heterocyclic rings substituted with one or more groups selected from $C_1$-$C_4$ alkyl, $C_4$-$C_7$ cycloalkyl, halogen, $C_1$-$C_4$ alkoxy, $C_1$-$C_4$ alkylthio, $C_1$-$C_4$ alkoxycarbonyl, $C_1$-$C_4$ alkanoyl, trifluoromethyl, cyano, dicyanovinyl, carbamoyl, —CONH—$C_1$-$C_4$ alkyl, —CON($C_1$-$C_4$ alkyl)$_2$, sulfamoyl, —SO$_2$N($C_1$-$C_4$-alkyl)$_2$, —SO$_2$NHC$_1$-$C_4$ alkyl, alkanoyl, aroyl, aryl, arylazo, heteroaryl, heteroarylazo, aryloxy, arylthio, heteroarylthio, arylsulfonyl, $C_1$-$C_4$ alkylsulfonyl, trifluoromethyl, fluorosulfonyl, trifluoromethylsulfonyl, thiocyano, or nitro, and wherein the alkyl portions of the above groups are optionally substituted by one or more groups selected from $C_1$-$C_4$ alkoxy, halogen, aryl, cyano, $C_1$-$C_4$ alkanoyloxy, $C_1$-$C_4$ alkoxycarbonyl, or hydroxy;

Y is selected from the coupler classes of anilines, 1,2-dihydroquinolines, 1,2,3,4-tetrahydroquinolines, benzomorpholines, (3,4-dihydro-2H-1,4-benzoxazines), 5-pyrazolones, 3-cyano-6-hydroxy-2-pyridones, 2,3-dihydroindoles, indoles, 4-hydroxycoumarins, 4-hydroxy-2-quinolones, imidazo [2,1-b] thiazoles, julolidines (2,3,6,7-tetrahydro-1H,5H-benzo[ij]quinolizines), 1-oxajulolidines, 1,2,5,6-tetrahydro-4H-pyrrolo]-3,2,1-ij]quinolines, 2,6-diamino-3-cyanopyridines, 2-aminothiazoles, 2-aminothiophenes, naphthylamines, 5,5-dimethyl-1,3-cyclohexane dione (dimedone) phenols, naphthols, or acetoacetarylides; with the proviso that two aliphatic hydroxy groups are present in the compound of formula (II).

4. The light-absorbing polyurethane composition of claim 1, wherein the light-absorbing diol is one or more disazo compounds corresponding to Formula (III)

$$R^3-N=N-R^4-N=N-Y \qquad (III)$$

wherein $R^3$ is the residue of an aromatic amine which has been diazotized and coupled with a coupling component (Y) and is derived from the aromatic amine classes of aniline, 4-aminoazobenzene, 2-aminothiazole, 2-aminobenzothiazole, 3-amino-2,1-benzisothiazole, 2-aminothieno[2,3-d] thiazole, 5-aminoisothiazole, 5-aminopyrazole, 2-amino-1,3,4-thiadiazole, 5-amino-1,2,4-thiadiazole, 5-amino-1,2,3-triazole, 2(5) aminoimidazole, 3-aminopyridine, 2(3)aminothiophene, 3-aminobenzo [b] thiophene, 3-aminothieno [2,3-c] isothiazole, 3-amino-7-azabenz-2,1-isothiazole, 3-aminoisothiazole [3,4-d] pyrimidine, 3(4)-aminophthalimides and such heterocyclic rings substituted with one or more groups selected from $C_1$-$C_4$ alkyl, $C_4$-$C_7$ cycloalkyl, halogen, $C_1$-$C_4$ alkoxy, $C_1$-$C_4$ alkylthio, $C_1$-$C_4$ alkoxycarbonyl, $C_1$-$C_4$ alkanoyl, trifluoromethyl, cyano, dicyanovinyl, carbamoyl, —CONH—$C_1$-$C_4$ alkyl, —CON($C_1$-$C_4$ alkyl)$_2$, sulfamoyl, —SO$_2$N($C_1$-$C_4$-alkyl)$_2$, —SO$_2$NHC$_1$-$C_4$ alkyl, alkanoyl, aroyl, aryl, arylazo, heteroaryl, heteroarylazo, aryloxy, arylthio, heteroarylthio, arylsulfonyl, $C_1$-$C_4$ alkylsulfonyl, trifluoromethyl, fluorosulfonyl, trifluoromethylsulfonyl, thiocyano, or nitro, and wherein the alkyl portions of the above groups are optionally substituted by one or more groups selected from $C_1$-$C_4$ alkoxy, halogen, aryl, cyano, $C_1$-$C_4$ alkanoyloxy, $C_1$-$C_4$ alkoxycarbonyl, or hydroxy;

the coupling component (Y) is selected from the coupler classes of anilines, 1,2-dihydroquinolines, 1,2,3,4-tetrahydroquinolines, benzomorpholines, (3,4-dihydro-2H-1,4-benzoxazines), 5-pyrazolones, 3-cyano-6-hydroxy-2-pyridones, 2,3-dihydroindoles, indoles, 4-hydroxycoumarins, 4-hydroxy-2- quinolones, imidazo [2,1-b] thiazoles, julolidines (2,3,6,7-tetrahydro-1H,5H-benzo[ij]quinolizines), 1-oxajulolidines, 1,2,5,6-tetrahydro-4H-pyrrolo]3,2,1-ij]quinolines, 2,6-diamino-3-cyanopyridines, 2-aminothiazoles, 2-aminothiophenes, naphthylamines, 5,5-dimethyl-1,3-cyclohexane dione (dimedone) phenols, naphthols, or acetoacetarylides;

and $R^4$ is a divalent aromatic radical selected from 1,4-phenylene, naphthalene-1,4-diyl, thiazol-2,5-diyl, and thiophene-2,5-diyl:

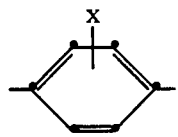

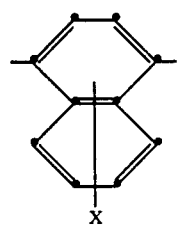

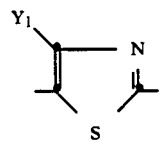

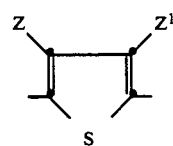

wherein

X is hydrogen or 1-2 groups selected from halogen, $C_1-C_4$ alkyl, $C_1-C_4$ alkoxy, —NHCOC$_1$-C$_4$ alkyl, —NHCO$_2$C$_1$-C$_4$ alkyl, —NHCO-aryl, —NHCONH-aryl, or —NHCONHC$_1$-C$_4$ alkyl;

$Y_1$ and Z are individually selected from hydrogen, $C_1-C_4$ alkyl, halogen, hetero or aryl; and $Z^1$ is selected from hydrogen, $C_1-C_4$ alkoxycarbonyl, cyano, carbamoyl, aroyl, arylsulfonyl, —CONH-$C_1-C_4$ alkyl, or $C_1-C_4$ alkylsulfonyl; wherein the alkyl portion of the groups X, Y, and Z, are optionally substituted by one or more groups selected from $C_1-C_4$-alkoxy, halogen, aryl, cyano, $C_1-C_4$-alkanoyloxy, $C_1-C_4$-alkoxycarbonyl or hydroxy; provided that two aliphatic hydroxy groups are present.

5. The light-absorbing polyurethane composition of claim 1, wherein the light-absorbing diol is one or more azamethine, methine, or arylidene compounds corresponding to Formulae (IV), (V), (VI), (VII), (VIII) and (IX):

$R^5$—CH=A  (IV)

$R_5$—$\overset{CN}{\underset{|}{C}}$=A  (V)

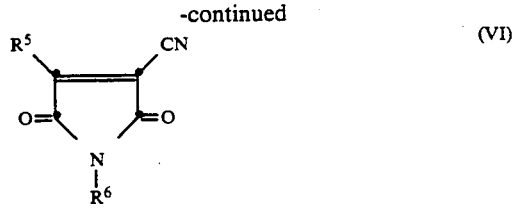 (VI)

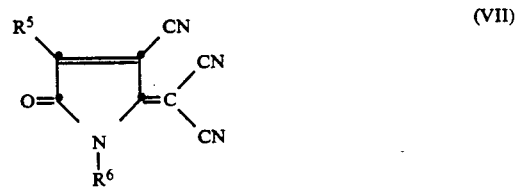 (VII)

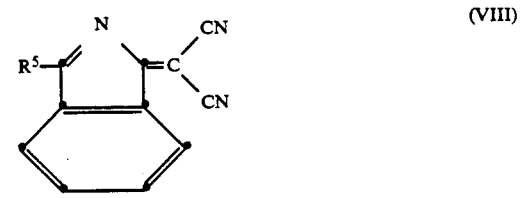 (VIII)

$R_5$—N=A  (IX)

wherein $R^5$ is the residue of an aniline, 1-naphthylamine, 1,2-dihydroquinoline, 1,2,3,4-tetrahydroquinoline, 1,3,3-trimethyl-2-methyleneindoline, 1,3-dihydro-2-methylene-1,1,3-trimethyl-2H-bene[e]indole, benzomorpholine (3,4-dihydro-2H-1,4-benzoxazine), 2,3-dihydroindole, 2-aminothiazole, julolidine (2,3,6,7-tetrahydro- 1H,5H- benz ij]quinolizine), 1-oxajulolidine, 4H-pyrrolo [3,2,1-ij] quinoline, phenol, naphthol, thiophenol, pyrrole, pyrazole, furan, thiophene, carbazole, phenathiozine or phenoxazine;

$R^6$ is selected from hydrogen, $C_1-C_4$ alkyl, $C_3-C_8$ cycloalkyl, aryl, $C_1-C_4$-alkylene-aryl-, or $C_1-C_4$ alkylene-$C_3-C_8$ cycloalkylene, wherein the $C_1-C_4$ alkyl groups is optionally substituted by one or more groups selected from hydroxy, halo, $C_1-C_4$ alkoxy, $C_1-C_4$ alkanoyloxy, or $C_1-C_4$ alkoxycarbonyl;

A is the residue of an active methylene compound selected from malonitrile, α-cyanoacetic acid esters, malonic acid esters, alpha-cyanoacetic acid amides, α-$C_1-C_4$ alkylsulfonylacetonitriles, α-arylsulfonylacetonitriles, α-$C_1-C_4$ alkanoylacetonitriles, α-aroylacetonitriles, α-heteroarylacetonitriles, 1,3-indandione, 2(5H)-furanones, 3-cyano-1,6-dihydro-4-methyl-2,6-dioxy (2H)-pyridines, benzo (b) thieno-3-ylidenepropanedinitrile-5,5-dioxides, 1,3-bis(dicyanomethylene)indanes, barbituric acid, 5-pyrazolones, dimedone, 3-oxo-2,3-dihydro-1-benzothiophene-1,1-dioxides, or aryl-C(CH$_3$)C=C(CN)$_2$.

6. The light-absorbing polyurethane composition of claim 1, wherein the light-absorbing diol is one or more azo-methine compounds corresponding to Formula (X):

A=HC—$R^4$—N=N—Y  (X)

wherein

A is the residue of an active methylene compound selected from malonitrile, α-cyanoacetic acid esters, malonic acid esters, alpha-cyanoacetic acid amides, α-$C_1$-$C_4$ alkylsulfonylacetonitriles, α-arylsulfonylacetonitriles, α-$C_1$-$C_4$ alkanoylacetonitriles, α-aroylacetonitriles, α-heteroarylacetonitriles, 1,3-indandione, 2(5H)-furanones, 3-cyano-1,6-dihydro-4-methyl-2,6-dioxy (2H)-pyridines, benzo (b) thieno-3-ylidenepropanedinitrile-5,5-dioxides, 1,3-bis(dicyanomethylene)indanes, barbituric acid, 5-pyrazolones, dimedone, 3-oxo-2,3-dihydro-1-benzothiophene-1,1-dioxides, or aryl-$C(CH_3)C{=}C(CN)_2$;

$R^4$ is a divalent aromatic radical selected from 1,4-phenylene, naphthalene-1,4-diyl, thiazol-2,5-diyl, and thiophene-2,5-diyl:

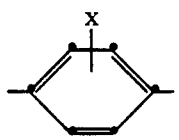

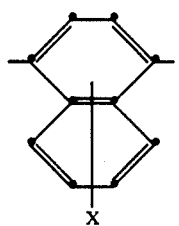

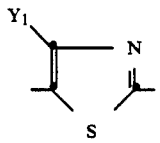

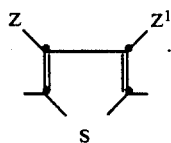

wherein

X is hydrogen or 1-2 groups selected from halogen, $C_1$-$C_4$ alkyl, $C_1$-$C_4$ alkoxy, —$NHCOC_1$-$C_4$ alkyl, —$NHCO_2C_1$-$C_4$ alkyl, —NHCO-aryl, —NHCONH-aryl, or —$NHCONHC_1$-$C_4$ alkyl;

$Y_1$ and Z are individually selected from hydrogen, $C_1$-$C_4$ alkyl, halogen, hetero or aryl; and $Z^1$ is selected from hydrogen, $C_1$-$C_4$ alkoxycarbonyl, cyano, carbamoyl, aroyl, arylsulfonyl, —$CONH$-$C_1$-$C_4$ alkyl, or $C_1$-$C_4$ alkylsulfonyl; wherein the alkyl portion of the groups X, Y, and Z, are optionally substituted by one or more groups selected from $C_1$-$C_4$-alkoxy, halogen, aryl, cyano, $C_1$-$C_4$-alkanoyloxy, $C_1$-$C_4$-alkoxycarbonyl or hydroxy; and wherein Y is selected from the coupler classes of anilines, 1,2-dihydroquinolines, 1,2,3,4-tetrahydroquinolines, benzomorpholines, (3,4-dihydro-2H-1,4-benzoxazines), 5-pyrazolones, 3-cyano-6-hydroxy-2-pyridones, 2,3-dihydroindoles, indoles, 4-hydroxycoumarins, 4-hydroxy-2- quinolones, imidazo [2,1-b] thiazoles, julolidines (2,3,6,7-tetrahydro-1H,5H-benzo[ij]quinolizines), 1-oxajulolidines, 1,2,5,6-tetrahydro-4H-pyrrolo]3,2,1-ij]quinolines, 2,6-diamino-3-cyanopyridines, 2-amino thiazoles, 2-aminothiophenes, naphthylamines, 5,5-dimethyl-1,3-cyclohexane dione (dimedone) phenols, naphthols, or acetoacetarylides; with the proviso that two aliphatic hydroxy groups are present in the compound of Formula (X).

7. The light-absorbing polyurethane composition of claim 1, wherein the light-absorbing diol is one or more anthraquinone or anthrapyridone compounds corresponding to compounds of Formulae (XI) and (X(0, respectively:

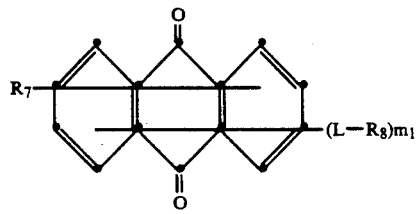

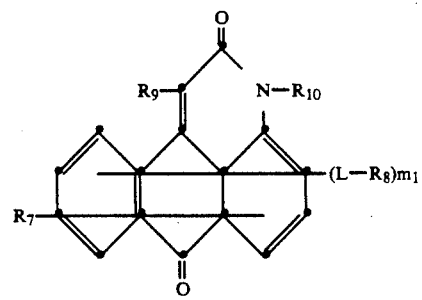

wherein

L is a divalent linking moiety selected from —O—, —NH—, —S—, —$SO_2$—, —$SO_2N(R^{10})$—, or —$CO_2$—;

$R^7$ is hydrogen or 1-4 groups selected from amino, —$NHC_1$-$C_4$-alkyl, —$NHC_3$-$C_8$-cycloalkyl, —NH-aryl, halo, $C_1$-$C_4$ alkoxy, aroyl, $C_1$-$C_4$ alkanoyloxy, aryloxy, $C_1$-$C_4$ alkylthio, arylthio, heteroarylthio, cyano, nitro, trifluoromethyl, —$CO_2C_1$-$C_4$-alkyl, —$SO_2NHC_1$-$C_4$ alkyl, —$SO_2N(C_1$-$C_4$ alkyl$)_2$, $C_1$-$C_4$ alkyl, or hydroxy;

$R^8$ is a hydrocarbyl radical selected from $C_2$-$C_4$-alkylene-$(OH)_m$, $C_2$-$C_4$-alkylene-L—$C_2$-$C_4$-alkylene-$(OH)_m$, arylene-$(C_1$-$C_4$-alkylene-OH$)_m$, arylene-(L—$C_1$-$C_4$-alkylene-OH$)_m$, arylene-L—$C_1$-$C_4$-alkylene$(OH)_m$, $C_2$-$C_4$-alkylene-L-arylene-L—$C_2$-$C_4$-alkylene$(OH)_m$, or $C_1$-$C_4$-alkylene-cycloalkylene-$C_1$-$C_4$-alkylene-OH;

$R^9$ is selected from hydrogen, cyano, $C_1$-$C_4$ alkylamino, $C_1$-$C_4$ alkoxy, halogen, —L—$R^8$, —$CO_2C$-$1$-$C_4$-alkyl, $C_1$-$C_4$ alkanoyl, aroyl, or aylsulfonyl;

$R^{10}$ is selected from hydrogen, $C_1$-$C_4$ alkyl, $C_1$-$C_4$ hydroxyalkyl, $C_3$-$C_8$ cycloalkyl, aryl, or $R^8$;

m is one or two;

$m_1$ is zero, one, or two; wherein the alkyl portion of the groups $R_7$, $R_8$, $R_9$ and $R_{10}$ are optionally substituted by one or more groups selected from $C_1$-$C_4$-alkoxy, halogen, aryl, cyano, $C_1$-$C_4$-alkanoyloxy, $C_1$-$C_4$-alkoxycarbonyl or hydroxy; provided that two aliphatic hydroxy groups are present in the compound of Formula (XI) or (XII) and that when $m_1$ is zero, $(L—R^9)m_1$ equals hydrogen.

8. The light-absorbing polyurethane composition of claim 3, wherein Y is selected from the following formulae:

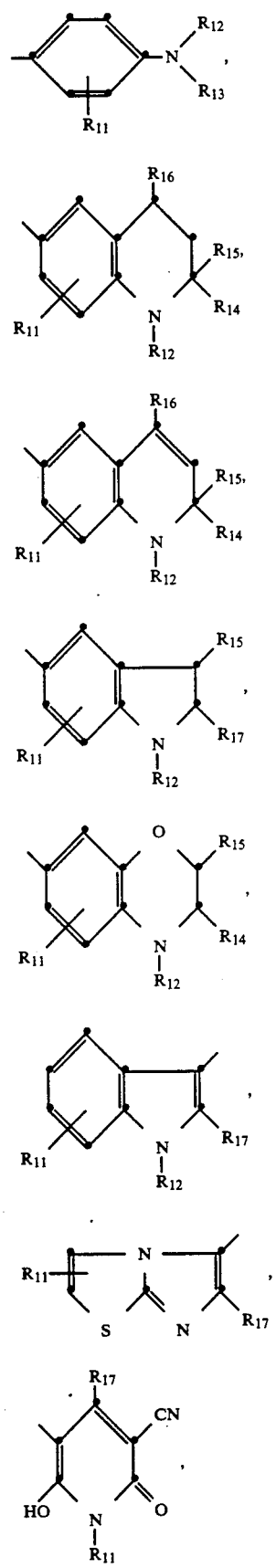

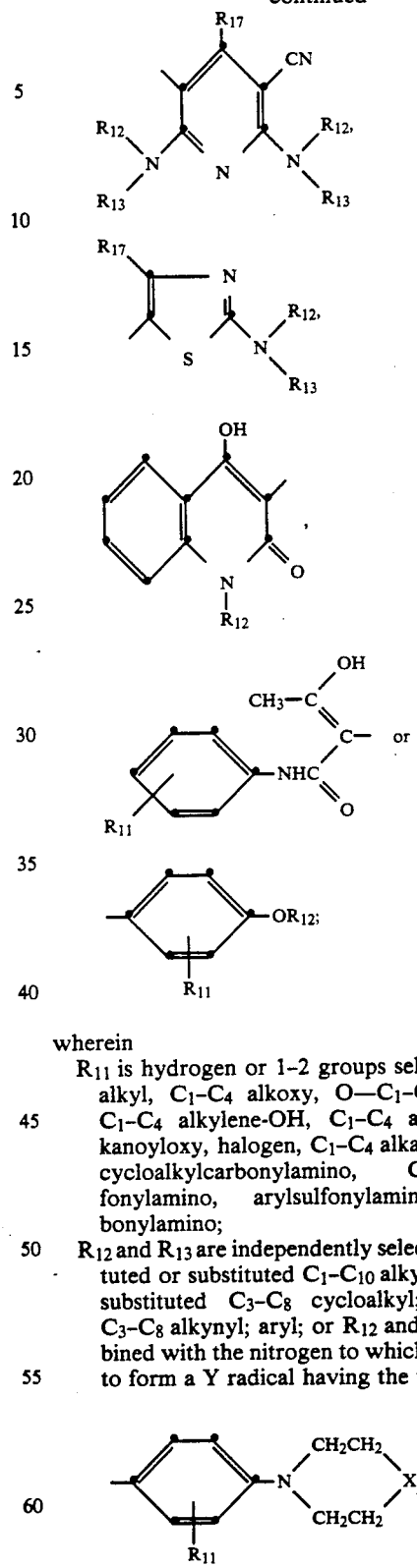

wherein
R$_{11}$ is hydrogen or 1-2 groups selected from C$_1$-C$_4$ alkyl, C$_1$-C$_4$ alkoxy, O—C$_1$-C$_4$ alkylene—OH, C$_1$-C$_4$ alkylene-OH, C$_1$-C$_4$ alkylene-C$_1$-C$_4$ alkanoyloxy, halogen, C$_1$-C$_4$ alkanoylamino, C$_3$-C$_8$ cycloalkylcarbonylamino, C$_1$-C$_4$ alkylsulfonylamino, arylsulfonylamino or arylcarbonylamino;

R$_{12}$ and R$_{13}$ are independently selected from unsubstituted or substituted C$_1$-C$_{10}$ alkyl; unsubstituted or substituted C$_3$-C$_8$ cycloalkyl; C$_3$-C$_8$ alkenyl; C$_3$-C$_8$ alkynyl; aryl; or R$_{12}$ and R$_{13}$ may be combined with the nitrogen to which they are attached to form a Y radical having the formula

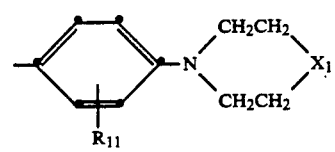

wherein
X$_1$ is selected from a covalent bond, —CH$_2$—, —O—, —S—, —SO$_2$—, —C(O)—, —CO$_2$—, —N(C$_1$-C$_4$ alkyl), —N(COC$_1$-C$_4$ alkyl)-, —N(SO$_2$C$_1$-C$_4$ alkyl)-, —N(CO-aryl)- or —N(SO$_2$-aryl)-;

R$_{14}$, R$_{15}$, and R$_{16}$ are hydrogen or C$_1$-C$_4$ alkyl; and R$_{17}$ is selected from hydrogen, unsubstituted or substituted C$_1$-C$_{10}$ alkyl, C$_3$-C$_7$-cycloalkyl, heteroaryl or aryl; with the provision that two aliphatic hydroxy groups are present in the light absorbing compound.

9. The light-absorbing polyurethane composition of claim 4, wherein Y is selected from the following formulae:

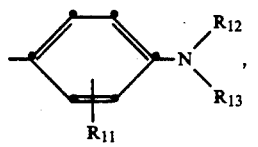

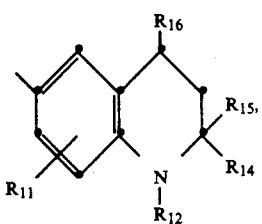

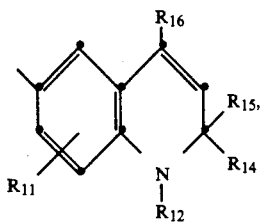

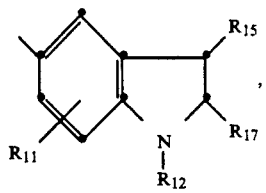

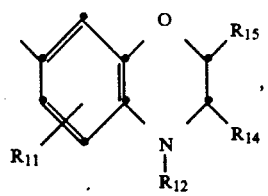

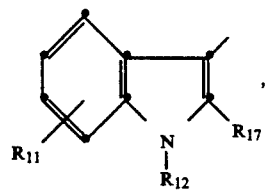

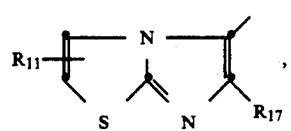

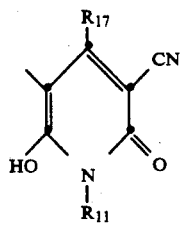

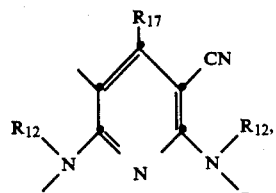

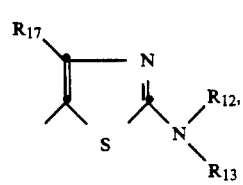

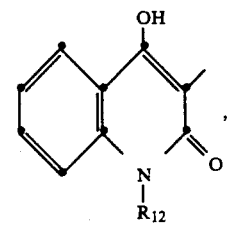

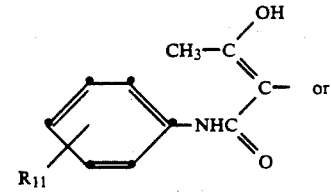

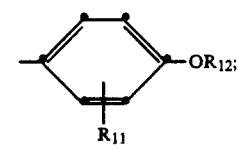

wherein
R$_{14}$ is hydrogen or 1-2 groups selected from C$_1$-C$_4$ alkyl, C$_1$-C$_4$ alkoxy, O—C$_1$-C$_4$ alkylene-OH, C$_1$-C$_4$ alkylene-OH, C$_1$-C$_4$ alkylene-C$_1$-C$_4$ alkanoyloxy, halogen, C$_1$-C$_4$ alkanoylamino, C$_3$-C$_8$ cycloalkylcarbonylamino, C$_1$-C$_4$ alkylsulfonylamino, arylsulfonylamino or arylcarbonylamino;

R$_{12}$ and R$_{13}$ are independently selected from unsubstituted or substituted C$_1$-C$_4$ alkyl; unsubstituted or substituted C$_3$-C$_8$ cycloalkyl; C$_3$-C$_8$ alkenyl; C$_3$-C$_8$ alkynyl; aryl; or R$_{12}$ and R$_{13}$ may be combined with the nitrogen to which they are attached to form a Y radical having the formula

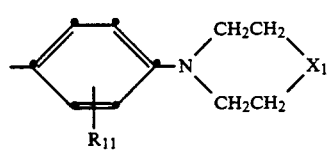

wherein $X_1$ is selected from a covalent bond, —CH$_2$—, —O—, —S—, —SO$_2$—, —C(O)—, —CO$_2$—, —N(C$_1$-C$_4$ alkyl) —N(COC$_1$-C$_4$ alkyl)-, —N(SO$_2$C$_1$-C$_4$ alkyl)-, —N(CO-aryl)- or —N(SO$_2$-aryl)-;

$R_{14}$, $R_{15}$, and $R_{16}$ are hydrogen or C$_1$-C$_4$ alkyl; and $R_{17}$ is selected from hydrogen, unsubstituted or substituted C$_1$-C$_{10}$ alkyl, C$_3$-C$_7$-cycloalkyl, heteroaryl or aryl; with the provision that two aliphatic hydroxy groups are present in the light absorbing compound.

10. The light-absorbing polyurethane composition of claim 6, wherein Y is selected from the following formulae:

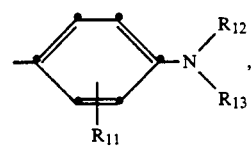

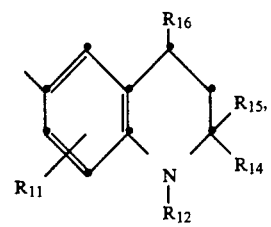

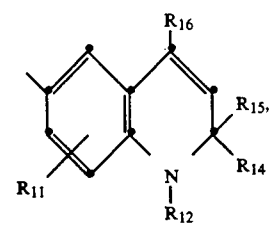

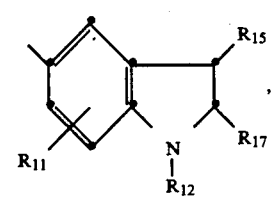

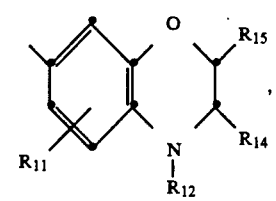

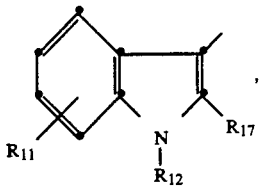

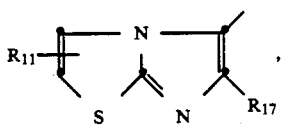

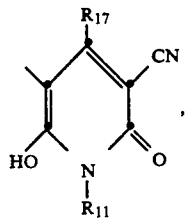

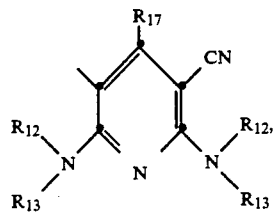

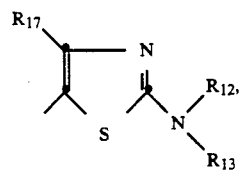

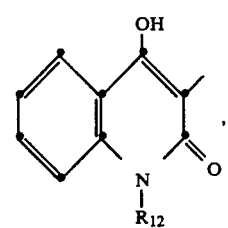

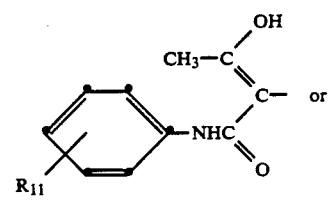

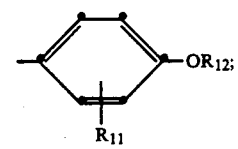

wherein
$R_{11}$ is hydrogen or 1-2 groups selected from C$_1$-C$_4$ alkyl, C$_1$-C$_4$ alkoxy, O—C$_1$-C$_4$ alkylene-OH, C$_1$-C$_4$ alkylene-OH, C$_1$-C$_4$ alkylene-C$_1$-C$_4$ alkanoyloxy, halogen, $C_1$-$C_4$ alkanoylamino, $C_3$-$C_8$ cycloalkylcarbonylamino, $C_1$-$C_4$ alkylsulfonylamino, arylsulfonylamino or arylcarbonylamino;

$R_{12}$ and $R_{13}$ are independently selected from unsubstituted or substituted $C_1$-$C_{10}$ alkyl; unsubstituted or substituted $C_3$-$C_8$ cycloalkyl; $C_3$-$C_8$ alkenyl; $C_3$-$C_8$ alkynyl; aryl; or $R_{12}$ and $R_{13}$ may be combined with the nitrogen to which they are attached to form a Y radical having the formula

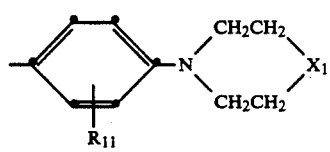

wherein $X_1$ is selected from a covalent bond, —$CH_2$—, —O—, —S—. —$SO_2$—, —C(O)—, —$CO_2$—, —N($C_1$-$C_4$ alkyl), —N(CO$C_1$-$C_4$ alkyl)-, —N($SO_2C_1$-$C_4$ alkyl)-, —N(CO-aryl)- or —N(-$SO_2$-aryl)-;

$R_{14}$, $R_{15}$, and $R_{16}$ are hydrogen or $C_1$-$C_4$ alkyl; and $R_{17}$ is selected from hydrogen, unsubstituted or substituted $C_1$-$C_{10}$ alkyl, $C_3$-$C_7$-cycloalkyl, heteroaryl or aryl; with the provision that two aliphatic hydroxy groups are present in the light absorbing compound.

11. The polyurethane composition of claim 5, wherein $R_5$ is selected from the following formulae:

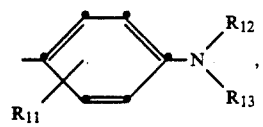

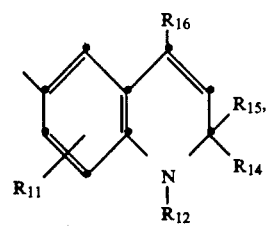

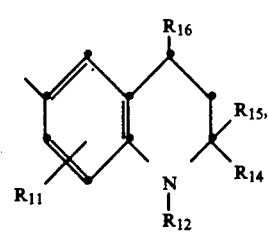

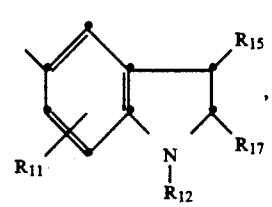

-continued

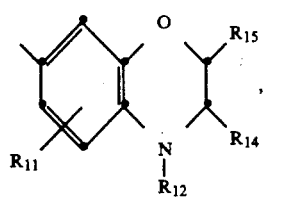

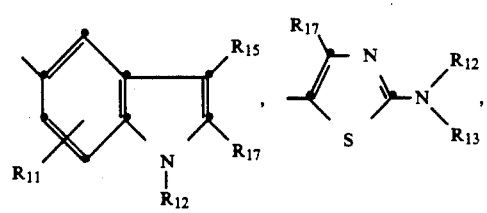

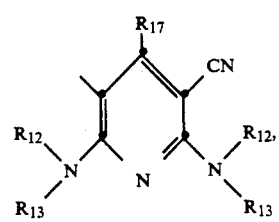

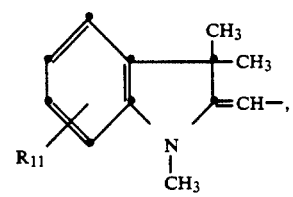

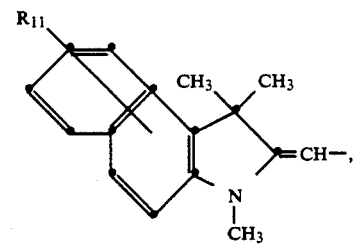

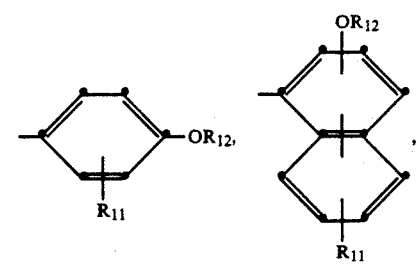

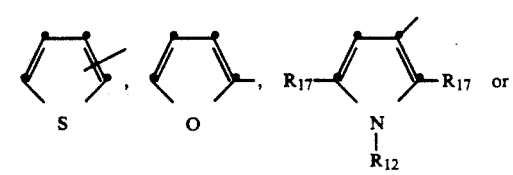

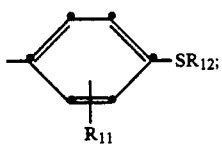

wherein $R_{11}$, $R_{12}$, $R_{13}$, $R_{14}$, $R_{15}$, $R_{16}$ and $R_{17}$ are as defined in claim 5 in the definition of Y; with the provision that two aliphatic hydroxy groups be present.

12. The light-absorbing polyurethane composition of claim 1, wherein the light-absorbing diol is a polymethine compound corresponding to the following formulae:

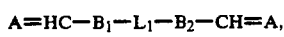

$A=HC-B_1-L_1-B_2-CH=A$,

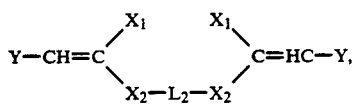

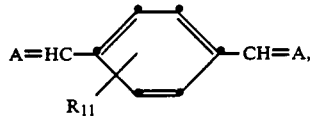

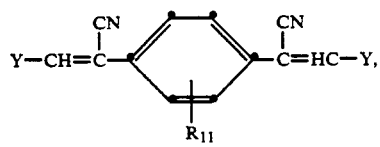

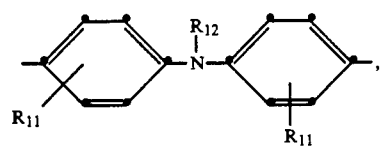

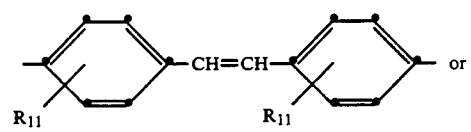

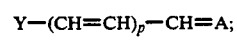

$Y-(CH=CH)_p-CH=A$;

wherein

A is the residue of an active methylene compound selected from malonitrile, α-cyanoacetic acid esters, malonic acid esters, alpha-cyanoacetic acid amides, α-$C_1$-$C_4$ alkylsulfonylacetonitriles, α-arylsulfonylacetonitriles, α-$C_1$-$C_4$ alkanoylacetonitriles, α-aroylacetonitriles, α-heteroarylacetonitriles, 1,3-indandione, 2(5H)-furanones, 3-cyano-1,6-dihydro-4-methyl-2,6-dioxy (2H)-pyridines, benzo (b) thieno-3-ylidenepropanedinitrile-5,5-dioxides, 1,3-bis(dicyanomethylene)indanes, barbituric acid, 5-pyrazolones, dimedone, 3-oxo-2,3-dihydro-1-benzothiophene-1,1-dioxides, or aryl-C(CH$_3$)C=C(CN)$_2$;

$R_{11}$ is hydrogen or 1-2 groups selected from $C_1$-$C_4$ alkyl, $C_1$-$C_4$ alkoxy, O-$C_1$-$C_4$ alkylene-OH, $C_1$-$C_4$ alkylene-OH, $C_1$-$C_4$ alkylene-$C_1$-$C_4$ alkanoyloxy, halogen, $C_1$-$C_4$ alkanoylamino, $C_3$-$C_8$ cycloalkylcarbonylamino, $C_1$-$C_4$ alkylsulfonylamino, arylsulfonylamino or arylcarbonylamino;

Y is selected from the coupler classes of anilines, 1,2-dihydroquinolines, 1,2,3,4-tetrahydroquinolines, benzomorpholines, (3,4-dihydro-2H-1,4-benzoxazines), 5-pyrazolones, 3-cyano-6-hydroxy-2-pyridones, 2,3-dihydroindoles, indoles, 4-hydroxycoumarins, 4-hydroxy-2-quinolones, imidazo[2,1-b]thiazoles, julolidines (2,3,6,7-tetrahydro-1H,5H-benzo[ij]quinolizines), 1-oxajulolidines, 1,2,5,6-tetrahydro-4H-pyrrolo]-3,2,1-ij]quinolines, 2,6-diamino-3-cyanopyridines, 2-aminothiazoles, 2-aminothiophenes, naphthylamines, 5,5-dimethyl-1,3-cyclohexane dione (dimedone) phenols, naphthols, or acetoacetarylides; with the proviso that two aliphatic hydroxy groups are present in the polymethine compound;

$X_1$ is selected from cyano, aryl, heteroaryl, $C_1$-$C_4$-alkoxycarbonyl, arylsulfonyl or $C_1$-$C_4$-alkoxycarbonyl; $X_2$ is selected from —CO$_2$—, SO$_2$, CON($R_{17}$) or arylene; $L_1$ is selected from a covalent bond; unsubstituted or substituted phenylene; $C_3$-$C_8$ cycloalkylene; —O—; —S—; —SO$_2$—; —CO—; —CO$_2$—; —OCO$_2$—; —O$_2$C-alkylene-CO$_2$—; —O$_2$C-arylene-CO$_2$; —O$_2$C-$C_3$-$C_8$-cycloalkylene-CO$_2$—; —O$_2$CNH-alkylene-NHCO$_2$—; —O$_2$CNH-arylene-NHCO$_2$—; —SO$_2$N($R_{17}$)—; —SO$_2$-alkylene-SO$_2$—; —SO$_2$-arylene-SO$_2$—; —SO$_2$N($R_{17}$)-alkylene-N($R_{17}$)SO$_2$; —SO$_2$N($R_{17}$)-arylene-N($R_{17}$)SO$_2$; —N(SO$_2$$C_1$-$C_4$ alkyl)-; —N-(SO$_2$ aryl)-; —O-alkylene-O— or -O-arylene-O-; $L_2$ is selected from unsubstituted or substituted alkylene, $C_3$-$C_8$ cycloalkylene, arylene, alkylene-arylene-alkylene, alkylene-($C_3$-$C_8$)cycloalkylene-alkylene, alkylene-O-alkylene, alkylene-S-alkylene, alkylene-SO$_2$-alkylene, alkylene-O-arylene-O-alkylene, alkylene-N(SO$_2$ $C_1$-$C_4$-alkyl) or alkylene-arylene; $B_1$ and $B_2$ are selected independently from the following formulae:

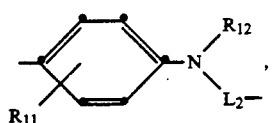

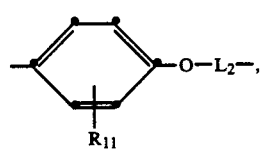

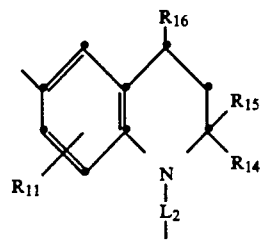

-continued

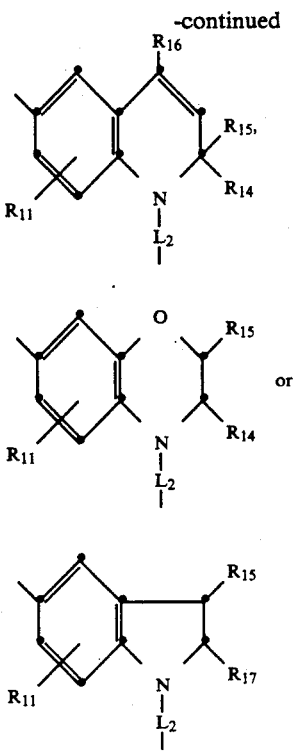

wherein $R_{12}$, $R_{14}$, $R_{15}$, $R_{16}$ and $R_{17}$ are as defined above; p is an integer of 1–3; with the proviso that two aliphatic hydroxy groups be present in the light absorbing compound.

13. The light-absorbing polyurethane composition of claim 1, wherein the light-absorbing diol is a coumarin compound corresponding to the following formulae:

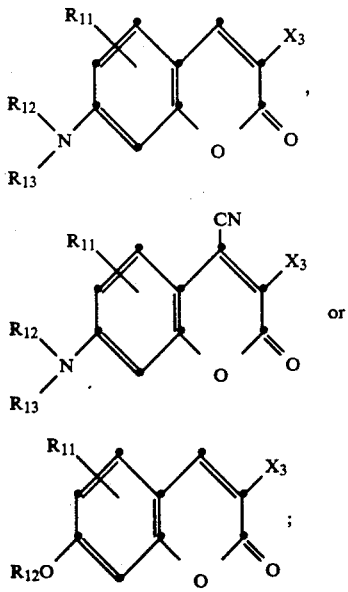

wherein $R_{11}$, $R_{12}$ and $R_{13}$ are as defined above; $X_3$ is selected from cyano, $C_1$–$C_4$-alkoxycarbonyl, $C_1$–$C_4$ alkylsulfonyl, aryl, arylsulfonyl, heteroaryl, formyl, aroyl, $C_1$–$C_4$-alkanoyl or —CH=A, wherein A is the residue of an active methylene compound as defined above; with the proviso that two aliphatic groups be present.

14. A light-absorbing thermoplastic polymer composition which comprises one or more thermoplastic polymers and one or more light-absorbing polyurethane compositions of claim 1.

15. The light-absorbing thermoplastic polymer composition of claim 14 wherein the thermoplastic polymer is selected from a list consisting of polyesters, polyolefins, polyamides, polyimides, polyvinyl chloride, polyvinylidene chloride, polyurethanes, polycarbonates, cellulose esters, polyacrylates, polyvinylesters, polyester-amides, polystyrene, acrylonitrile-butadienestyrene, and styrene-acrylonitrile.

16. The light-absorbing thermoplastic polymer composition of claim 14, wherein the thermoplastic polymer is a polyolefin.

17. The light-absorbing thermoplastic polymer composition of claim 14, wherein the polyolefin is polyethylene, polypropylene, or polybutylene.

18. The light-absorbing thermoplastic polymer composition of claim 14, wherein the polyolefin is a copolymer comprising any combination of polyethylene, polypropylene, and polybutylene.

19. The light-absorbing thermoplastic polymer composition of claim 14, wherein at least one of the thermoplastic polymers is a polyamide.

20. The light-absorbing thermoplastic polymer composition of claim 14, wherein at least one of the thermoplastic polymers is a polyurethane.

21. The light-absorbing thermoplastic polymer composition of claim 14, wherein at least one of the thermoplastic polymers is polyvinyl chloride.

22. The light-absorbing thermoplastic polymer composition of claim 14, wherein at least one of the thermoplastic polymers is polyvinylidene chloride.

23. The light-absorbing thermoplastic polymer composition of claim 14, wherein at least one of the thermoplastic polymers is a polycarbonate.

24. The light-absorbing thermoplastic polymer composition of claim 14, wherein at least one of the thermoplastic polymers is a polyester.

25. The light-absorbing thermoplastic polymer composition of claim 14, wherein at least one of the thermoplastic polymers is a cellulose ester or mixtures thereof.

26. The light-absorbing thermoplastic polymer composition of claim 14, wherein at least one of the thermoplastic polymers is selected from a list consisting of cellulose acetate, cellulose propionate, cellulose butyrate, cellulose acetate, propionate, and cellulose acetate, butyrate.

27. The light-absorbing thermoplastic polymer composition of claim 14, wherein at least one of the thermoplastic polymers is a polyacrylate.

28. The light-absorbing thermoplastic polymer composition of claim 14, wherein at least one of the thermoplastic polymers is a polyester-amide.

29. The light-absorbing thermoplastic polymer composition of claim 14, wherein at least one of the thermoplastic polymers is polystyrene.

30. The light-absorbing thermoplastic polymer composition of claim 14, wherein the thermoplastic polymer is a blend of a polyester and a polycarbonate.

31. A shaped or formed article comprised of the light-absorbing polyester composition of claim 1.

32. A shaped or formed article comprised of the light-absorbing thermoplastic polymer composition of claim 2.

33. A shaped or formed article comprised of the light-absorbing thermoplastic polymer composition of claim 14.

* * * * *

REEXAMINATION CERTIFICATE (2607th)

United States Patent [19]

Krutak et al.

[11] B1 5,194,463

[45] Certificate Issued Jun. 20, 1995

[54] LIGHT-ABSORBING POLYURETHANE COMPOSITIONS AND THERMOPLASTIC POLYMERS COLORED THEREWITH

[75] Inventors: James J. Krutak; Max A. Weaver; William W. Parham; Wayne P. Pruett, all of Kingsport, Tenn.

[73] Assignee: Eastman Kodak Company, Rochester, N.Y.

Reexamination Request:
No. 90/003,121, Jul. 6, 1993

Reexamination Certificate for:
Patent No.: 5,194,463
Issued: Mar. 16, 1993
Appl. No.: 766,538
Filed: Sep. 27, 1991

[51] Int. Cl.$^6$ .............................................. C08L 2/14
[52] U.S. Cl. ............................................. 524/35; 524/41; 525/123; 525/127; 525/129; 525/130; 528/44; 528/70; 528/71; 528/73; 528/74; 528/75; 528/85
[58] Field of Search ............... 525/123, 127, 129, 130; 524/35, 41; 528/44, 70, 71, 73, 74, 75, 85

[56] References Cited

U.S. PATENT DOCUMENTS

| | | | |
|---|---|---|---|
| 4,619,990 | 10/1986 | Elmasry | 534/573 |
| 4,820,601 | 4/1989 | Ong et al. | 430/58 |
| 4,985,528 | 1/1991 | Mignani et al. | 528/59 |

FOREIGN PATENT DOCUMENTS

| | | |
|---|---|---|
| 0398472 | 11/1990 | European Pat. Off. |
| 2317316 | 2/1977 | France |
| 2426172 | 4/1975 | Germany |

*Primary Examiner*—John C. Bleutge

[57] ABSTRACT

Provided are novel light-absorbing polyurethane compositions and blends of said polyurethane compositions with other thermoplastic polymers. Also provided are shaped or formed articles comprised of the light-absorbing polyurethane compositions and light-absorbing thermoplastic polymer blends.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5, 31 are cancelled.

Claims 2, 3, 4, 6, 7, 11, 12, 13 and 14 are determined to be patentable as amended.

Claims 8, 9, 10, 15–30, 32 and 33, dependent on an amended claim, are determined to be patentable.

New claim 34 is added and determined to be patentable.

2. A light-absorbing polyurethane composition comprising repeating units [for] *of* Formula (I)

wherein

R is a divalent radical selected from $C_2$–$C_{10}$-alkylene, $C_3$–$C_8$-cycloalkylene, arylene, $C_1$–$C_4$-alkylene-arylene-$C_1$–$C_4$-alkylene, $C_1$–$C_4$-alkylene-$C_3$–$C_8$-cycloalkylene-$C_1$–$C_4$-alkylene or $C_1$–$C_4$-alkylene-1,2,3,4,5,6,7-octahydronaphthalene-2,6-diyl-$C_1$–$C_4$-alkylene, and such radicals substituted by one or more groups selected from $C_1$–$C_4$ alkoxy, halogen, aryl, cyano, $C_1$–$C_4$ alkanoyloxy, $C_1$–$C_4$ alkoxycarbonyl, or hydroxy;

$R^1$ is a divalent organic radical comprised of about 5 to about 50 mole percent of the residue of one or more light-absorbing organic diols, wherein the light-absorbing diol is selected from the following chromophoric types: azo, metallized azo, disazo, [methine,] or arylidene, polymethine, azo-methine, anthraquinone, azamethine, anthrapyridone (3H-dibenz [f,ij] isoquinoline-2,7-dione anthrapyridine (7H-dibenz [f,ij] isoquinoline-7-one, phthaloylphenothiazine (14H-naphtho [2,3-a] phenothiazine-8,13-dione, benzanthrone (7H(de)anthracene-7-one), anthrapyrimidine (7H-benzo [e] perimidine-7-one), anthrapyrazole, anthraisothiazole, triphenodioxazine, thiaxanthene-9-one, flourindine (5, 12-dihydroquinoxaline [2,3-b] phenazine), quinophthalone, phthalocyanine, naphthalocyanine, nickel dithiolenes, coumarin (2H-1-benzopyran-2-one), coumarin imine (2H-1-benzopyran-2-imine), indophenol, perinone, nitroarylamine, benzodifuran, phthaloylphenoxazine (14H-naphtho[2,3-a]phenoxazine-8,13-dione), phthaloylacridone (13H-naphtho[2,3-c] acridine 5,8,14-trione), anthraquinonethioxanthone (8H-naphtho[2,3-c]thioxanthene-5,8,13-trione), anthrapyridazone, naphtho[1',2',3',:4,5]quino[2,1-b] quinazoline-5,10-dione, 1H-anthra(2,1-b) (1, 4) thiazin-7,12-dione, indigo, thioindigo, xanthene, acridine, azine, oxazine, 1,4- and 1,5-naphthoquinones, pyromellitic acid diimide, naphthalene-1,4,5,8-tetracarboxylic acid diimide, 3,4,9,10-perylenetetracarboxylic acid diimide, naphthoquinone, diminoisoindoline, naphthopyran (3H-naphtho[2,1-b]pyran-3ones and 3-imines) and aminonaphthalimide;

wherein the hydroxy groups of said diols are bonded via alkylene moieties to the remainder of the light-absorbing organic compound, with any remainder of $R^1$ comprised of the residue of organic diols of the formula HO—$R_2$—OH;

wherein $R^2$ is a divalent radical selected from $C_2$–$C_{18}$ alkylene, $C_3$–$C_8$-cycloalkylene, $C_1$–$C_4$ alkylene-1,2,3,4,5,6,7,8-octahydronaphthalen-2,6-diyl-$C_1$–$C_4$ alkylene, $C_1$–$C_4$-alkylene-$C_3$–$C_8$-cycloalkylene-$C_1$–$C_4$-alkylene, $C_1$–$C_4$ alkylene-arylene-$C_1$–$C_4$-alkylene, $C_2$–$C_4$ alkylene-O—$C_2$–$C_4$ alkylene, $C_2$–$C_4$ alkylene-S—$C_2$–$C_4$ alkyleneor $C_2$–$C_4$ alkylene-O—$C_2$–$C_4$ alkylene-O—$C_2$–$C_4$ alkylene; and n is equal to or greater than 2.

[wherein the hydroxy groups of said diols are bonded via alkylene moieties to the remainder of the light-absorbing organic compound, with any remainder of $R^1$ comprised of the residue of organic diols of the formula HO—$R^2$—OH; wherein $R^2$ is a divalent radical selected from $C_2$–$C_{18}$ alkylene, $C_3$–$C_8$-cycloalkylene, $C_1$–$C_4$ alkylene-1,2,3,4,5,6,7,8-octahydronaphthalene-2,6diyl-$C_1$–$C_4$ alkylene, $C_1$–$C_4$-alkylene-$C_3$–$C_8$-cycloalkylene-$C_1$–$C_4$-alkylene, $C_1$–$C_4$ alkylene-arylene-$C_1$–$C_4$-alkylene, $C_2$–$C_4$ alkylene-O—$C_2$–$C_4$ alkylene, $C_2$–$C_4$ alkylene-S—$C_2$–$C_4$ alkylene or $C_2$–$C_4$ alkylene-O—$C_2$–$C_4$ alkylene-O—$C_2$–$C_4$ alkylene; and n is equal to or greater than 2.]

3. The light-absorbing polyurethane composition of claim [1,] *2,* wherein the light absorbing diol is one or more azo compound corresponding to Formula (II)

wherein $R^3$ is the residue of an aromatic amine which has been diazotized and coupled with a coupling component (Y) and is derived from the aromatic amine classes of aniline, 4-aminoazobenzene, 2-aminothiazole, 2-aminobenzothiazole, 3-amino-2,1-benzisothiazole, 2-aminothieno[2,3-d] thiazole, 5-aminoisothiazole, 5-aminopyrazole, 2-amino-1,3,4-thiadiazole, 5-amino-1,2,4-thiadiazole, 5-amino-1,2,3-triazole, 2(5) aminoimidazole, 3-aminopyridine, 2(3)aminothiophene, 3-aminobenzo [b] thiophene, 3-aminothieno [2,3-c] isothiazole, 3-amino-7-azabenz-2,1-isothiazole, 3-aminoisothiazole [3,4-d]pyrimidine, 3(4)-aminophthalimides and such heterocyclic rings substituted with one or more groups selected from $C_1$–$C_4$alkyl, $C_4$–$C_7$ cycloalkyl, halogen, $C_1$–$C_4$ alkoxy, $C_1$–$C_4$ alkylthio, $C_1$–$C_4$ alkoxycarbonyl, $C_1$–$C_4$ alkanoyl, trifluoromethyl, cyano, dicyanovinyl, carbamoyl, —CONH—$C_1$–$C_4$ alkyl, —CON($C_1$–$C_4$ alkyl)$_2$, sulfamoyl, —SO$_2$N($C_1$–$C_4$-alkyl)$_2$,—SO$_2$NHC$_1$–$C_4$ alkyl, alkanoyl, aroyl, aryl, arylazo, heteroaryl, heteroarylazo, aryloxy, arylthio, heteroarylthio, arylsulfonyl, C₁–C₄ alkylsulfonyl, trifluoromethyl, fluorosulfonyl, trifluoromethylsulfonyl, thiocyano, or nitro, and wherein the alkyl portions of the above groups are optionally substituted by one or more groups selected from $C_1-C_4$ alkoxy, halogen, aryl, cyano, $C_1-C_4$ alkanoyloxy, $C_1-C_4$ alkoxycarbonyl, or hydroxy; Y is selected from the coupler classes of anilines, 1,2-dihydroquinolines, 1,2,3,4-tetrahydroquinolines, benzomorpholines, (3,4-dihydro-2H-1,4-benzoxazines), 5-pyrazolones, 3-cyano-6-hydroxy-2-pyridones, 2,3-dihydroindoles, indoles, 4-hydroxycoumarins, 4-hydroxy-2-quinolones, imidazo [2,1-b] thiazoles, julolidines (2,3,6,7-tetrahydro-1H,5H-benzo[ij]quinolizines), 1-oxajulolidines, 1,2,5,6-tetrahydro-4H-pyrrolo]-3,2,1-ij]quinolines, 2,6-diamino-3-cyanopyridines, 2-aminothiazoles, 2-aminothiophenes, naphthylamines, 5,5-dimethyl-1,3-cyclohexane dione (dimedone) phenols, naphthols, or acetoacetarylides; with the proviso that two aliphatic hydroxy groups are present in the compound of formula (II).

4. The light-absorbing polyurethane composition of claim [1,] 2, wherein the light absorbing diol is one or more disazo compounds corresponding to Formula (III)

$$R^3-N=N-R^4-N=N-Y \qquad (III)$$

wherein
R³ is the residue of an aromatic amine which has been diazotized and coupled with a coupling component (Y) and is derived from the aromatic amine classes of aniline, 4-aminoazobenzene, 2-aminothiazole, 2-aminobenzothiazole, 3-amino-2,1-benzisothiazole, 2-aminothieno[2,3-d] thiazole, 5-aminoisothiazole, 5-aminopyrazole, 2-amino-1,3,4-thiadiazole, 5-amino-1,2,4-thiadiazole, 5-amino-1,2,3-trazole, 2(5) aminoimidazole, 3-aminopyridine, 2(3)aminothiophene, 3-aminobenzo [b] thiophene, 3-aminothieno [2,3-c] isothiazole, 3-amino-7-azabenz-2,1-isothiazole, 3-aminoisothiazole [3,4-d] pyrimidine, 3(4)-aminophthalimides and such heterocyclic rings substituted with one or more groups selected from C₁–C₄ alkyl, C₄–C₇ cycloalkyl, halogen, C₁–C₄ alkoxy, C₁–C₄ alkylthio, C₁–C₄ alkoxycarbonyl, C₁–C₄ alkanoyl, trifluoromethyl, cyano, dicyanovinyl, carbamoyl, —CONH—C₁–C₄ alkyl, —CON(C₁–C₄ alkyl)₂, sulfamoyl, —SO₂N(C₁–C₄-alkyl)₂, —SO₂NHC₁–C₄ alkyl, alkanoyl, aroyl, aryl, arylazo, heteroaryl, heteroarylazo, aryloxy, arylthio, heteroarylthio, arylsulfonyl, C₁–C₄ alkylsulfonyl, trifluoromethyl, fluorosulfonyl, trifluoromethylsulfonyl, thiocyano, or nitro, and wherein the alkyl portions of the above groups are optionally substituted by one or more groups selected from C₁–C₄ alkoxy, halogen, aryl, cyano, C₁–C₄ alkanoyloxy, C₁–C₄ alkoxycarbonyl, or hydroxy;

the coupling component (Y) is selected from the coupler classes of anilines, 1,2-dihydroquinolines, 1,2,3,4-tetrahydroquinolines, benzomorpholines, (3,4-dihydro-2H-1,4-benzoxazines), 5-pyrazolones, 3-cyano-6-hydroxy-2-pyridones, 2,3-dihydroindoles, indoles, 4-hydroxycoumarins, 4-hydroxy-2-quinolones, imidazo [2,1-b] thiazoles, julolidines(2,3,6,7-tetrahydro-1H,5H-benzo[ij]quinolizines), 1-oxajulolidines, 1,2,5,6-tetrahydro-4H-pyrrolo]3,2,1-ij]quinolines, 2,6-diamino-3-cyanopyridines, 2-aminothiazoles, 2-aminothiophenes, naphthylamines, 5,5-dimethyl-1,3-cyclohexane dione (dimedone) phenols, naphthols, or acetoacetarylides;

and R⁴ is a divalent aromatic radical selected from 1,4-phenylene, naphthalene-1,4-diyl, thiazol-2,5-diyl, and thiophene-2,5-diyl:

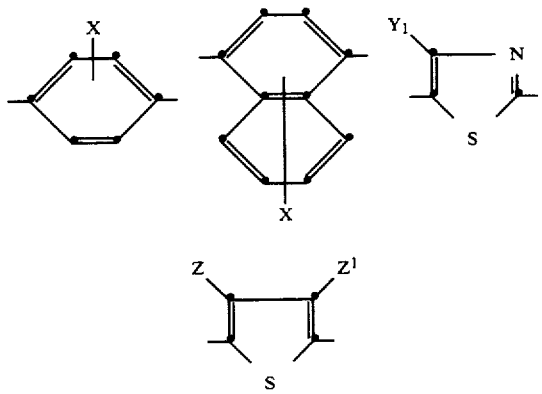

wherein
X is hydrogen or 1–2 groups selected from halogen, C₁–C₄ alkyl, C₁–C₄ alkoxy, —NHCOC₁–C₄ alkyl, —NHCO₂C₁–C₄ alkyl, —NHCO-aryl, —NHCONH-aryl, or —NHCONHC₁–C₄ alkyl;

Y₁ and Z are individually selected from hydrogen, C₁–C₄ alkyl, halogen, hetero or aryl; and Z¹ is selected from hydrogen, C₁–C₄ alkoxycarbonyl, cyano, carbamoyl, aroyl, arylsulfonyl, —CONH-C₁–C₄ alkyl or C₁–C₄ alkylsulfonyl; wherein the alkyl portion of the groups X, Y, and Z, are optionally substituted by one or more groups selected from C₁–C₄-alkoxy, halogen, aryl, cyano, C₁–C₄-alkanoyloxy, C₁–C₄-alkoxycarbonyl or hydroxy; provided that two aliphatic hydroxy groups are present.

6. The light absorbing polyurethane composition of claim [1,] 2, wherein the light-absorbing diol is one or more azo-methine compounds corresponding to Formula (X):

$$A=HC-R^4-N=N-Y \qquad (X)$$

wherein
A is the residue of an active methylene compound selected from malonitrile, α-cyanoacetic acid esters, malonic acid esters, alpha-cyanoacetic acid amides, α-C₁–C₄ alkylsulfonylacetonitriles, α-arylsulfonylacetonitriles, α-C₁–C₄ alkanoylacetonitriles, α-aroylacetonitriles, α-heteroarylacetonitriles, 1,3-indandione, 2(5H)-furanones, 3-cyano-1,6-dihydro-4-methyl-2,6-dioxy (2H)-pyridines, benzo (b) thieno-3-ylidenepropanedinitrile-5,5-dioxides, 1,3-bis(dicyanomethylene)indanes, barbituric acid, 5-pyrazolones, dimedone, 3-oxo-2,3-dihydro-1benzothiophene-1,1-dioxides, or aryl-C(CH₃)C═C(CN)₂;

R⁴ is a divalent aromatic radical selected from 1,4-phenylene, naphthalene-1,4-diyl, thiazol-2,5-diyl, and thiophene-2,5-diyl:

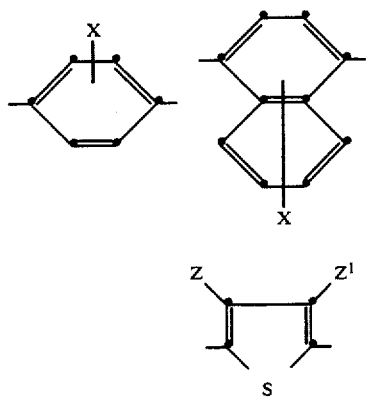

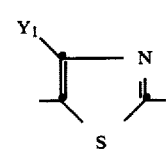

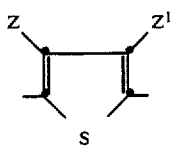

wherein

X is hydrogen or 1–2 groups selected from halogen, $C_1$-$C_4$ alkyl, $C_1$-$C_4$ alkoxy, —NHCO$C_1$-$C_4$ alkyl, —NHCO$_2$$C_1$-$C_4$ alkyl, —NHCO-aryl, —NHCONH-aryl, or —NHCONH$C_1$-$C_4$ alkyl;

$Y_1$ and Z are individually selected from hydrogen, $C_1$-$C_4$ alkyl, halogen, hetero or aryl; and $Z^1$ is selected from hydrogen, $C_1$-$C_4$ alkoxycarbonyl, cyano, carbamoyl, aroyl, arylsulfonyl, —CONH—$C_1$-$C_4$ alkyl, or $C_1$-$C_4$ alkylsulfonyl; wherein the alkyl portion of the groups X, Y, and Z, are optionally substituted by one or more groups selected from $C_1$-$C_4$-alkoxy, halogen, aryl, cyano, $C_1$-$C_4$-alkanoyloxy, $C_1$-$C_4$-alkoxycarbonyl or hydroxy; and wherein Y is selected from the coupler classes of anilines, 1,2-dihydroquinolines, 1,2,3,4-tetrahydroquinolines, benzomorpholines, (3,4-dihydro-2H-1,4-benzoxazines), 5-pyrazolones, 3-cyano-6-hydroxy-2-pyridones, 2,3-dihydroindoles, indoles, 4-hydroxycoumarins, 4-hydroxy-2-quinolones, imidazo [2,1-b] thiazoles, julolidines (2,3,6,7-tetrahydro-1H,5H-benzo[ij]quinolizines, 1-oxajulolidines, 1,2,5,6-tetrahydro-4H-pyrrolo]-3,2,1-ij]quinolines, 2,6-diamino-3-cyanopyridines, 2-aminothiazoles, 2-aminothiophenes, naphthylamines, 5,5-dimethyl-1,3-cyclohexane dione (dimedone) phenols, naphthols, or acetoacetarylides; with the proviso that two aliphatic hydroxy groups are present in the compound of Formula (X).

7. The light-absorbing polyurethane composition of claim [1,] 2, wherein the light-absorbing diol is one or more anthraquinone or anthrapyridone compounds corresponding to compounds of Formulae (XI) and [(X(0,] (XII), respectively:

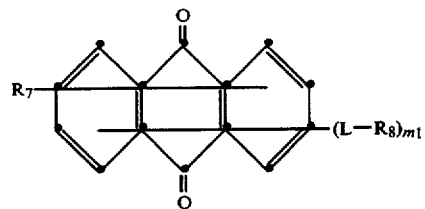

(XI)

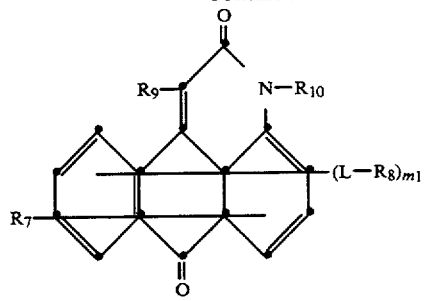

(XII)

wherein
L is a divalent linking moiety selected from —O—, —NH—, —S—, —SO$_2$—, —SO$_2$N($R^{10}$)—, or —CO$_2$—;

$R^7$ is hydrogen or 1–4 groups selected from amino, —NH$C_1$-$C_4$-alkyl, —NH$C_3$-$C_8$-cycloalkyl, —NH-aryl, halo, $C_1$-$C_4$ alkoxy, aroyl, $C_1$-$C_4$ alkanoyloxy, aryloxy, $C_1$-$C_4$ alkylthio, arylthio, heteroarylthio, cyano, nitro, trifluoromethyl, —CO$_2$$C_1$-$C_4$-alkyl, —SO$_2$NH$C_1$-$C_4$ alkyl, —SO$_2$N($C_1$-$C_4$ alkyl)$_2$, $C_1$-$C_4$ alkyl, or hydroxy;

$R^8$ is a hydrocarbyl radical selected from $C_2$-$C_4$-alkylene-(OH)$_m$, $C_2$-$C_4$-alkylene-L—$C_2$-$C_4$-alkylene-(OH)$_m$, arylene-($C_1$-$C_4$-alkylene-OH)$_m$, arylene-(L—$C_1$-$C_4$-alkylene-OH)$_m$, arylene-L—$C_1$-$C_4$-alkylene(OH)$_m$, $C_2$-$C_4$-alkylene-L-arylene-L—$C_2$-$C_4$-alkylene(OH)$_m$, or $C_1$-$C_4$-alkylene-cycloalkylene-$C_1$-$C_4$-alkylene-OH;

$R^9$ is selected from hydrogen, cyano, $C_1$-$C_4$ alkylamino, $C_1$-$C_4$ alkoxy, halogen, —L—$R^8$, —CO$_2$$C_1$-$C_4$-alkyl, $C_1$-$C_4$ alkanoyl, aroyl, or arylsulfonyl;

$R^{10}$ is selected from hydrogen, $C_1$-$C_4$ alkyl, $C_1$-$C_4$ hydroxyalkyl, $C_3$-$C_8$ cycloalkyl, aryl, or $R^8$;

m is one or two;

$m_1$ is zero, one, or two; wherein the alkyl portion of the groups $R_7$, $R_8$, $R_9$ and $R_{10}$ are optionally substituted by one or more groups selected from $C_1$-$C_4$-alkoxy, halogen, aryl, cyano, $C_1$-$C_4$-alkanoyloxy, $C_1$-$C_4$-alkoxycarbonyl or hydroxy; provided that two aliphatic hydroxy groups are present in the compound of Formula (XI) or (XII) and that when $m_1$ is zero, $\texttt{+}$L—$R^9$)$m_1$ equals hydrogen.

11. The polyurethane composition of claim [5,] 34, wherein $R_5$ is selected from the following formulae:

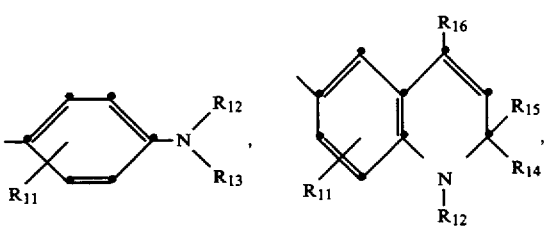

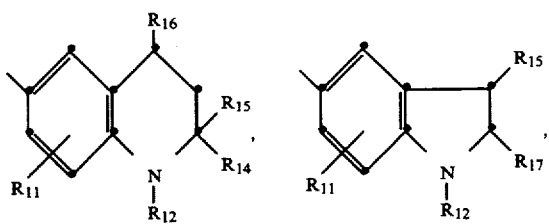

-continued

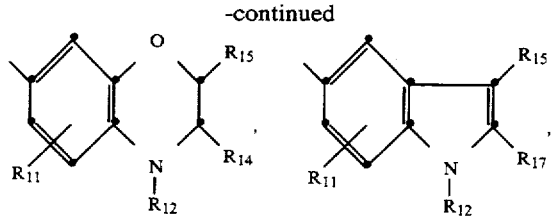

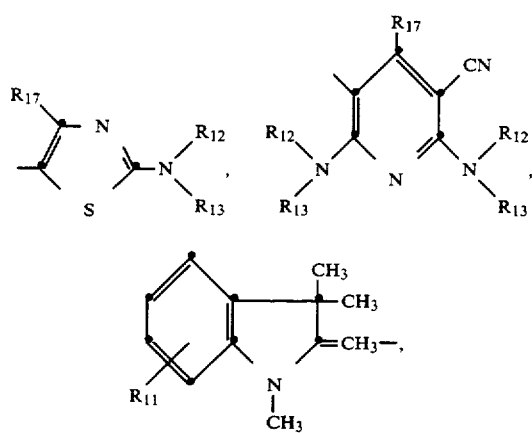

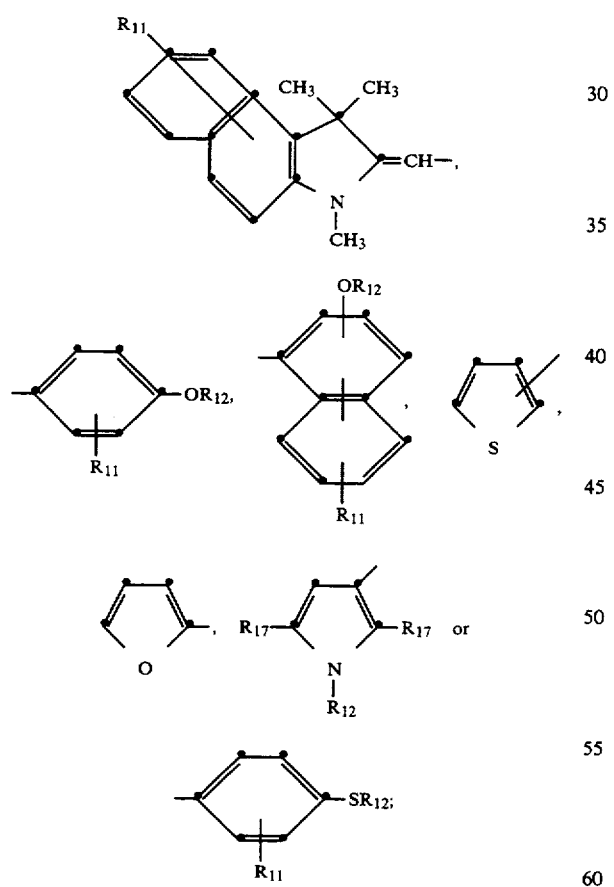

wherein

[$R_{11}$, $R_{12}$, $R_{13}$, $R_{14}$, $R_{15}$, $R_{16}$ and $R_{17}$ are as defined in alaim 5 in the definition of Y;] $R_{11}$ is hydrogen or 1-2 groups selected from $C_1$-$C_4$ alkoxy, O—$C_1$-$C_4$ alkylene—OH, $C_1$-$C_4$ alkylene—OH, $C_1$-$C_4$ alkylene—$C_1$-$C_4$ alkanolyloxy, halogen, $C_1$-$C_4$ alkanoylamino, $C_3$-$C_8$ cycloalkylcarbonylamino, $C_1$-$C_4$ alkylsulfonylamino, arylsulfonylamino or arylcarbonylamino;

$R_{12}$ and $R_{13}$ are independently selected from unsubstituted or substituted $C_1$-$C_{10}$ alkyl; unsubstituted or substituted $C_3$-$C_8$ cycloalkyl; $C_3$-$C_8$ alkenyl; $C_3$-$C_8$ alkynyl; aryl; or $R_{12}$ and $R_{13}$ may be combined with the nitrogen to which they are attached to form a Y radical having the formula

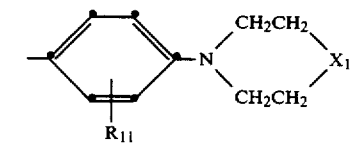

wherein $X_1$ is selected from a covalent bond, —$CH_2$—, —O—, —S—, —$SO_2$—, —$C(O)$—, —$CO_2$—, —$N(C_1$-$C_4$ alkyl)—, —$N(COC_1$-$C_4$ alkyl)—, —$N(SO_2C_1$-$C_4$ alkyl)—, —$N(CO$-aryl)— or —$N(SO_2$-aryl)—;

$R_{14}$, $R_{15}$, and $R_{16}$ are hydrogen or $C_1$-$C_4$ alkyl; and $R_{17}$ is selected from hydrogen, unsubstituted or substituted $C_1$-$C_{10}$ alkyl, $C_3$-$C_7$ cycloalkyl, heteroaryl or aryl; with the provision that two aliphatic hydroxyl groups be present.

12. The light-absorbing polyurethane composition of claim [1,] 2, wherein the light-absorbing diol is a polymethine compound corresponding to the following formulae:

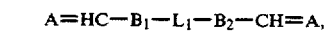

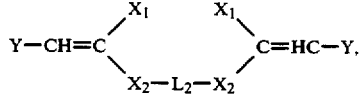

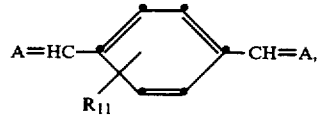

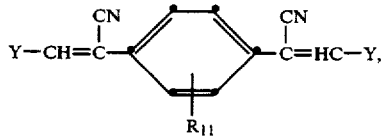

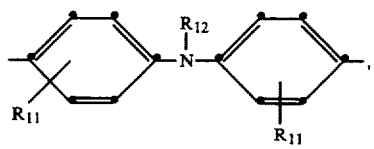

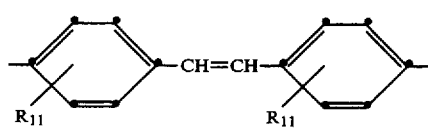

or Y—(CH=CH)$_p$—CH=A;

wherein

A is the residue of an active methylene compound selected from malonitrile, α-cyanoacetic acid esters, malonic acid esters, alpha-cyanoacetic acid amides, α-$C_1$-$C_4$ alkylsulfonylacetonitriles, α-arylsulfonylacetonitriles, α-$C_1$-$C_4$ alkanoylacetonitriles, α-aroylacetonitriles, α-heteroarylacetonitriles, 1,3-indandione, 2(5H)-furanones, 3-cyano-1,6-dihydro-4-methyl-2,6-dioxy (2H)-pyridines, benzo (b) thieno-3-ylidenepropanedinitrile-5,5-dioxides, 1,3-bis(dicyanomethylene)indanes, barbituric acid, 5-pyrazolones, dimedone, 3-oxo-2,3-dihydro-1-benzothiophene-1,1-dioxides, or aryl-C($CH_3$)C=C($CN$)$_2$;

$R_{11}$ is hydrogen or 1-2 groups selected from $C_1$-$C_4$ alkyl, $C_1$-$C_4$ alkoxy, O-$C_1$-$C_4$ alkylene-OH, $C_1$-$C_4$ alkylene-OH, $C_1$-$C_4$ alkylene-$C_1$-$C_4$ alkanoyloxy, halogen, $C_1$-$C_4$ alkanoylamino, $C_3$-$C_8$ cycloalkylcarbonylamino, $C_1$-$C_4$ alkylsulfonylamino, arylsulfonylamino or arylcarbonylamino;

Y is selected from the coupler classes of anilines, 1,2-dihydroquinolines, 1,2,3,4-tetrahydroquinolines, benzomorpholines, (3,4-dihydro-2H-1,4-benzoxazines), 5-pyrazolones, 3-cyano-6-hydroxy-2-pyridones, 2,3-dihydroindoles, indoles, 4-hydroxycoumarins, 4-hydroxy-2-quinolones, imidazo [2,1-b] thiazoles, julolidines (2,3,6,7-tetrahydro-1H,5H-benzo[ij]quinolizines), 1-oxajulolidines, 1,2,5,6-tetrahydro-4H-pyrrolo]3,2,1-ij]quinolines, 2,6-diamino-3-cyanopyridines, 2-aminothiazoles, 2-aminothiophenes, naphthylamines, 5,5-dimethyl-1,3-cyclohexane dione (dimedone) phenols, naphthols, or acetoacetarylides; with the proviso that two aliphatic hydroxy groups are present in the polymethine compound;

$X_1$ is selected from cyano, aryl, heteroaryl, $C_1$-$C_4$-alkoxycarbonyl, arylsulfonyl or $C_1$-$C_4$-alkoxycarbonyl; $X_2$ is selected from —$CO_2$—, $SO_2$, CON($R_{17}$) or arylene; $L_1$ is selected from a covalent bond; unsubstituted or substituted phenylene; $C_3$-$C_8$ cycloalkylene; —O—; —S—; —$SO_2$—; —CO—; —$CO_2$—; —$OCO_2$—; —$O_2$C-alkylene-$CO_2$—; —$O_2$C-arylene—$CO_2$; —$O_2$C-$C_3$-$C_8$-cycloalkylene—$CO_2$—; —$O_2$CNH-alkylene—NH-$CO_2$—; —$O_2$CNH-arylene—$NHCO_2$—; —$SO_2$N($R_{17}$)—; —$SO_2$-alkylene—$SO_2$—; —$SO_2$-arylene-$SO_2$—; —$SO_2$N($R_{17}$)$SO_2$; — $SO_2$N($R_{17}$)-arylene-N($R_{17}$)$SO_2$; —N($SO_2C_1$-$C_4$ alkyl)-; —N—($SO_2$ aryl)—; —O—alkylene—O— or —O—arylene—O—; $L_2$ is selected from unsubstituted or substituted alkylene, $C_3$-$C_8$ cycloalkylene, arylene, alkylene-arylene-alkylene, alkylene-($C_3$-$C_8$)cycloalkylene-alkylene, alkylene-O-alkylene, alkylene-S-alkylene, alkylene-$SO_2$-alkylene, alkylene-O-arylene-O-alkylene, alkylene-N($SO_2$ $C_1$-$C_4$-alkyl) or alkylene-alkylene; $B_1$ and $B_2$ are selected independently from the following formulae:

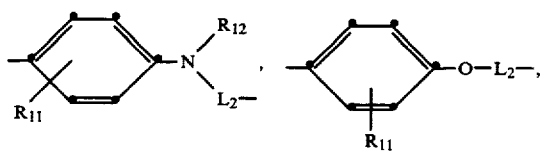

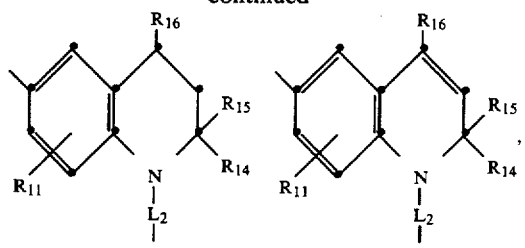

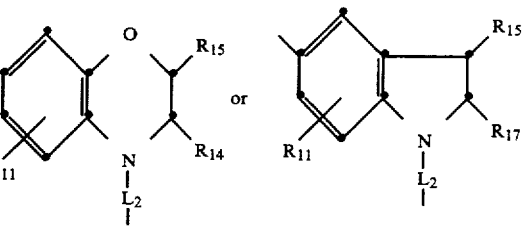

wherein
$R_{12}$, $R_{14}$, $R_{15}$, $R_{16}$ and $R_{17}$ are as defined above; p is an integer of 1-3; with the proviso that two aliphatic hydroxy groups be present in the light absorbing compound.

13. The light-absorbing polyurethane composition of claim [1,] 2, wherein the light-absorbing diol is a coumarin compound corresponding to the following formulae:

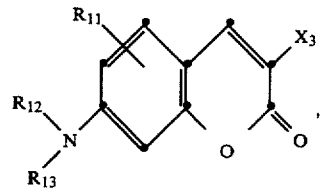

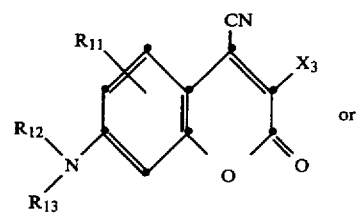

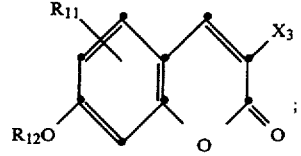

wherein
$R_{11}$, $R_{12}$ and $R_{13}$ are as defined above; $X_3$ is selected from cyano, $C_1$-$C_4$alkoxycarbonyl, $C_1$-$C_4$alkylsulfonyl, aryl, arylsulfonyl, heteroaryl, formyl, aroyl, $C_1$-$C_4$-alkanoyl or —CH=A, wherein A is the residue of an active methylene compound as defined above; with the proviso that two aliphatic groups be present.

14. A light-absorbing thermoplastic polymer composition which comprises one or more thermoplastic poly- 34. A light-absorbing polyurethane composition comprising repeating units of Formula (I)

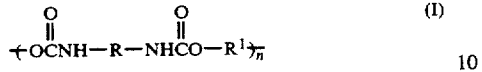

wherein

R is a divalent radical selected from $C_2$–$C_{10}$-alkylene, $C_3$–$C_8$-cycloalkylene, arylene, $C_1$–$C_4$-alkylene-arylene-$C_1$–$C_4$-alkylene, $C_1$–$C_4$-alkylene-$C_3$–$C_8$-cycloalkylene-$C_1$–$C_4$-alkylene or $C_1$–$C_4$-alkylene-1,2,3,4,5,6,7-octahydronaphthalene-2,6-diyl-$C_1$–$C_4$-alkylene, and such radicals substituted by one or more groups selected from $C_1$–$C_4$ alkoxy, halogen, aryl, cyano, $C_1$–$C_4$ alkanoyloxy, $C_1$–$C_4$ alkoxycarbonyl, or hydroxy;

$R^1$ is a divalent organic radical comprised of about 5 to about 50 mole percent of the residue of one or more light-absorbing organic diols, wherein the hydroxyl groups of said diols are bonded via alkylene moieties to the remainder of the light-absorbing organic compound, with any remainder of $R^1$ comprised of the residue of organic diols of the formula HO—$R^2$—OH; wherein $R^2$ is a divalent radical selected from $C_2$–$C_{18}$ alkylene, $C_3$–$C_8$-cycloalkylene, $C_1$–$C_4$ alkylene-1,2,3,4,5,6,7,8-octahydronaphthalen-2,6-diyl-$C_1$–$C_4$ alkylene, $C_1$–$C_4$-alkylene-$C_3$–$C_8$-cycloalkylene-$C_1$–$C_4$-alkylene, $C_1$–$C_4$ alkylene-arylene-$C_1$–$C_4$-alkylene, $C_2$–$C_4$ alkylene-O-$C_2$–$C_4$ alkylene, $C_2$–$C_4$ alkylene-S-$C_2$–$C_4$ alkylene or $C_2$–$C_4$ alkylene-O-$C_2$–$C_4$ alkylene-O-$C_2$–$C_4$ alkylene; and n is equal to or greater than 2, wherein the light-absorbing diol is one or more azamethine, methine, or arylidene compounds corresponding to Formulae (IV), (V), (VI), (VII), (VIII) and (IX):

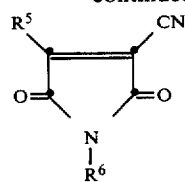

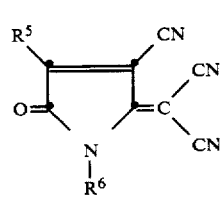

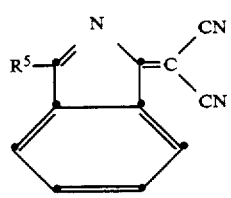

wherein $R^5$ is the residue of an aniline, 1-naphthylamine, 1,2-dihydroquinoline, 1,2,3,4-tetrahydroquinoline, 1,3,3-trimethyl-2-methyleneindoline, 1,3-dihydro-2-methylene-1,1,3-trimethyl-2H-benz[e]indole, benzomorpholine (3,4-dihydro-2H-1,4-benzoxazine), 2,3-dihydroindole, 2-aminothiazole, julolidine (2,3,6,7-tetrahydro-1H,5H-benz-ij]quinolizine), 1-oxajulolidine, 4H-pyrrolo-[3,2,1-ij] quinoline, phenol, naphthol, thiophenol, pyrrole, pyrazole, furan, thiophene, carbazole, phenathiozine or phenoxazine;

$R^6$ is selected from hydrogen, $C_1$–$C_4$ alkyl, $C_3$–$C_8$ cycloalkyl, aryl, $C_1$–$C_4$-alkylene-aryl-, or $C_1$–$C_4$ alkylene-$C_3$–$C_8$ cycloalkylene, wherein the $C_1$–$C_4$ alkyl group is optionally substituted by one or more groups selected from hydroxy, halo, $C_1$–$C_4$ alkoxy, $C_1$–$C_4$ alkanoyloxy, or $C_1$–$C_4$ alkoxycarbonyl;

A is the residue of an active methylene compound selected from malonitrile, α-cyanoacetic acid esters, malonic acid esters, alpha-cyanoacetic acid amides, α-$C_1$–$C_4$ alkylsulfonylacetonitriles, α-arylsulfonylacetonitriles, α-$C_1$–$C_4$ alkanoylacetonitriles, α-aroylacetonitriles, α-heteroarylacetonitriles, 1,3-indandione, 2(5H)-furanones, 3-cyano-1,6-dihydro-4-methyl-2,6-dioxy (2H)-pyridines, benzo (b) thieno-3-ylidenepropanedinitrile-5,5-dioxides, 1,3-bis(-dicyanomethylene)indanes, barbituric acid, 5-pyrazolones, dimedone, 3-oxo-2,3-dihydro-1-benzothiophene-1,1-dioxides, or aryl-C(CH$_3$)C=C(CN)$_2$.

* * * * *